(12) United States Patent
Mizukami et al.

(10) Patent No.: US 6,597,722 B2
(45) Date of Patent: Jul. 22, 2003

(54) APPARATUS FOR ARC-MELTING COLD IRON SOURCE AND METHOD THEREOF

(75) Inventors: Hideaki Mizukami, Yokohama (JP); Ryuji Yamaguchi, Kawasaki (JP); Norio Ao, Kawasaki (JP); Toshimichi Maki, Tokyo (JP)

(73) Assignee: JP Steel Plantech Co., Yokohama (JP)

( * ) Notice: Subject to any disclaimer, the term of this patent is extended or adjusted under 35 U.S.C. 154(b) by 0 days.

(21) Appl. No.: 09/775,153

(22) Filed: Feb. 1, 2001

(65) Prior Publication Data

US 2002/0009118 A1 Jan. 24, 2002

Related U.S. Application Data

(63) Continuation of application No. PCT/JP99/03690, filed on Jul. 8, 1999.

(51) Int. Cl.[7] .............................. F27D 13/00; F27D 3/14
(52) U.S. Cl. .............................. 373/80; 373/78; 373/84
(58) Field of Search ........................... 373/8, 9, 78–84, 373/60, 94, 99, 18, 63, 2; 266/44, 45, 240, 326

(56) References Cited

U.S. PATENT DOCUMENTS

| | | | | |
|---|---|---|---|---|
| 4,617,673 A | * | 10/1986 | Fuchs et al. | 373/80 |
| 5,117,438 A | * | 5/1992 | Ehle et al. | 373/80 |
| 5,153,894 A | | 10/1992 | Ehle et al. | 373/80 |
| 5,535,235 A | * | 7/1996 | Ao et al. | 373/84 |
| 5,680,413 A | * | 10/1997 | Ogushi et al. | 373/80 |
| 5,835,524 A | * | 11/1998 | Berger et al. | 373/80 |
| 5,898,726 A | * | 4/1999 | Matsumoto et al. | 373/84 |
| 5,999,556 A | * | 12/1999 | Haissig | 373/9 |
| 6,269,112 B1 | * | 7/2001 | Poloni et al. | 373/78 |

FOREIGN PATENT DOCUMENTS

| | | |
|---|---|---|
| JP | 6-046145 B | 6/1994 |
| JP | 7-180975 A | 7/1995 |
| JP | 7-332874 A | 12/1995 |
| JP | 10-310813 A | 11/1998 |
| JP | 11-037663 A | 2/1999 |
| JP | 11-183045 A | 7/1999 |

* cited by examiner

*Primary Examiner*—Tu Ba Hoang
(74) *Attorney, Agent, or Firm*—Frishauf, Holtz, Goodman & Chick, P.C.

(57) ABSTRACT

The present invention provides an arc-melting apparatus, which attains extremely high efficiency by preheating scraps using exhaust gas from the melting chamber. The arc-melting apparatus needs for no device to carry and supply an iron source to a melting chamber, which makes it possible to preheat the next charge. The arc-melting apparatus has a melting furnace which melts scraps, a preheating shaft connected directly to an upper part of one side of the melting furnace, an arc electrode for melting scraps in the melting furnace, a bucket for supplying scraps to the preheat shaft so as to continuously maintain scraps in the melting furnace and in the preheating shaft, a tapping portion having a tapping hole, being projected outward from the melting furnace and a tilting device for tilting the melting furnace on a side of the tapping portion. The tapping portion is arranged at an orthogonal direction to the direction of the supplied cold iron source. The preheating shaft of the melting furnace and the tapping portion have a distance between the mutual part, so that scraps do not flow out on a the tapping hole side.

10 Claims, 29 Drawing Sheets

(a)

(b)

to Exhausting gas adsorption system

APPARATUS FOR ARC-MELTING COLD IRON SOURCE AND METHOD THEREOF

This is a continuation application (35 USC 111) of International Application PCT/JP99/03690 filed Jul. 8, 1999 (not published in English).

FIELD OF THE TECHNOLOGY

The present invention relates to an apparatus for arc-melting a cold iron source such as iron scrap and direct smelting reduction iron, etc. efficiently, and a melting method thereof.

BACKGROUND OF THE TECHNOLOGY

Japanese unexamined patent publication No. 7-180975 discloses a scrap preheating device, wherein a shaft furnace is connected to an upper part of an arc furnace, and furthermore wherein one stage, or two stages or more of fire grates are attached to the shaft furnace, which is able to be opened or closed.

Japanese unexamined patent publication No. 7-332874 discloses a method, wherein there is arranged a first preheating chamber of rotary drum type which is horizontally placed, connected to an upper cover of a melting chamber of an arc-furnace; and wherein there is arranged a second preheating chamber which is connected to the first preheating chamber at the bottom. After a cold iron source is preheated by the exhaust gas generated from the melting chamber in the second preheating chamber, the preheated cold iron source is pushed into the first preheating chamber by a pusher and the preheated cold iron source is charged into the melting chamber via the first preheating chamber which is rotating.

Japanese examined patent publication No. 6-46145 discloses an apparatus, wherein a shaft type preheating chamber is directly connected to a melting (chamber, and wherein a charge of cold iron source is charged into the melting chamber. As the charge is melted, a new charge of iron falls from the shaft type preheating chamber into the melting chamber while the cold iron source in the shaft type preheating chamber is being preheated by an exhaust gas. This continues until all of the cold iron source which is charged into the melting chamber and the shaft type preheating chamber is melted.

By means of the method and apparatus as described above, the high preheating effect can attain an electric power unit of 250 to 270 kWh/t. However, the above described Prior Art has the following problems.

According to JP7-180975 and JP7-332874, in order to charge the preheated cold iron resource into the melting furnace of the arc-furnace, a device for transporting the preheated cold iron source such as a pusher or a rotary drum is necessary. For this reason, the preheating temperature has a limitation when preheating by the exhaust gas from the melting chamber. That is to say, if a large amount of carbonaceous material such as coke and oxygen gas are blown into the melting chamber and the cold iron source is preheated by a large amount of the generated exhaust gas having a high temperature, the preheated temperature becomes high and the preheating effect is improved. However, in an apparatus, high exhaust gas temperatures causes problems such as heat deformation and fusion of the above described transporting device. Therefore, the exhaust gas temperature cannot be elevated.

On the contrary, according to JP6-46145, the shaft type preheating chamber is directly connected to the melting furnace. Consequently, the above described device for transporting the cold iron source is not necessary and the above described problem does not occur. However, since each time the melted iron amount corresponding to one batch is melted, all of the cold iron source in the melting chamber is melted, the melted iron is poured off and none of melted iron is left in the preheating chamber. For this reason, a cold iron source for the next batch which is to be charged immediately thereafter cannot be preheated. Therefore, this method cannot be said to be sufficient, with respect to the effective use of exhaust gas.

DISCLOSURE OF THE INVENTION

It is an object of the present invention to provide an arc-melting apparatus for arc-melting a cold iron source which does not require a device for carrying and feeding the cold iron source to the preheating chamber. This apparatus con, also, preheat the cold iron source to be use in the following charge, and can melt the cold iron source with an extreme high efficiency unattainable conventional melting apparatus whereby use exhaust gas for preheat the scrap. More concretely speaking, an arc-melting apparatus for arc-melting cold iron source with electric power unit of less than 250 kWh/t can be provided. Furthermore, this apparatus provides a method for melting the cold iron source without using a large scaled apparatus, and for preventing harmful constituents from being generated. In order to attain the above-mentioned object, the present invention provides the following arc-melting apparatus for arc-melting cold iron source. That is to say, The first invention is an arc-melting apparatus for arc-melting cold iron source comprising:
(a) a melting chamber for melting the cold iron source;
(b) a preheating shaft, which is directly connected to an upper part of one side of the melting furnace and into which is introduced the exhaust gas generated in the melting chamber, in order to preheat the cold iron source;
(c) an arc electrode for melting the cold iron source in the melting chamber;
(d) a cold iron source feed device for feeding the cold iron source to the preheating shaft so that the cold iron source is continuously maintained in the melting chamber and the preheating shaft;
(e) a tapping portion having a tapping hole, projecting into the melting chamber; and
(f) a tilting device for tilting the melting chamber on the side of the tapping portion to pour out the melted iron.

The second invention is an arc-melting apparatus for arc-melting cold iron source of the first invention, wherein being projected outward from the melting chamber the tapping portion having a tapping hole is positioned in a different direction from the direction toward which the cold iron source in the preheating shaft is fed to the melting chamber.

The third invention is an arc-melting apparatus for arc-melting cold iron source of the second invention, wherein the tapping portion is arranged at a right angle to the direction toward which the cold iron source is fed.

The fourth invention is an arc-melting apparatus for arc-melting cold iron source of the first invention or the second invention, which has a distance between the position of the preheating shaft adjacent to the melting chamber and the position of the tapping portion adjacent to the melting chamber, in order to make it possible to prevent the cold iron source from flowing over the tapping portion, when the melting chamber is tilted.

The fifth invention is an arc-melting equipment for arc-melting cold iron source of the fourth invention, wherein a distance between the position of the preheating shaft of the melting chamber and the position of the tapping position is longer than a horizontal distance of the base of the cold iron source resting in the melting chamber from the preheating shaft, to the melting chamber.

The sixth invention is an arc-melting apparatus for arc-melting cold iron source of any one of the first invention through the fifth invention, which has a travelling device for travelling the arc electrode following the molten iron which moves in the melting furnace.

The seventh invention is an arc-melting apparatus for arc-melting cold iron source of any one of the first invention through the sixth invention which has further another arc electrode which is placed at the tapping portion.

The eighth invention is an arc-melting apparatus for arc-melting cold iron source of any one of the first invention through the seventh invention which has a device for feeding oxygen gas at the lower position of the preheating shaft.

The ninth invention is an arc-melting apparatus for arc-melting cold iron source of any one of the first invention through the eighth invention which has a fuel feed device for feeding fuel together with oxygen gas to the cold iron source at the lower position of the preheating shaft of the melting furnace.

The tenth invention is an arc-melting apparatus for arc-melting cold iron source of any one of the first invention through the ninth invention which has a carbonaceous material feed device for feeding carbonaceous material to the melting furnace and an oxygen gas feed device for feeding oxygen gas to the melting chamber.

The eleventh invention is an arc-melting apparatus for arc-melting cold iron source of any one of the first invention through the tenth invention which has a device for elevating the temperature of the exhaust gas discharged from a post-burning chamber to a predetermined temperature or more, being equipped with the post-burning chamber which post-burns the residual of non-combusted gas generated in the melting furnace which has passed through the preheat chamber by feeding oxygen containing gas and with a cooling portion which cools an exhaust gas discharged from the post-burning chamber.

The twelfth invention is an arc-melting apparatus for arc-melting cold iron source of any one of the first invention through the eleventh invention which has an adsorbent feed device for feeding adsorbent to the exhaust gas which has been quickly cooled at the cooling portion.

The thirteenth invention is an arc-melting apparatus for arc-melting cold iron source of any one of the first invention through the twelfth invention. This invention has a device for burning one part or the whole of the incombustible gas generated from the melting chamber, by arranging single or plural steps of the gas introducing holes in a range from the surface of the bath in the melting chamber to the upper end of the cold iron source of the upper part of the preheating shaft and by feeding oxygen containing gas through the gas introducing holes to charge portion of the cold iron source.

The fourteenth invention is an arc-melting equipment for arc-melting cold iron source of any one of the first invention through the thirteenth invention. This invention has a gas feeding device for blowing an oxygen gas or an inert gas into the molten iron in the vicinity of boundary of the cold iron source in the melting chamber and the molten iron.

The fifteenth invention is an arc-melting method for arc-melting cold iron source comprising the steps of:

(1) introducing an exhaust gas generated in a melting chamber into a preheating chamber to preheat the cold iron source;

(2) melting the cold iron source by an arc electrode while the cold iron source is continuously or intermittently being fed to the preheating shaft so that the cold iron source may be continuously maintained in the preheating shaft and the melting chamber;

(3) tilting the melting furnace at the time when the molten iron is accumulated;

(4) heating the molten iron for a predetermined time by an arc electrode to elevate the temperature thereof; and (5) tapping the molten iron in the state that the cold iron source may be continuously maintained in the preheating shaft and the melting chamber.

The sixteenth invention is an arc-melting method for arc-melting cold iron source of the fifteenth invention comprising the step of separating the molten iron and the cold iron source completely by tilting the melting chamber.

The seventeenth invention is an arc-melting method for arc-melting cold iron source of the fifteenth invention or the sixteenth invention comprising the step of blowing oxygen or the oxygen and fuel simultaneously onto the cold iron source at the lower position of the preheating shaft of the melting chamber.

The eighteenth invention is an arc-melting method for arc-melting cold iron source of any one of the fifteenth invention through the seventeenth invention comprising the step of blowing oxygen and carbonaceous material such as coke into the melting furnace.

The nineteenth invention is an arc-melting method for arc-melting cold iron source of any one of the fifteenth invention through the eighteenth invention wherein the cold iron source of 40% or more of one charge remains in the melting furnace and the preheating shaft during melting and at the time of tapping.

The twentieth invention is an arc-melting method for arc-melting cold iron source of any one of the seventeenth invention through the nineteenth invention, wherein the sum of the oxygen being blown into the lower part of the preheating shaft and the oxygen being blown into the melting furnace is 25 $Nm^3$/ton or more.

The twenty-first invention is an arc-melting method for arc-melting cold iron source of any one of the fifteenth invention through the twentieth invention comprising the steps of:

melting the cold iron source in the melting furnace by feeding supplementary heat source such as arc heating and coke and oxygen to the melting furnace; feeding and post-burning oxygen containing gas to elevate an exhaust gas to a predetermined temperature or more without discharging to the outside of the system the residual of the non-combusted gas generated in the melting furnace which has passed through the preheat chamber; and thereafter cooling the exhaust gas continuously and quickly.

The twenty-second invention is an arc-melting method for arc-melting cold iron source of any one of the fifteenth invention through the twenty-first invention comprising the steps of:

melting the cold iron source in the melting furnace by feeding supplementary heat source such as arc heating and coke and oxygen to the melting furnace; arranging one or plural stages of gas introducing holes in a range from bath surface in the melting furnace to upper end of the cold iron source of upper part of the preheat shaft; and feeding oxygen containing gas from those gas introducing holes to the charge portion of the cold iron source to burn part or all of the non-combusted gas generated from the melting furnace.

The twenty-third invention is an arc-melting method for arc-melting cold iron source of the twenty-first invention or the twenty-second invention comprising the step of feeding adsorbent to the exhaust gas which has been quickly cooled at the cooling portion.

The twenty-fourth invention is an arc-melting method for arc-melting cold iron source of any one of the twenty-first invention through the twenty-third invention which is characterized in that the exhaust gas after the post-burning is 900° C. or more.

The twenty-fifth invention is an arc-melting method for arc-melting cold iron source of any one of the fifteenth invention through the twentieth invention comprising the steps of:

melting the cold iron source in the melting furnace by feeding supplementary heat source such as arc heating and coke and oxygen to the melting furnace; arranging one or plural stages of gas introducing holes in a range from the surface of the bath in the melting furnace to upper end of the cold iron source of the upper part of the preheat shaft; feeding a predetermined amount of the oxygen containing gas from those gas introducing holes to the charge portion of the cold iron source to burn the non-combusted CO gas generated from the melting furnace; making the exhaust gas which is generated owing to burning of the non-combusted CO gas by the oxygen containing gas in the vicinity of the outlet of the preheating shaft have a predetermined temperature or more; and thereafter cooling the exhaust gas at the cooling portion which is connected to the upper part of the preheating shaft.

The twenty-sixth invention is an arc-melting method for arc-melting cold iron source of the twenty-fifth invention comprising the step of feeding adsorbent to the exhaust gas which has been quickly cooled at the cooling portion.

The twenty-seventh invention is an arc-melting method for arc-melting cold iron source of the twenty-fifth invention or the twenty-sixth invention, wherein the exhaust gas in the vicinity of the outlet of the preheating shaft is 900° C. or more.

The twenty-eighth invention is an arc-melting method for arc-melting cold iron source of any one of the twenty-second invention through the twenty-seventh invention, wherein the whole blowing amount of the oxygen containing gas makes feed oxygen amount $Q_{IN}$ which is calculated from oxygen concentration therein and flow rate therein have the following formula (A) with respect to oxygen amount Q ($Nm^3$/min) which is blown in the melting furnace:

$$0.55Q \leq 0.9Q \tag{A}$$

The twenty-ninth invention is an arc-melting method for arc-melting cold iron source of any one of the fifteenth invention through the twenty-eighth invention comprising the steps of:

melting the cold iron source in the melting furnace by feeding supplementary heat source such as arc heating and coke and oxygen to the melting furnace; at the time of thereof introducing air into the melting furnace; and burning the non-combusted CO (Mainly CO) gas in the melting furnace so that $0.3 \leq OD \leq 0.7$ where $CO_2/(CO_2+CO)$ is made to be OD.

The thirtieth invention is one wherein a melting method for melting the cold iron source uses the arc-melting equipment of any one of the first invention through the seventh invention.

DESCRIPTION OF THE PREFERRED EMBODIMENT

Figure 1:
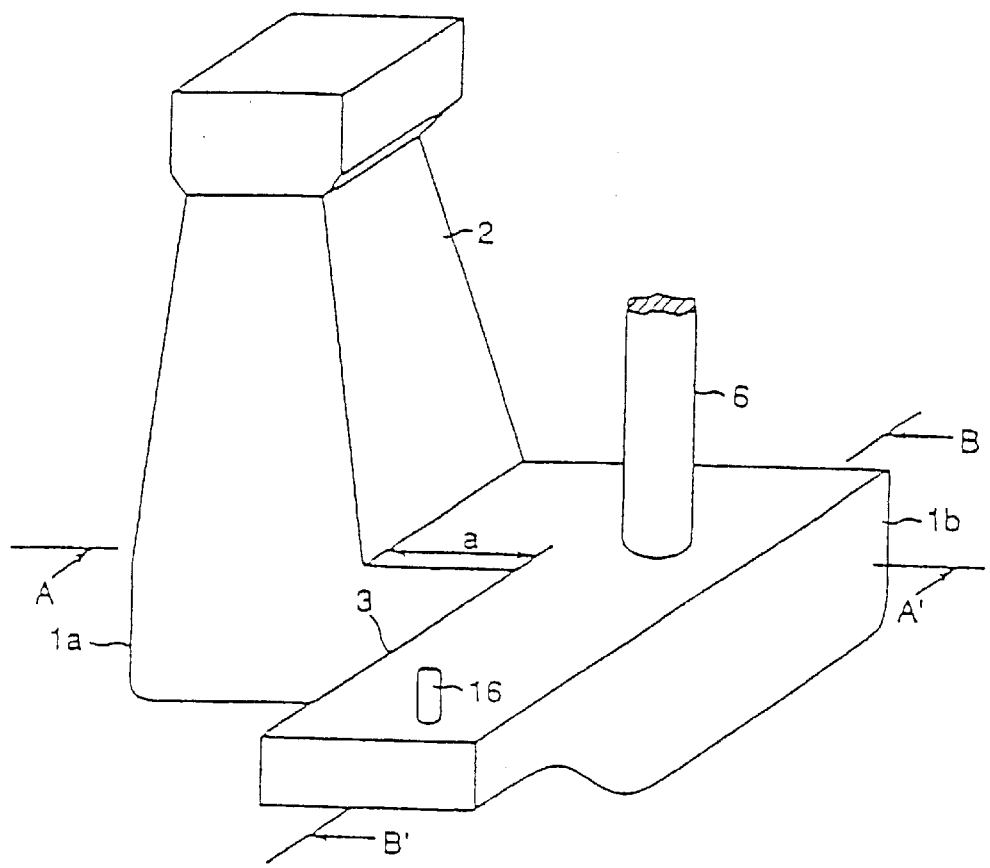
FIG. 1 is a perspective view showing an arc-melting apparatus, relating to one embodiment of the present invention.
Figure 2:
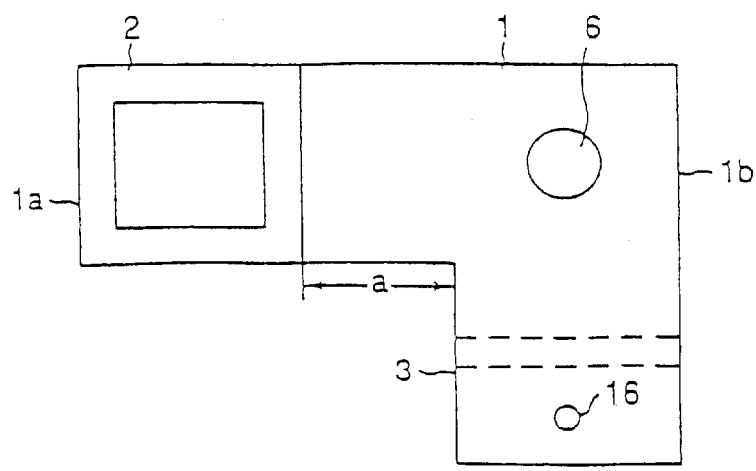
FIG. 2 is a plan view showing an arc-melting apparatus, relating to one embodiment of the present invention.
Figure 3:
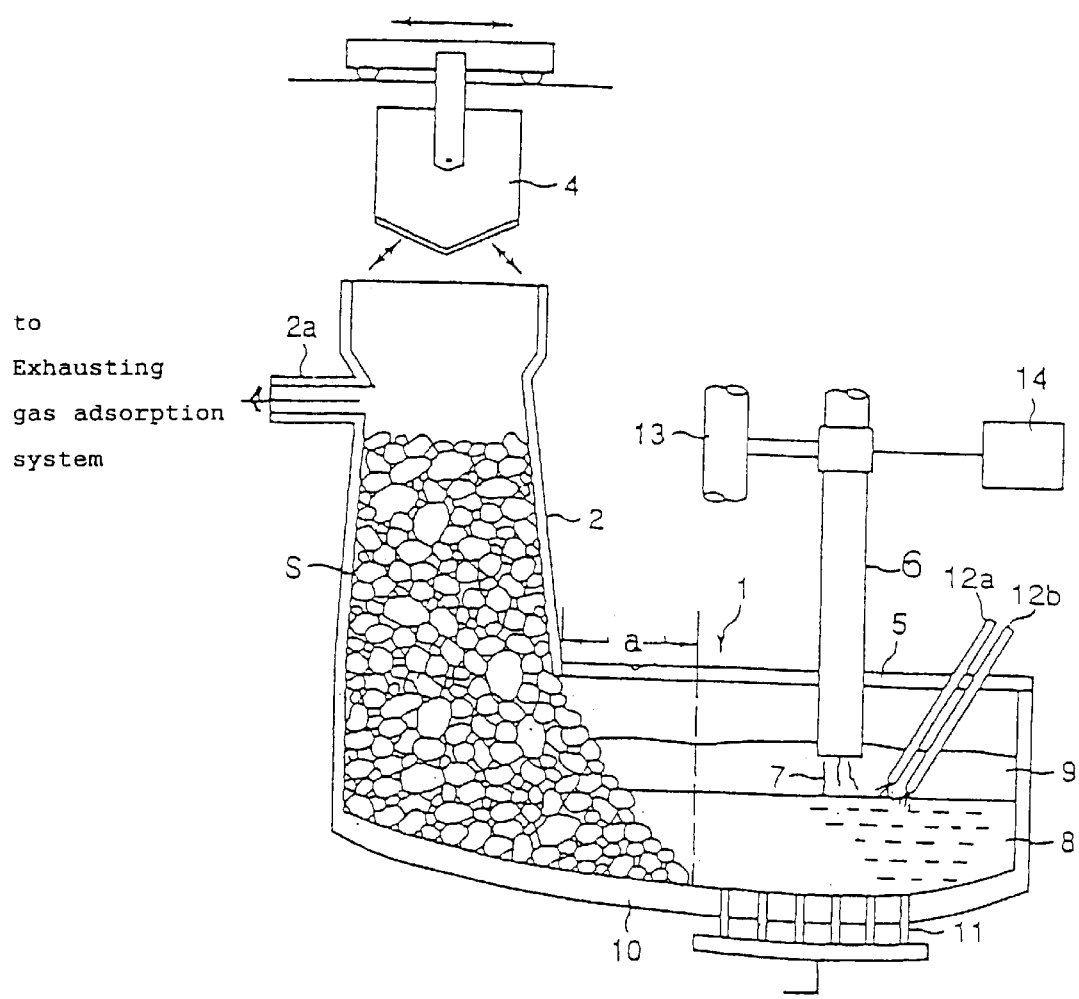
FIG. 3 is a sectional view taken on line A–A' of FIG. 1.
Figure 4:
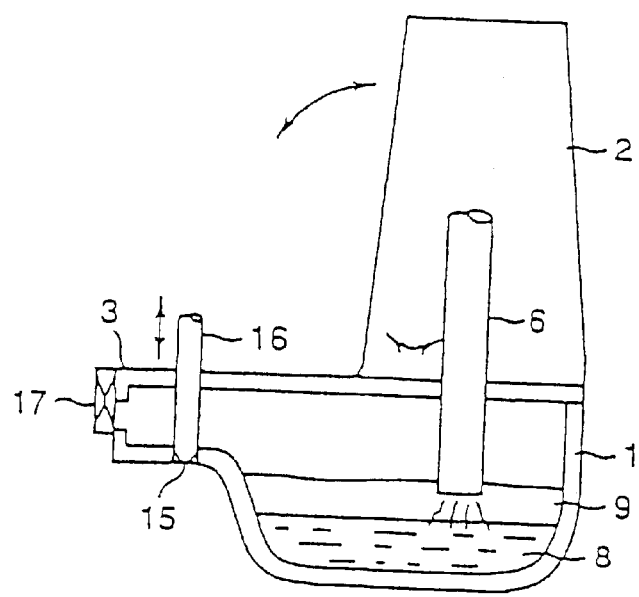
FIG. 4 is a sectional view taken on line B–B' of FIG. 1.

Now the first embodiment will be described with reference to FIG. 1 through FIG. 7. FIG. 1 is a perspective view showing an arc-melting apparatus, relating to an embodiment of the present invention. FIG. 2 is a plan view of the arc-melting apparatus, relating to the embodiment of the present invention. FIG. 3 is a sectional view taken on line A–A' of FIG. 1. FIG. 4 is a sectional view taken on line B–B' of FIG. 1. This arc-melting apparatus is equipped with a melting furnace 1 for arc-melting cold iron source, a preheating shaft 2 directly connected to an upper portion of one side 1a of the melting furnace and extending upward and a tapping portion 3 arranged in a melting chamber 1.

As shown in FIG. 3, an exhausting portion 2a which is connected to an exhaust gas adsorption system is placed at an upper end of the preheating shaft 2. Iron scraps S as cold iron source are charged into the melting furnace 1 and the preheating shaft 2. A bucket 4 for charging scraps is placed above the preheating shaft 2 and the iron scraps S are charged from this bucket 4 into the preheating shaft 2. In order to prevent hanging up, carbon source, for example, coke may be charged into the preheat shaft 2. In this case, charge of the scraps S from the bucket 4 is performed to feed the scraps S continuously or intermittently to the preheating shaft 2 so that the scraps S are continuously maintained in the melting furnace 1 and the preheating shaft 2 during the operation. The charge of the scraps S, in this case may be carried out according to a process standard prepared in advance, based on a results of the operational performance or a sensor which can detect the amount of the scraps S in the preheating shaft 2 being installed, the charge of the scraps S through the bucket 4 may be controlled by appropriate means for controlling, based on a signal outputted from this sensor.

A taper of a side wall of the preheating shaft 2 ranges preferably from 2.5 to 7 degrees. If this taper is less than 2.5 degrees, hanging up of the scrap in the shaft cannot be effectively prevented. If this taper is over 7 degrees, the charge amount of scraps 3 decreases. With a decreased amount of the scraps 3, there is insufficient residence time during preheating, and it becomes impossible to sufficiently obtain the effect of preheating. To compensate for this and increase residence time to the same degree that is intended to be gained, the height of the preheating shaft 2 must be increased. If this is done, the building has to be heightened. Furthermore, since a sectional area of an upper part of the preheating shaft 2 becomes narrow, the amounts of scraps which can be held therein and be preheated, is limited.

A furnace cover 5, which is capable of opening and closing, is arranged at an upper part of the melting furnace 1 and an arc electrode 6 is inserted vertically into the melting furnace, passing through the furnace cover 5 from the top of the melting furnace 1. In addition, the furnace bottom electrodes 11 are placed in a position where the electrodes 11 confront the arc electrode 6 at a furnace bottom of the melting furnace 1. The scraps S are melted into molten iron 8 by an arc 7 which is produced by the arc electrode 6. Slag 9 is produced on the molten iron 8 and the arc 7 is formed in this slag 9. The arc electrode 6 is supported by a support member 13 and can be tilted by a tilting mechanism 14.

Two lances 12a, 12b are inserted turning their top ends into the surface of the molten iron bath, the oxygen being fed through the lance 12a and coke as a supplementary heat source being injected through the lance 12b.

The scraps S in the preheating shaft 2 are fed in the direction of going from a preheating shaft side 1a of the melting furnace toward the opposite side 1b thereof, and the tapping portion 3 is arranged projecting out of the melting furnace 1, so as to make a right angle with the direction to the scraps S are fed. The melting furnace 1 can be tilted on a side of the tapping portion 3 (See FIGS. 4 and 5) by a tilting mechanism which is not shown in the drawings. A portion where the preheating shaft 2 of the melting furnace 1 is placed and a portion where the tapping portion 3 is placed are apart as much as distance a and the scraps S are prevented from flowing out on the side of the tapping portion 3 by a wall portion thereof when the melting furnace 1 is tilted. In this case as shown in FIG. 3, the distance a is preferably longer than a distance that the scraps S extends with an angle of repose ranging from the preheat shaft 2 to the melting furnace 1. By way of doing in this manner, the scraps S are completely prevented from flowing out on the side of the tapping portion 3, when the melting furnace is tilted.

A tapping hole 15 is formed at a bottom portion in the vicinity of the top end of the tapping portion 3 (see FIG. 4)

and a stopper 16 which is movable up and down, in order to open and close the tapping hole 15 is placed. In addition, a slag door 17 is placed on the top end side of the tapping hole 3.

When the iron scraps are melted in a melting equipment constituted in this manner, the iron scraps S are firstly charged into the melting furnace 1 and the preheat shaft 2 so that the iron scraps S are continuously maintained in the melting furnace 1 and in the preheat shaft 2.

In this state, the arc 7 is formed by the arc electrode 6 to melt the scraps S. In this case, oxygen is fed through lance 12a to assist the melting of the scraps. After molten iron accumulates in the furnace, coke is injected as a supplementary heat source through lance 12b into the slag to start slag forming operations for the new scrap being melted, and a top end of the electrode 6 is buried in the slag 9 so that the arc 7 is formed in the slag 9. The coke is a supplementary heat source which contributes to melting of the scraps S.

An exhaust gas containing CO is generated by melting the scraps in this manner and is discharged through the preheating shaft 2 and the exhausting portion 2a. The heat of this exhaust gas is transferred to the scraps S in the preheating shaft 2, whereby the scraps are preheated. Since the scraps in the preheating shaft 2 are gradually fed into the melting furnace 1, accompanied by melting of the scraps S within the melting furnace 1, the upper end position of the scraps S goes down. Therefore, additional scraps S are continuously or intermittently fed from the bucket 4 to the preheating shaft 2, so that the scraps S are continuously maintained in the melting chamber and in the preheating shaft. In this way, at least a predetermined amount of scraps are always maintained in the melting furnace 1 and in the preheating shaft 2. The charging of the scraps S is controlled according to a process standard prepared in advance based on results of operational performance or a sensor which can detect amount of the scraps S in the preheat shaft 2. A signal from the sensors is then used to control the bucket 4.

Figure 5:
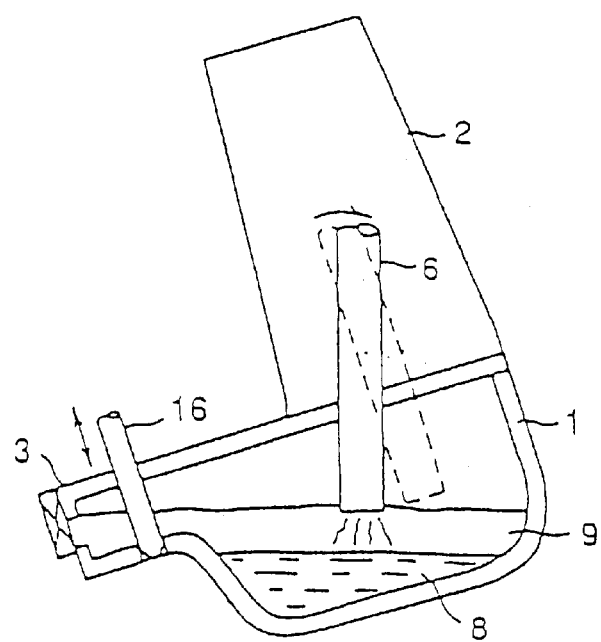
FIG. 5 is a sectional view showing a state of tilting a melting furnace of an arc-melting apparatus, relating to one embodiment of the present invention.

As the scraps S are being melted, a state that the scraps S as iron source and the molten iron co-exist in the melting furnace 1. And the temperature of the molten iron becomes low, for example, 1540~1550° C. This is only a slight super heat compared with 1530° C. of solidification temperature of molten iron, which can cause such inconvenience as a blocking of the tapping hole at the time of tapping by solidified material. For this reason according to the present invention, arc heat is continued by tilting the melting furnace 1 on the side of the tapping portion 3 before tapping as shown in FIG. 5. In this case the tapping portion 3 is arranged projecting out of the melting furnace 1 so as to make a right angle with the direction to which the scraps S flow in, and further a portion where the preheat shaft 2 of the melting furnace 1 is placed and a portion where the tapping portion 3 is placed are apart as much as distance a (See FIG. 3) and the scraps S are prevented from flowing out on the side of the tapping portion 3 by a wall portion thereof. Owing to this prevention, area where the molten iron having flown into the side of the tapping portion 3 contacts with the scraps S can be made to be small. Therefore, super heat (ΔT) of the molten iron can be increased and it is possible to avoid the problem that temperature of the molten iron which is tapped is low. By making the separation distance a longer than the distance of the scraps S which extends with an angle of repose, rising from the preheat shaft 2 to the melting furnace 1, the scraps S are nearly completely prevented from flowing into the tapping portion 3. This allows the temperature of the molten iron to be elevated all the more.

If the melting furnace 1 is tilted, the arc electrode 6 is positioned on the broken line in FIG. 5 and arc is not effectively fed. By tilting the arc electrode 6 by the tilting mechanism 14, however, the arc electrode is positioned on the solid line in FIG. 5 and the arc can be effectively fed to the molten iron.

Figure 6:
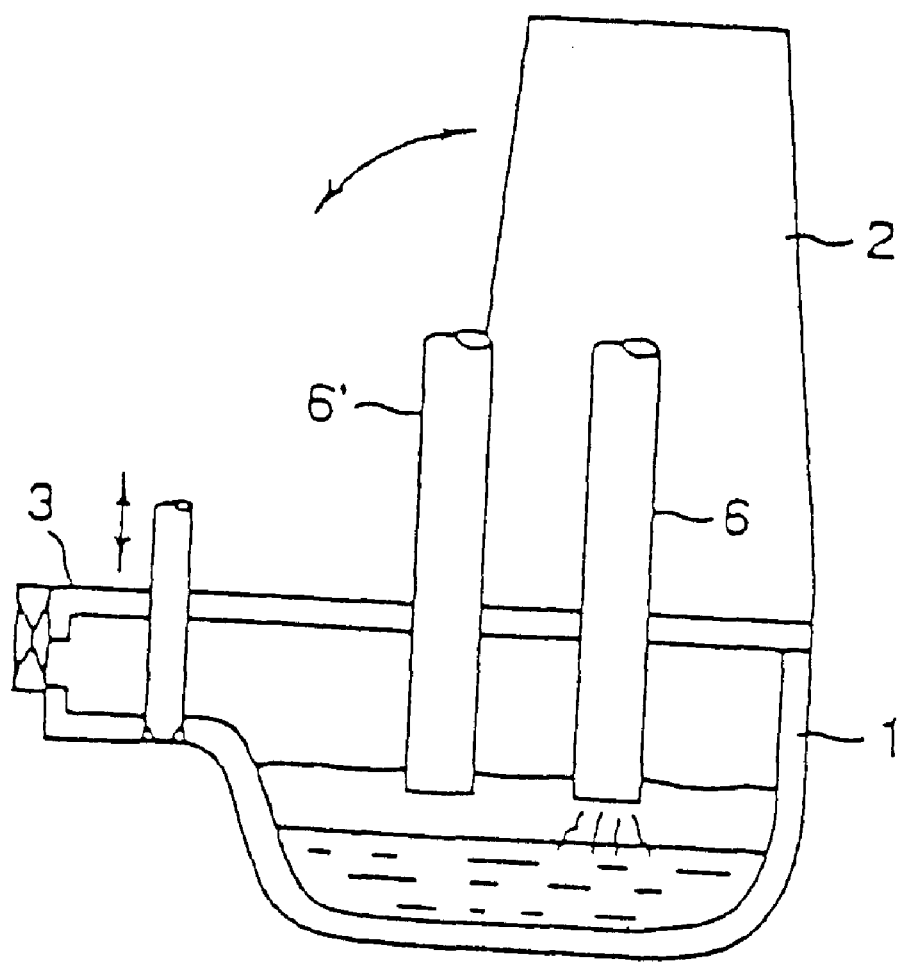
FIG. 6 is a sectional view showing a modified example of the arc-melting apparatus, shown in FIG. 1 or FIG. 5.

Instead of moving the arc electrode 6 in this manner, as shown in FIG. 6, another arc electrode 6' is installed and when the melting furnace 1 is tilted, by generating the arc from the arc electrode 6' the arc can be effectively fed.

In the manner of the foregoing, the melting progresses. When a predetermined amount of the molten iron is accumulated in the furnace, the melting furnace 1 is tilted to make small the area where the molten iron contacts with the scraps. After the molten iron is superheated by arc heat for a certain time, while the scraps S are maintained continuously in the melting furnace 1 and in the preheat shaft 2 by further tilting the melting furnace 1, the stopper 16 which has closed the tapping hole 15 is moved upward to open the tapping hole 15. And then one charge of molten iron is tapped through the tapping hole 15 into a ladle.

When the scraps are melted in this manner, since the preheat shaft 2 is not equipped with a scrap carry and supply equipment such as a pusher or a finger, the preheat shaft 2 can have the oxygen amount increased to a greater extent than in conventional melting equipment equipped with these facilities whereby the temperature of the exhaust gas can be elevated. The melting equipment of the present invention can, therefore, preheat the scraps to higher temperature than is preheated in conventional melting equipment.

In case that the scraps S are fed to the preheat shaft 2 so that the scraps S are continuously maintained in the melting furnace 1 and the preheat shaft 2 and when one charge or more of molten iron are produced in the melting furnace to also tap the molten iron, the scraps are continuously maintained in the melting furnace 1 and the preheat shaft 2 and for this reason, efficiency of preheating the scraps by exhaust gas is high. In this case, by realizing that the scraps of 40% or more of one charge are maintained in the melting furnace 1 and in the preheat shaft 2, the efficiency of preheating becomes extremely high.

Figure 7:
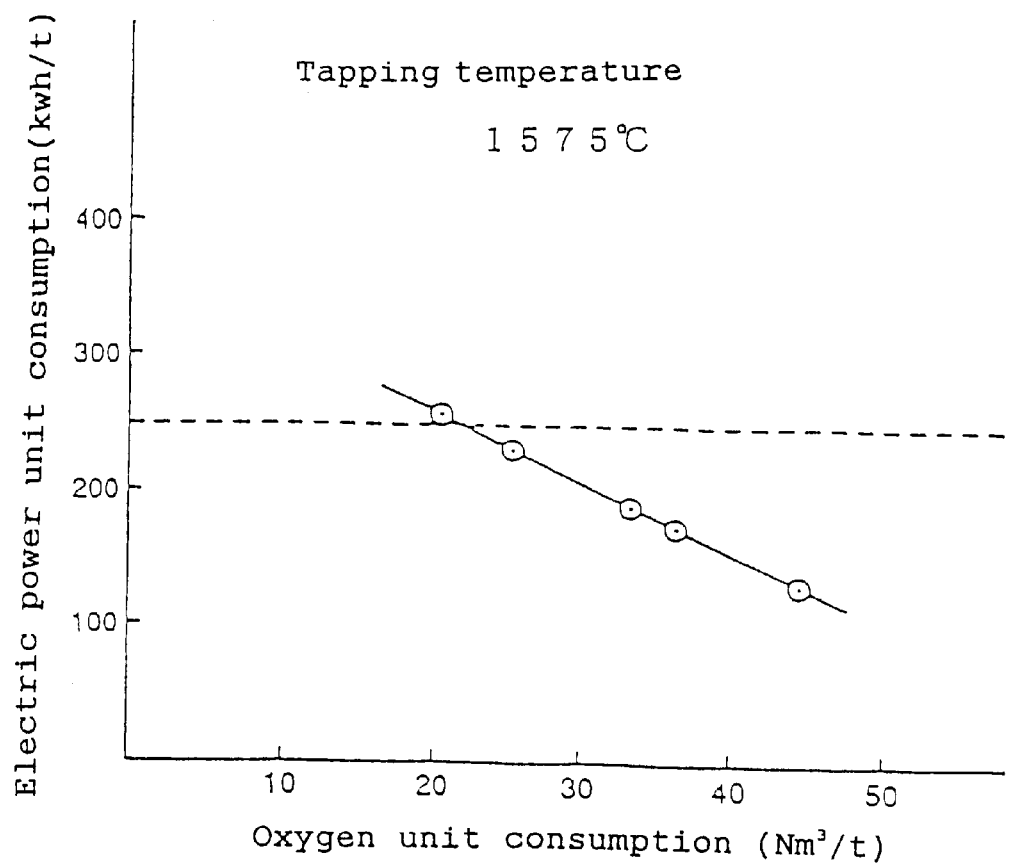
FIG. 7 is a graph showing the relation of an oxygen unit requirement and an electric power unit requirement, when an operation is performed, using the apparatus of the present invention.

In addition, from a view point of melting scraps efficiently supplementary heat source such as coke is preferably used, by feeding oxygen through the lance 12a (FIG. 3) as well as injecting coke as supplementary heat source through the above described lance 12b CO gas is generated in the melting furnace 1 and heat can be produced. In this case feed amount of oxygen is preferably 25 $Nm^3/t$ or more. Thanks to this scraps can be melted more efficiently. The feed amount of oxygen is more preferably 40 $Nm^3/t$ or more. FIG. 7 shows electric power unit consumption in a melting furnace of an embodiment described later when oxygen unit consumption is 15~45 $Nm^3/t$. As accompanied by increase of the oxygen unit consumption, the electric power unit consumption decreases as shown in FIG. 7, and if the oxygen unit consumption is in particular 25 $Nm^3/t$ or more, the electric unit consumption is so extremely low as to be 200 KWh or less. Furthermore if the oxygen unit consumption is 40 $Nm^3/t$ or more, the electric unit consumption is about 120 KWh or less, which is a furthermore low value.

Since as described above, according to the above described embodiment facilities such as a pusher or a plunger are not necessary, temperature of the exhaust gas can be elevated and since the scraps S can continuously be maintained in the melting furnace 1 and in the preheating shaft 2, the efficiency of melting the scraps is extremely high. In addition, since the area which the scraps S as iron source contact with the molten iron in which the scraps S are melted can be made small, the molten iron can be super heated and it is possible to solve the problem which result when the temperature of the molten iron being tapped, is low.

Figure 8:
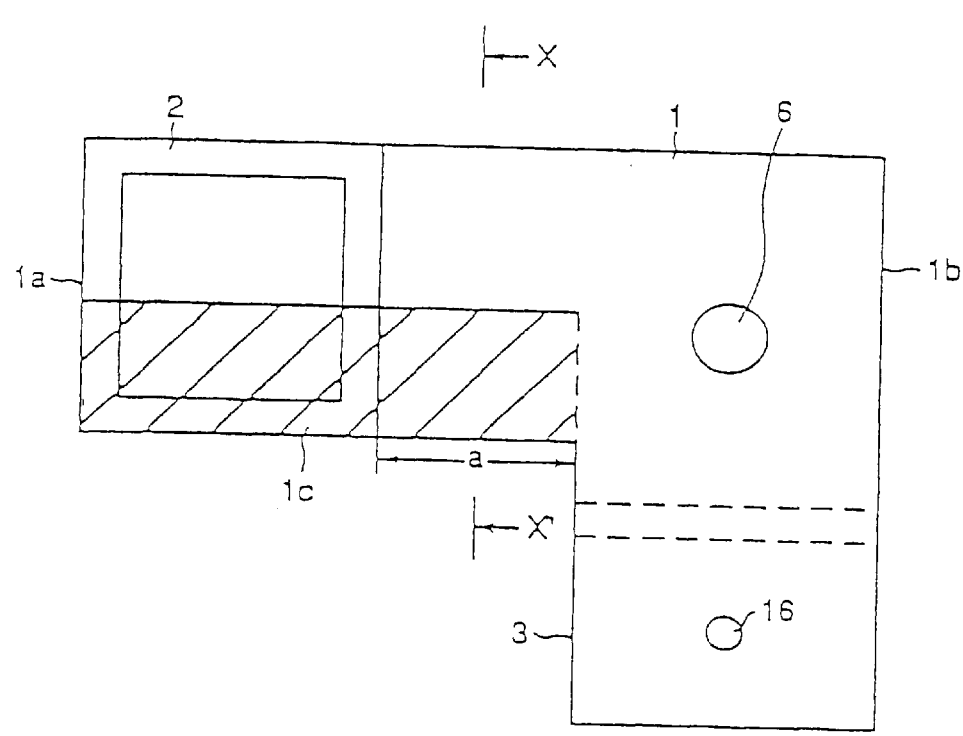
FIG. 8a shows a plan view and FIG. 8b a sectional view showing an arc-melting apparatus, having a tilting portion at the bottom of the second embodiment of the present invention.
Figure 8:
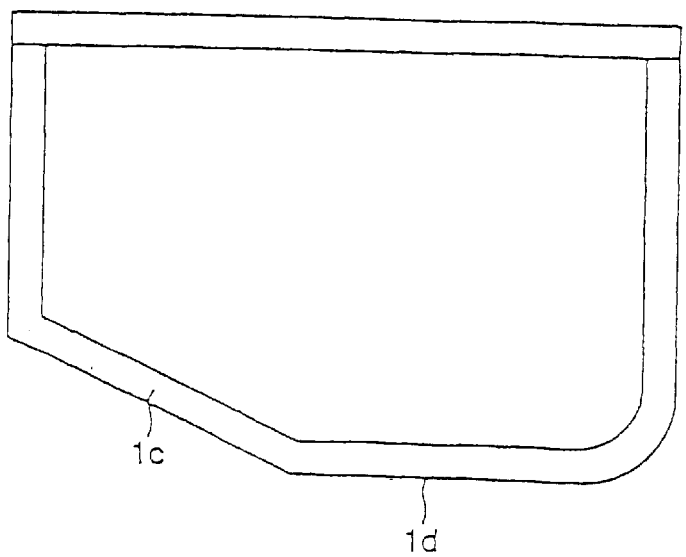

Subsequently the second embodiment will be described with reference to FIG. 8 through FIG. 10. FIG. 8(a) is a plan view showing an arc-melting equipment relating to the second embodiment of the present invention. FIG. 8(b) is a sectional view taken on line X–X' of FIG. 8(a).

According to this embodiment as shown in FIGS. 8(a) and 8(b), a portion corresponding to the preheat shaft of the melting chamber and a part of a bottom of a portion corresponding to the separating distance portion, constitute a slant portion 1c, which locates slantwise at a higher position gradually from the position of 1d (the deepest position at a bottom of a portion 1b). In this case, the bottom (1d) moves higher toward the tilting direction, when the furnace tilts. The tapping portion 3 is placed in the slant portion (1c) in the melting chamber. Therefore, the tapping portion (15) moves toward the deepest position, when the furnace is tilting.

Figure 9:
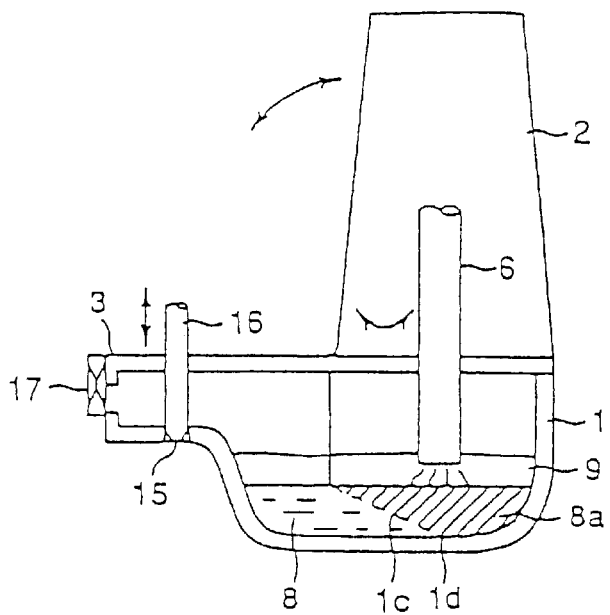
FIG. 9 is a sectional view showing an arc-melting apparatus, relating to the second embodiment of the present invention.
Figure 10:
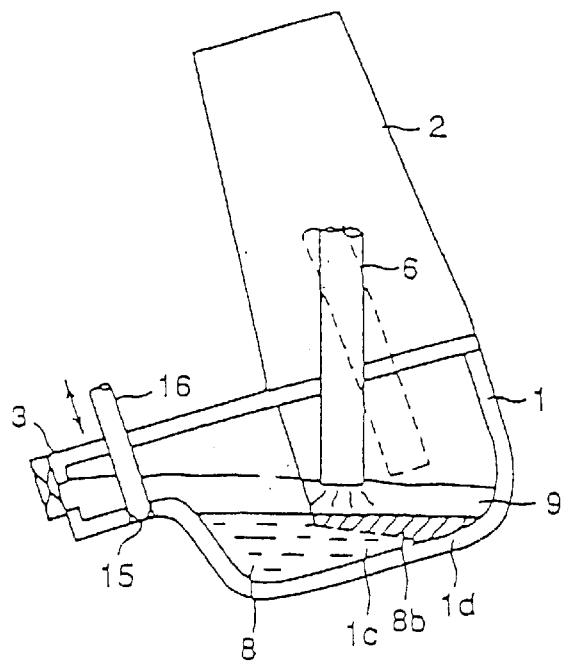
FIG. 10 is a sectional view showing a state of tilting the arc-melting apparatus, relating to the second embodiment of the present invention.

As shown in FIG. 9 and FIG. 10, by tilting the melting furnace 1, the area where scraps contact with molten iron 8 turns from the slant line portion 8a of FIG. 9 to the slant line portion of FIG. 10. And due to the existence of the slant portion 1c, the area where the scraps contact with the molten iron 8, becomes remarkably smaller than that of the first embodiment. Super heat (ΔT) of the molten iron can, therefore, be increased, as compared with the first embodiment. And it is possible to more effectively avoid the problem that occur when the temperature of the molten metal being tapped is low. After overheating is carried out in this manner, the operation is the same as in the first embodiment. Thus, the scraps S are continuously maintained in the melting furnace 1 and the preheat shaft 2 by further tilting the melting furnace 1, the stopper 16 which has closed the tapping hole 15 is moved upward to open the tapping hole 15. And then one charge of molten iron is tapped through the tapping hole 15 into a ladle.

Figure 11:
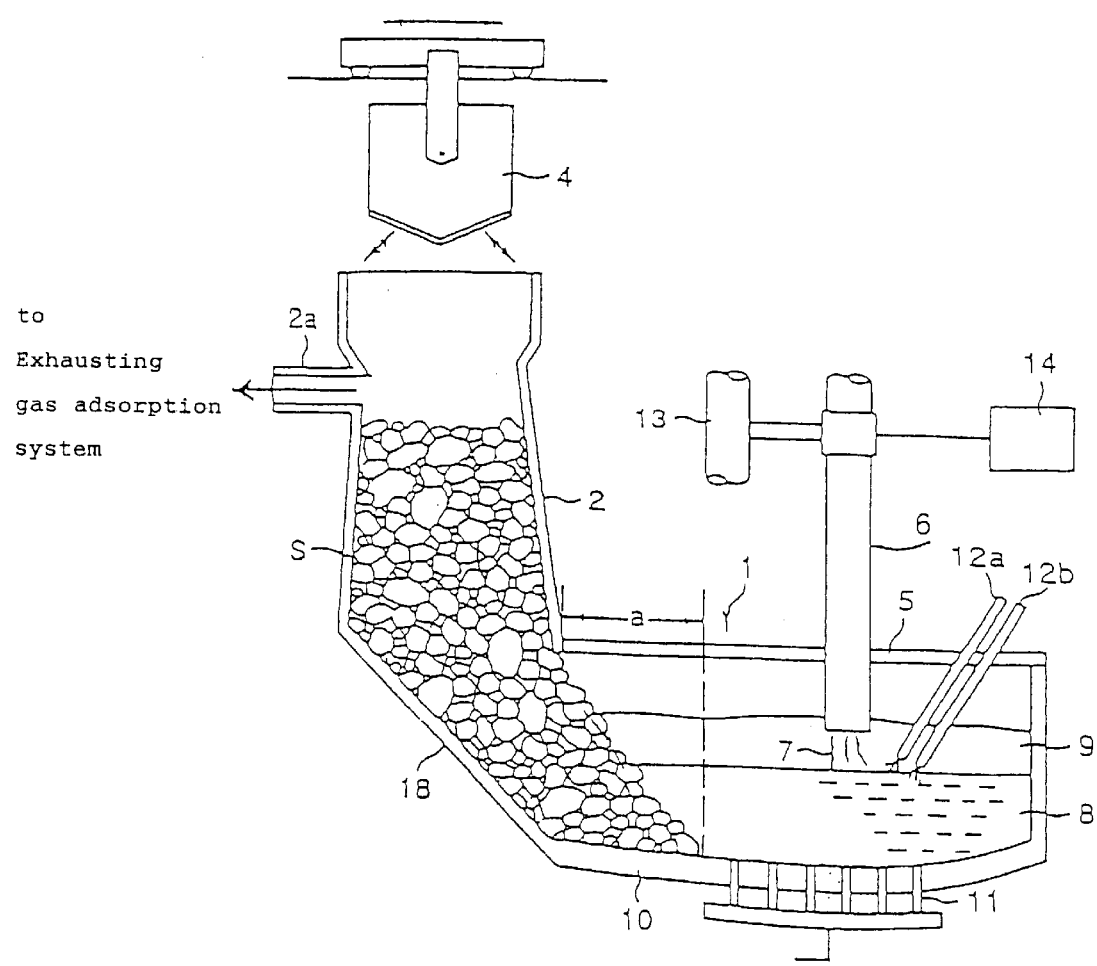
FIG. 11 is a sectional view showing a modified example of an arc-melting apparatus of the present invention.

It should be noted that the arc-melting equipment can be constituted as shown in FIG. 11. According to the arc-melting equipment of FIG. 11, a portion directly under the preheating shaft 2 forms a slant portion 18 which slants toward a bottom portion of an separation distance a. By providing the slant portion 18 in this manner, following the melting of the scraps S in contact with the molten iron 8 the scraps S can be fed more smoothly from the preheat shaft 2 to the separating distance portion a.

The present invention is not limited to the above described embodiment but can be variably modified. In the above described embodiment, for example, the tapping portion 3 is arranged facing so as to make a right angle with the direction wherein the scraps flow in facing from a side 1a of the preheat shaft of the melting furnace 1 to the opposite side 1b. It is, however, not limited to the embodiment, and any direction will do so long as the direction is other than the direction wherein the scraps flow in. If the direction is other than the direction wherein the scraps flow in, the effect of preventing the scraps from flowing out to the tapping portion can be obtained.

In addition, the embodiment gives an example wherein scraps are used as iron source to produce molten iron, but other iron source such as direct reduced iron is also applicable. It is, of course, applicable to equipment which produces molten iron in addition to molten iron. In the above described embodiment, an example wherein an arc electrode is tilted to melt scraps, is shown. However, the arc electrode is not always limited to tilting, but any movement means thereof can be available.

Figure 32:
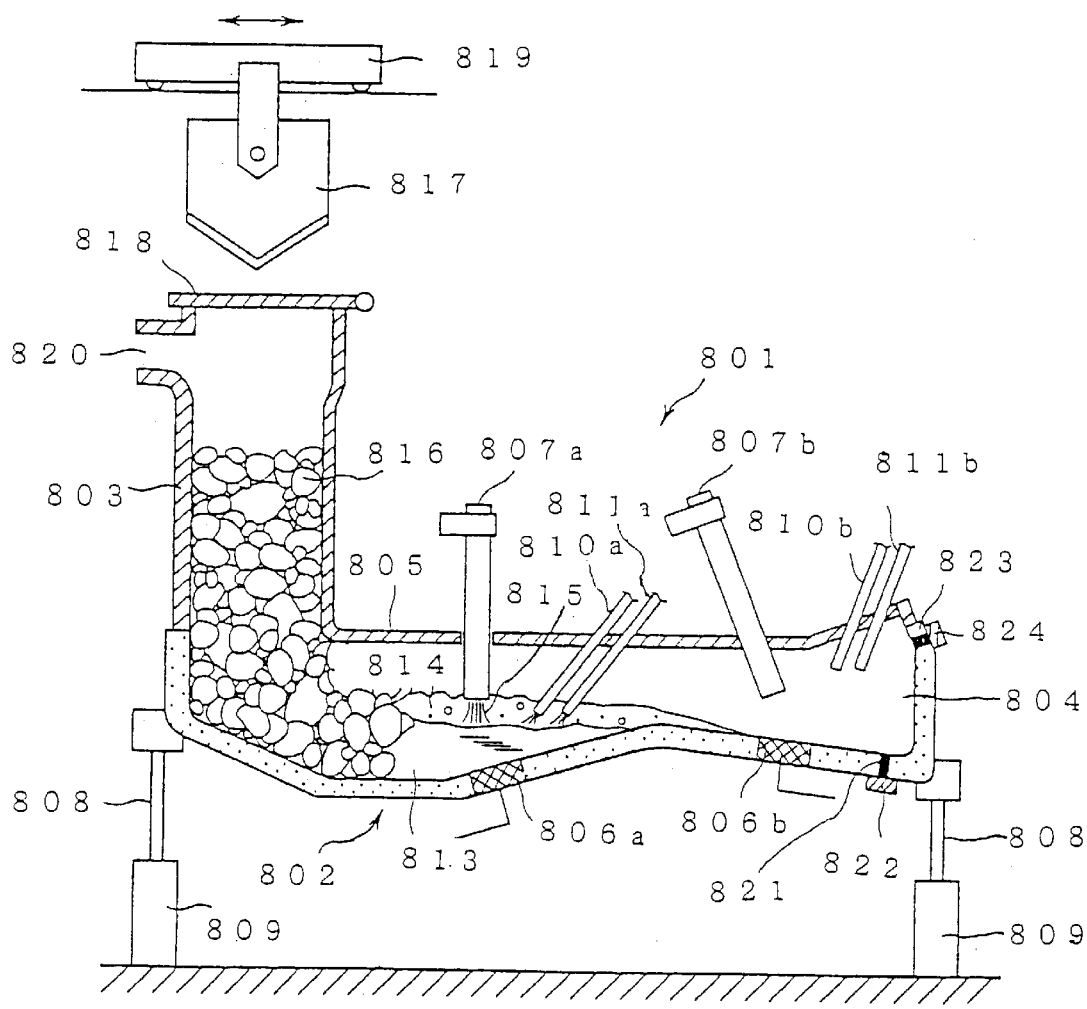
FIG. 32 is a longitudinally schematic view of an arc-melting equipment, which shows another embodiment (a melting furnace and a melting method) relating to an embodiment of the present invention.
Figure 33:
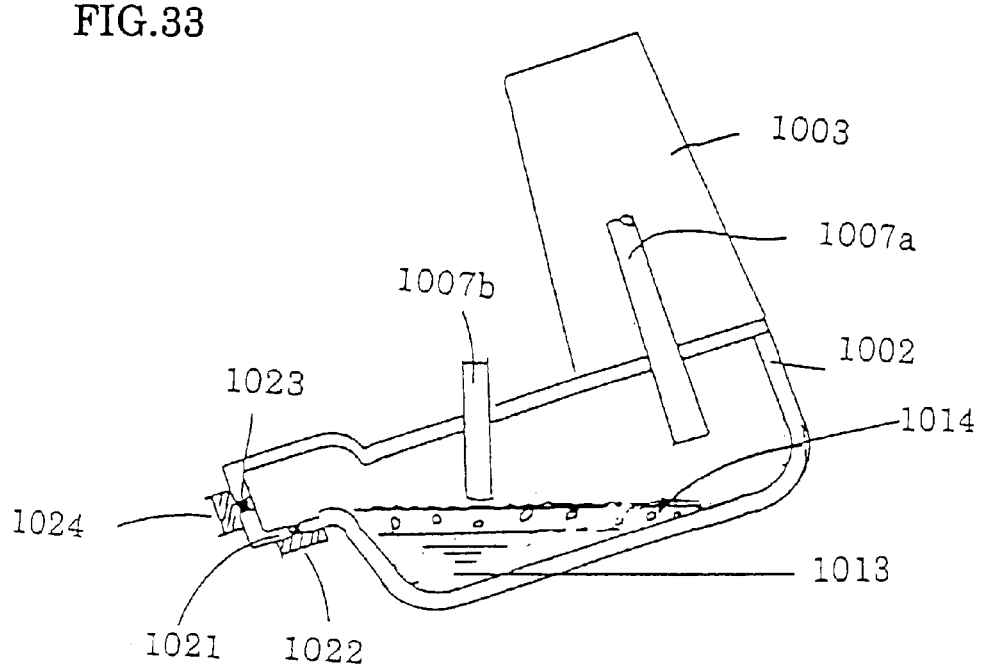
FIG. 33 is a longitudinally schematic view of an arc-melting equipment showing state of tilting a melting furnace among other embodiments relating to an embodiment of the present invention.
Figure 34:
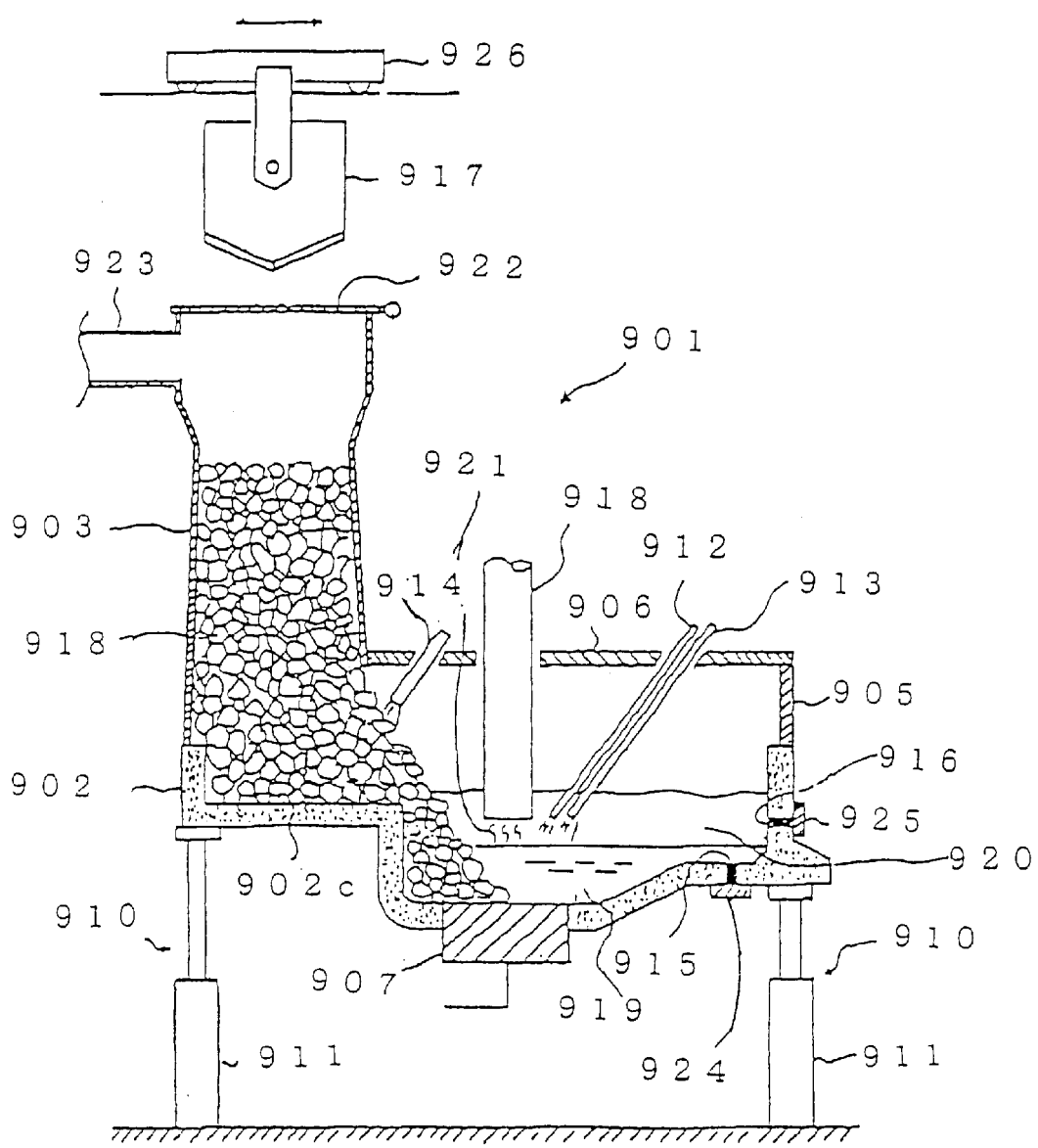
FIG. 34 is a longitudinally schematic view of an arc-melting equipment, which shows another embodiment relating to an embodiment of the present invention.

Furthermore, as an apparatus for completely separating molten iron and scraps during tapping or a method thereof such a practical embodiment as given in the following can be employed. That is to say, a method as shown in FIG. 32 is raised wherein a temperature-rise chamber is arranged on the opposite side of a preheat chamber putting a melting chamber between the temperature rise chamber and the preheat chamber, the melting chamber is tilted at the time when a predetermined amount of molten iron accumulates in the melting chamber and the molten iron is led to the temperature-rise chamber to completely separate the molten iron and cold iron source in the melting chamber. Furthermore as shown in FIG. 1, there is a method wherein the temperature rise chamber is arranged in the direction different from the direction to which cold iron source from the preheat shaft is fed, the melting chamber is tilted as shown in FIG. 33 at the time when a predetermined amount of molten iron is accumulated in the melting chamber and the molten iron is led to the temperature-rise chamber to completely separate the molten iron and cold iron source in the melting chamber. Still furthermore, as shown in FIG. 34 a bottom-up portion is arranged at a bottom portion of a side of a melting chamber, molten iron is elevated in temperature before the molten iron surface arrives at the bottom-up portion of the melting chamber and the molten iron is tapped.

The reference numerals of FIG. 32 are described below.

802: a melting chamber; 803: a preheat chamber; 807a: an upper electrode for arc generation in the melting chamber; 807b: an upper electrode for arc generation in the temperature-rise chamber; 810a and 810b: lances for feeding oxygen; and 811a and 811b: a device for blowing coke in.

The reference numerals of FIG. 33 are described below.

1007a and 1007b: an electrode for arc generation;, 1014: slag; 1014: molten iron; and 1022: a tapping hole.

Subsequently referential numerals of FIG. 34 are described below.

902c: a bottom-up portion; 903: a preheat chamber; 905 a furnace wall; 906: a furnace cover; 907: furnace bottom electrodes; 908: an upper electrode; 910: a tilting device; 912: a lance for blowing oxygen in; 913: a lance for blowing carbonaceous material in; 914: a burner; 915: a tapping hole; 917: supply bucket; 918: cold iron source; 920: molten slag; and 921: an arc.

In the second embodiment, one example is shown, wherein a slant portion is composed of two sorts of the portions, one corresponds to the preheating shaft of the melting chamber and the other is a part of the bottom corresponding to an separation distance portion. The whole part of the above described bottom portion, however, may be the slant portion. In the above described embodiment, an example wherein scraps are used as iron source to produce molten iron is shown, but it is applicable to apparatus, wherein cold pig iron is used as iron source to produce molten iron.

Embodiment 1

Scraps of 150 ton were charged into a melting furnace of a direct current arc apparatus as shown in FIG. 1 through FIG. 15, wherein a melting furnace (length: 8.5 m; width: 3 m; height: 4 m) is directly connected to a preheating shaft (3 m W×3 m D) and an arc was formed in the melting furnace by a graphite electrode of 28 inches with maximum electric power source capacity of 600 V, 100 kA to melt the scraps. In addition, a water cooled lance was inserted through a working entrance placed at a furnace side wall and oxygen of 6000 Nm$^3$/hr was fed there-through. When molten iron accumulated in the furnace, coke was injected at a rate of 80 kg/min into slag to start the slag forming operation and the top end of the graphite electrode was buried in the forming slag. Voltage at this time was set to 400 V. If the scraps in the preheating shaft descended following melt of the scraps in the melting furnace, additional scraps were fed from an upper part of the preheating shaft by the bucket 4 for charging scraps to keep a level of the scraps at a certain height in the preheating shaft.

In this manner, the melting was promoted in a state that the scraps were continuously maintained in the melting furnace and in the preheating shaft. At a stage where 180 tons of molten iron was totally produced in the melting furnace, the melting furnace was tilted on the tapping portion side at 15 degrees, a contact area of the molten iron and the scraps was reduced to allow superheating of the molten iron above its heating point and furthermore the melting furnace was tilted. And 120 tons of molten metal was tapped through a tapping hole into a ladle, leaving 60 tons in the furnace. Temperature of the molten iron at the time of tapping was 1575° C. Carbon concentration in the molten iron was 0.1%.

After 120 tons of molten iron was tapped, the melting furnace was returned to the state before the tapping. While oxygen feed and the coke injection were being carried out, slag forming operation was performed and the melting was continued. When the molten iron in the melting furnace amounted again to 180 ton, the melting furnace was tilted again to superheat the molten iron and tapping of 120 ton of the molten iron was repeated. Molten iron of 120 ton was obtained for time of between tapping of about 40 minutes on average. Electric power unit consumption of 175 kWh was obtained by using an oxygen amount of 33 Nm$^3$/t and coke unit consumption of 26 kg/t.

The 120 tons of the molten iron which was tapped, was elevated to a temperature of 1620° C. by a ladle furnace (LF), and was continuously cast to produce a billet of 175×175 mm. Electric power unit consumption of LF was 45 kWh/t on average.

On the other hand, with regard to Comparative example (similar to Prior Art 3) which was melted in a single batch, using the same equipment, without feeding scraps continuously, electric power unit consumption was also investigated.

These results were shown in Table 1. As shown in Table 1, Example 1, wherein oxygen was continuously fed on condition that oxygen consumption is substantially equal, showed electric power unit consumption reduced by about 140 kWh from the consumption of the Comparative example, and less by about 125 kWh, even if electric power unit consumption which is necessary for LF, is included. In addition, even if compared with reported examples of other process which conventional art showed, the present invention shows that the electric power unit consumption which is necessary, without considering LF, is less by 50 kWh/t and thus it has been confirmed that preheat efficiency of scraps according to the present example is very high.

Embodiment 2

Melting similar to Example 1 was carried out in the above described melting furnace except that oxygen amount was 45 Nm$^3$/t and coke unit consumption was 36 kg/t. The results were also shown in Table 1. Electric power unit consumption in this case was extremely low to show 135 kWh, and molten iron having 1575° C. on average was obtained for time of tap to tap of about 37 minutes.

Embodiment 3

Melting was carried out under conditions similar to that of the above described Example 1 using a melting furnace and a preheating shaft of a direct arc apparatus, wherein there is a portion corresponding to a preheating shaft of a melting furnace as shown in FIG. 8, FIG. 9 and FIG. 10 a melting furnace (length: 8.5 m; width: 3 m; height: 4 m) directly connected to the preheat shaft (3 m W×3 m D) and a half part of a bottom portion of a portion corresponding to an separating distance portion have a slant surface for example of 15 degrees.

As the results, as shown in Table 1 the tapping temperature in this case was 1600° C. higher than the temperatures of Example 1 and Example 2. Electric power unit consumption of 188 kWh was obtained by oxygen amount of 33 Nm$^3$/t and coke unit consumption of 26 kg/t, and electric power unit consumption of LF was 30 kWh/t on average.

Embodiment 4

Melting similar to Example 3 was carried out in the above described melting furnace except that oxygen amount was 45 Nm$^3$/t and coke unit consumption was 36 kg/t. The results were also shown in Table 1. Electric power unit consumption in this case was extremely low to show 148 kWh, and molten iron having 1600° C. on average was obtained for time of tap to tap of about 37 minutes.

TABLE 1

| Operation method | Example 1 The present invention | Example 2 The present invention | Example 3 The present invention | Example 4 The present invention | Comparative Example Batch Operation |
|---|---|---|---|---|---|
| Oxygin unit consumption (Nm3/t) | 33 | 45 | 33 | 45 | 33 |
| Coke unit consumptin (kg/t) | 26 | 36 | 26 | 36 | 26 |
| Tappig temperature (° C.) | 1575 | 1575 | 1600 | 1600 | 1620 |

TABLE 1-continued

| Operation method | Example 1 The present invention | Example 2 The present invention | Example 3 The present invention | Example 4 The present invention | Comparative Example Batch Operation |
|---|---|---|---|---|---|
| Electric power unit consumption (kWh/t) | 175 | 135 | 188 | 148 | 315 |
| LF unit consumption (kWh/t) | 45 | 45 | 35 | 35 | 30 |
| Total power unit consumption (kWh/t) | 220 | 180 | 223 | 183 | 345 |

Figure 12:
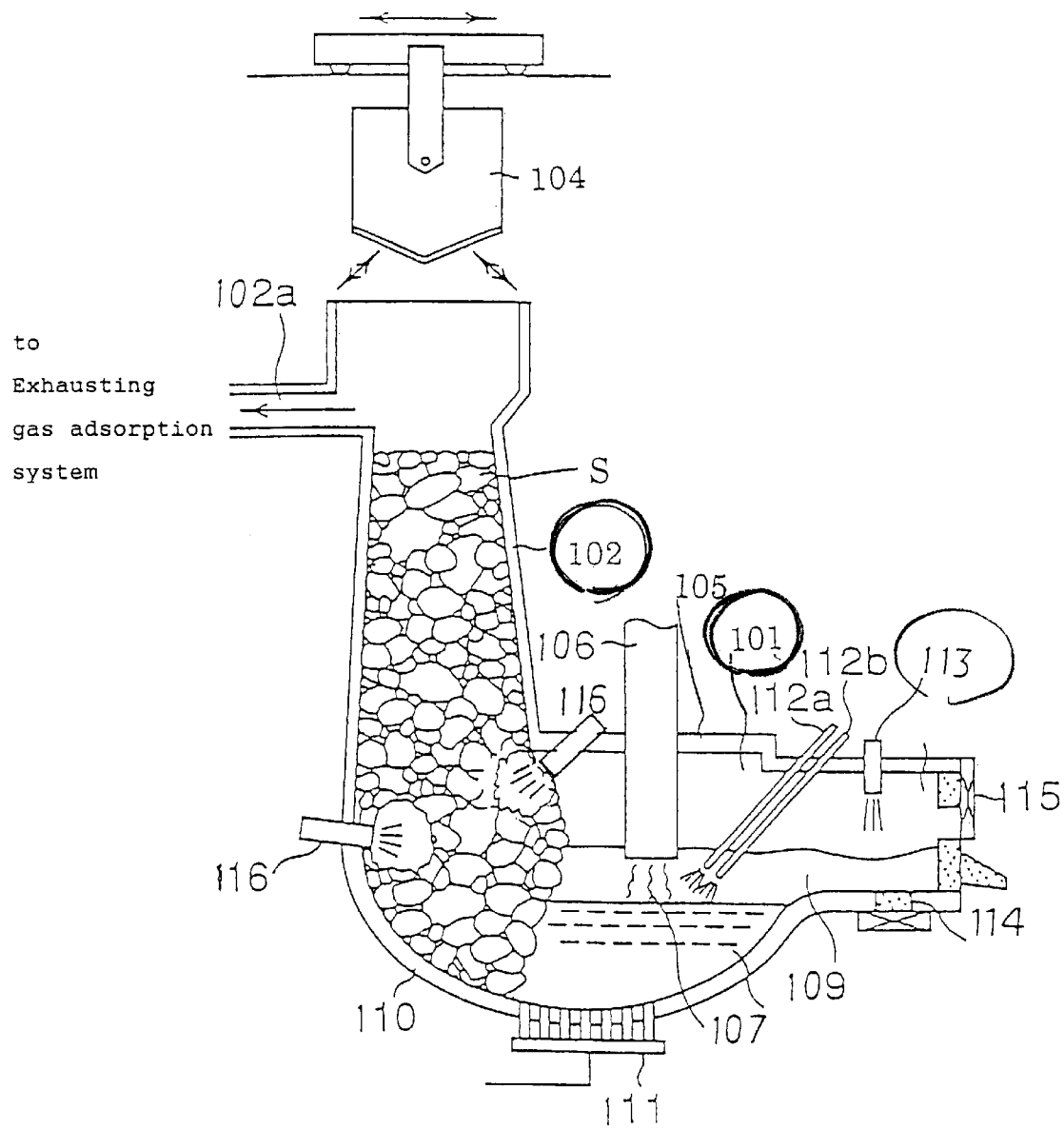
FIG. 12 is a sectional view showing an arc-melting apparatus, having an oxygen feeding device, relating to an embodiment of the present invention.

Now subsequently another embodiment of the present invention will be described with reference to FIG. 12 through FIG. 15. FIG. 12 is a sectional view showing an arc-melting apparatus relating to an embodiment of the present invention. This arc-melting apparatus is equipped with a material furnace 101 for arc-melting a cold iron source, and a preheating shaft 102 directly connected to an upper portion of the melting furnace. An exhausting portion 102a, which is connected to an exhaust gas adsorption system, is placed at an upper end of the preheating shaft 102. Iron scraps 103 as cold iron source are charged into the preheat shaft 102.

Two lances 112a, 112b are inserted turning their top ends into surface of molten iron bath in the melting furnace 101, oxygen being supplied through the lance 12a and coke as supplementary heat source being injected through lance 112b. It should be, however, noted that as supplementary heat source carbonaceous material other than the coke may be also used.

A tapping hole 114 is formed at a bottom portion of a projecting portion 101a arranged at a portion different from a side where the preheat shaft 102 of the melting furnace 101 is directly connected, and at a side end of the tapping hole a slag door 115 is placed. It should be, however, noted that the tapping hole may be placed on the same peripheral surface with the slag door 115. Into the projecting portion 101a, a burner 113 is inserted from above the projecting portion, where it is possible to elevate the temperature of molten iron which is tapped. In this case, heating means such as an arc electrode or the like can be installed instead of the burner 113.

As shown FIG. 12, a side wall of the preheating shaft 102 has a taper which extends downward. By forming such taper high temperature, the scraps can be steadily supplied into molten iron 108 in the melting furnace 101. In case that the taper is not formed, the scraps 103 do not slide freely over the wall portion of the preheat shaft 102 so much that the scraps do not fall under their own weight, which causes hanged up of the scraps.

Figure 13:
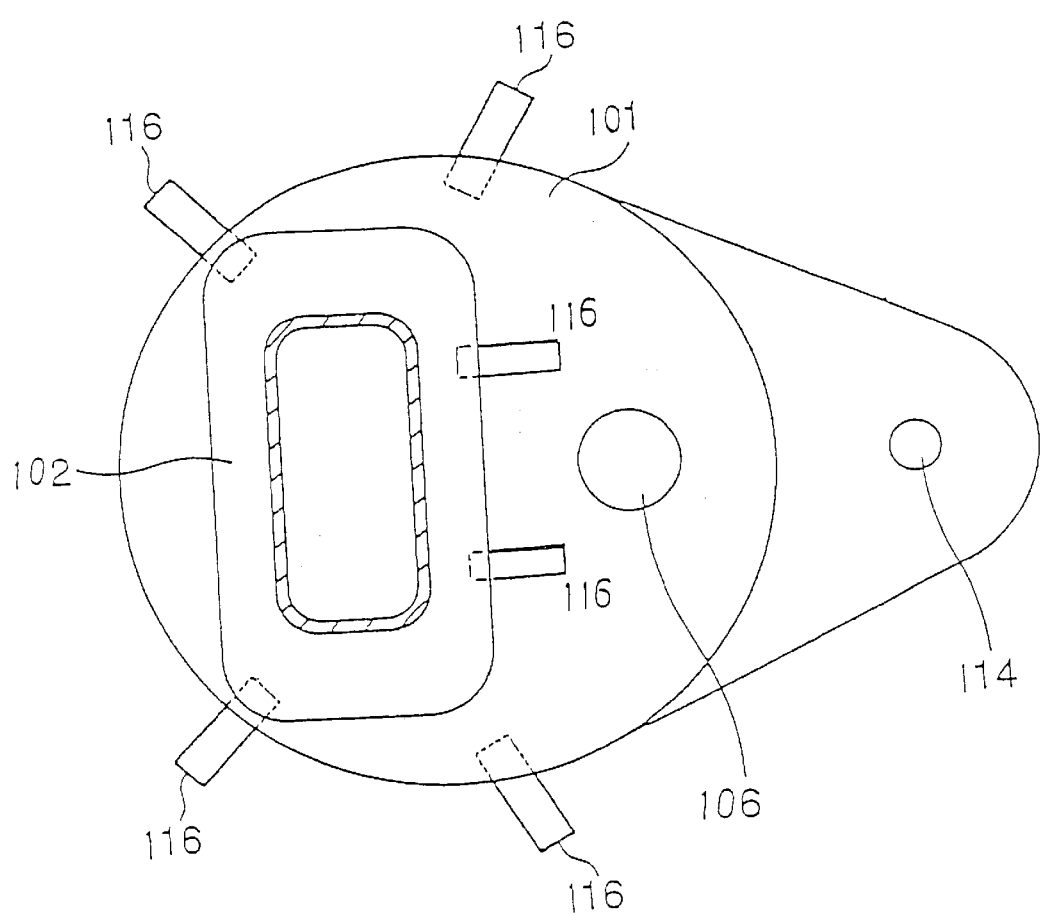
FIG. 13 is a plan view showing an arc-melting apparatus, having an oxygen feeding device relating to an embodiment of the present invention.

Oxygen supplying devices 116 for supplying oxygen to the scraps 103, are located at a lower portion of the shaft 102 in the melting furnace 101. And in the vicinity of the devices, the scraps are fulfilled. As shown in FIG. 13, six of these supplying devices are installed, and by supplying oxygen therefrom to the scraps 103, the scraps can be cut off into smaller size, simultaneously with being melted. By cutting off the scraps 103, simultaneously with melting in this manner, state of hanging up is prevented more effectively.

It should be noted that in case where oxygen is supplied through the oxygen supply devices 116 the oxygen gas may be supplied alone or other gas may be mixed with the oxygen gas. Oxygen compound gas may be used so long as it will support combustion.

Figure 14:
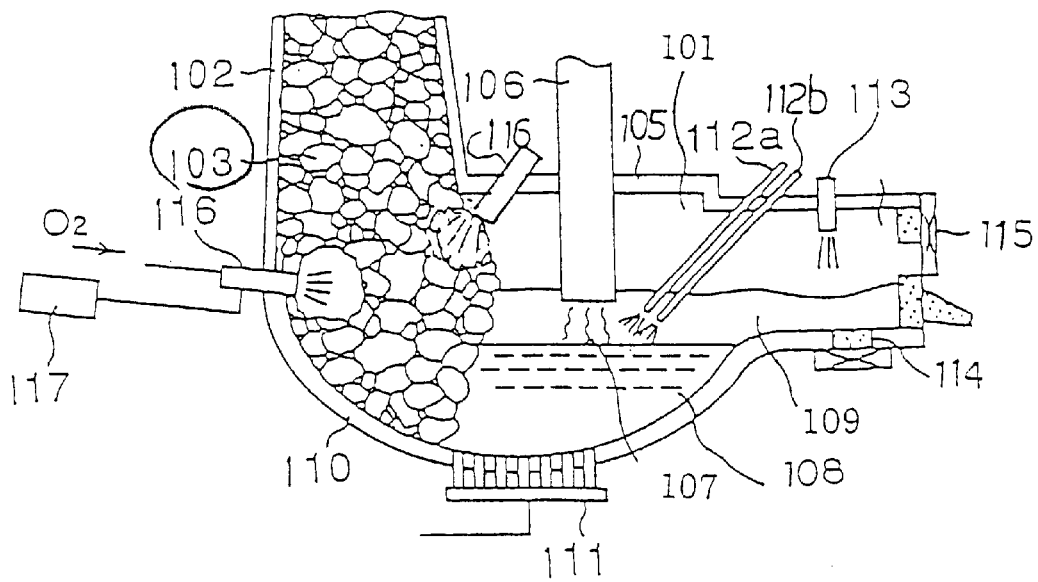
FIG. 14 is a sectional view showing an essentials portion of an arc-melting apparatus equipped with a fuel feeding device, in addition to an oxygen feeding device relating to an embodiment of the present invention.

In addition, as shown in FIG. 14, a fuel supply device 117 for supplying fuel such as oil and gas can be installed together with the oxygen supply devices. By supplying fuel in this manner, the scraps 103 can be more easily cut off by being melted.

When the iron scraps are melted in the melting equipment constituted in this manner, the scraps 103 are firstly charged into the melting furnace 101 and the preheat shaft 102 to form a combustion, whereby the iron scraps 103 are continuously maintained in the melting furnace and in the preheat shaft 102.

In this state an arc 107 is formed by an arc electrode 106, the iron scraps 103 are melted and simultaneously the oxygen is supplied from the oxygen supply devices 116 to cut off the scraps 103 by melting.

In case that the fuel supply device 117 is installed, the fuel such as oil is supplied together with the oxygen. In case that the oxygen is supplied to the scraps 103 in this manner, the scraps 103 are preheated by the burning fuel to high temperature, whereby the scraps 103 are cut off by melting. Owing to this, even if the scraps 103 pile at a portion thereof which remain as not yet melted in a lower portion of the preheating shaft 102, since the scraps are cut off, hanging-up can be prevented. Although as described above, by forming the taper on the preheating shaft 102, hanging-up is reduced. Some hanging-up of scraps in the preheating shaft occurs to some extent of frequency. Since the scraps 103 at a lower part of the preheating shaft 102 are cut off in this manner, hanging-up is almost completely prevented from being caused by the piling of the scraps at the not yet melted portion thereof.

At the time of melting the scraps 103 by the arc 107, the oxygen is supplied through the lance 112a into the furnace to assist the scraps 103 to be melted. When molten iron is accumulated in the furnace, coke is injected as supplementary heat source through the lance 112b into slag continue the slag forming operation and a top end of the electrode 106 is buried in slag 109 so that the arc 107 is formed in the slag 109. This coke which has been injected as supplementary heat source reacts with the oxygen which has separately been supplied to generate CO gas and simultaneously the reaction heat contributes to melting the scraps 103.

In addition the oxygen which has been supplied through the oxygen supply devices 116 reacts with iron to form FeO, and this FeO is also reduced by coke which has been supplied through the lance 112b.

Melting of the scraps progresses and when the molten iron of for example one charge or more is accumulated in the furnace, the furnace is tilted to elevate the temperature for a predetermined time. And while the scraps are continuously maintained in the melting furnace 101 and the preheating shaft 102, the melting furnace 101 is tilted to tap the molten iron of one charge from the tapping hole 114 into a ladle or the like. At the time of the tapping, in order to prevent the tapping hole 114 from being blocked by solidification of the molten iron, the molten iron may be heated by the burner 113.

As described above, from a standpoint of melting the scraps efficiently, it is preferable to use supplementary heat source such as coke and by supplying oxygen through the different lance 112a as well as injecting coke as supplementary heat source through the above described lance 112b CO gas is generated to be able to produce heat. In this case total amount of oxygen which is supplied from the lance 112a and the oxygen supply device 116 is preferably 25 $Nm^3/t$ or more. Owing to this, the scraps can be more efficiently melted. More preferably the total amount of oxygen is 40 $Nm^3/t$.

If the melting is performed in this manner under conditions wherein the scraps are maintained in contact with the molten iron, since temperature of the molten iron is low to be approximately 1550° C., there is the possibility that the tapping hole 114 is blocked by partial solidification of the molten iron. As described above, however, by heating the molten iron by the burner 113, such problem can be avoided. Of course, for the purpose other means for heating such as an arc electrode can be employed.

Embodiment 5

Scraps of 150 tons were charged into a melting furnace and a preheating shaft of a direct current arc apparatus, wherein the melting furnace (furnace diameter: 7.2 m; height 4 m) is directly connected to the preheating shaft (5 m W×3 m D×7 m H), and as shown in FIG. 13 oxygen, supplying devices (oxygen supplying nozzles) 116 are installed at six places and an arc was formed by a graphite electrode of 30 inches with an electric power source capacity of maximum 750V, 130 kA to melt the scraps. In addition, a water cooled lance was inserted through a working entrance placed at a furnace side wall to supply oxygen at a rate of 4000 $Nm^3/hr$ there-through. When molten iron has accumulated in the furnace, coke was injected at a rate of 80 kg/min into slag to continue the slag forming operation and the top end of the graphite electrode was buried in the forming slag. Voltage at this time was set to be 550 V. When the scraps in the preheating shaft descended the following melt of the scraps in the melting furnace, the scraps were supplied from a bucket for charging the scraps at an upper part of the preheating shaft to keep a level of the scraps at a certain height in the preheating shaft.

During this time, oxygen was supplied through the above described oxygen supplying devices (oxygen supplying nozzles) at a rate of 350~500 $Nm^3/hr$ per nozzle to the scraps at a lower part of the preheating shaft 102 to melt and cut the scraps 103. And by preventing the hanging-up of scraps in the furnace, a stable state was maintained whereby the scraps continuously fall into the molten iron.

In this manner, the melting is promoted under conditions where the scraps were continuously maintained in the melting furnace and in the preheating shaft. At a stage where 180 tons of molten iron was produced, the furnace was tilted to elevate temperature thereof by arc heating for a predetermined time. Therefore, 120 tons of molten iron was tapped from the tapping hole into a ladle, leaving 60 tons in the furnace for continuing the molten process. Temperature of the molten iron at the tapping time was 1550° C. Carbon concentration in the molten iron was 0.1%. The molten iron in the vicinity of the tapping hole was heated by an oxygen-oil burner.

Even after the molten iron of 120 tons was tapped, the melting was continued and when the molten iron amounted again to 180 tons in the melting furnace tapping the molten iron of 120 tons was repeated. The molten iron (120 tons) was obtained by time with a tap to tap time of about 40 minutes on average. Electric power unit consumption of 170 kWh/t was obtained by total oxygen amount of 33 $Nm^3/t$ from the oxygen supply nozzles and the water cooled lance and coke unit consumption of 26 kg/t.

In case that oxygen was not supplied through the oxygen supplying nozzles installed at a lower part of the preheating shaft, the scraps were piled on a portion of scraps which remained as not melted at a lower part of the preheating shaft, and the scraps did not drop in the furnace in spite of there being space on the whole surface of the scraps. The condition of so-called hanging-up continued for a long time and it resulted in stagnated melting about once per 6 charges (6 numbers of the tapping time). According to the present invention, however, by actively melting and cutting off the scraps by means of supplying oxygen through the oxygen supplying nozzles at a lower part of the preheating shaft, such a stagnation of melting did not occur.

Figure 15:
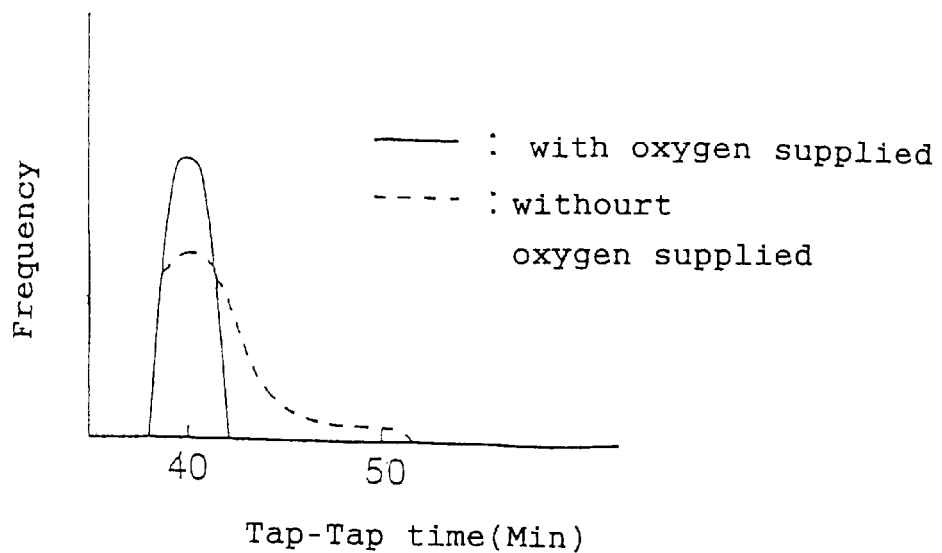
FIG. 15 is a graph showing tap-tap time depending on whether there is oxygen feed to the lower portion of the preheating shaft, relating to an embodiment of the present invention.

Tap to tap time and its frequency, which is in the case scraps were melted and cut off by supplying oxygen, compared with in the case scraps were not melted and not cut off by oxygen (in the case oxygen was supplied at a rate of 6000 $Nm^3/hr$, exclusively through a water cooled lance) are shown in FIG. 15. As seen apparently from FIG. 15, in case that oxygen was not supplied, it has been confirmed that supply of scraps was delayed and it has also been confirmed that as the results there existed charge wherein tap-tap time was long. However, in case that cutting was performed by oxygen, it has been confirmed that in any charge was taken the tap-tap time of about 40 minutes.

Figure 16:
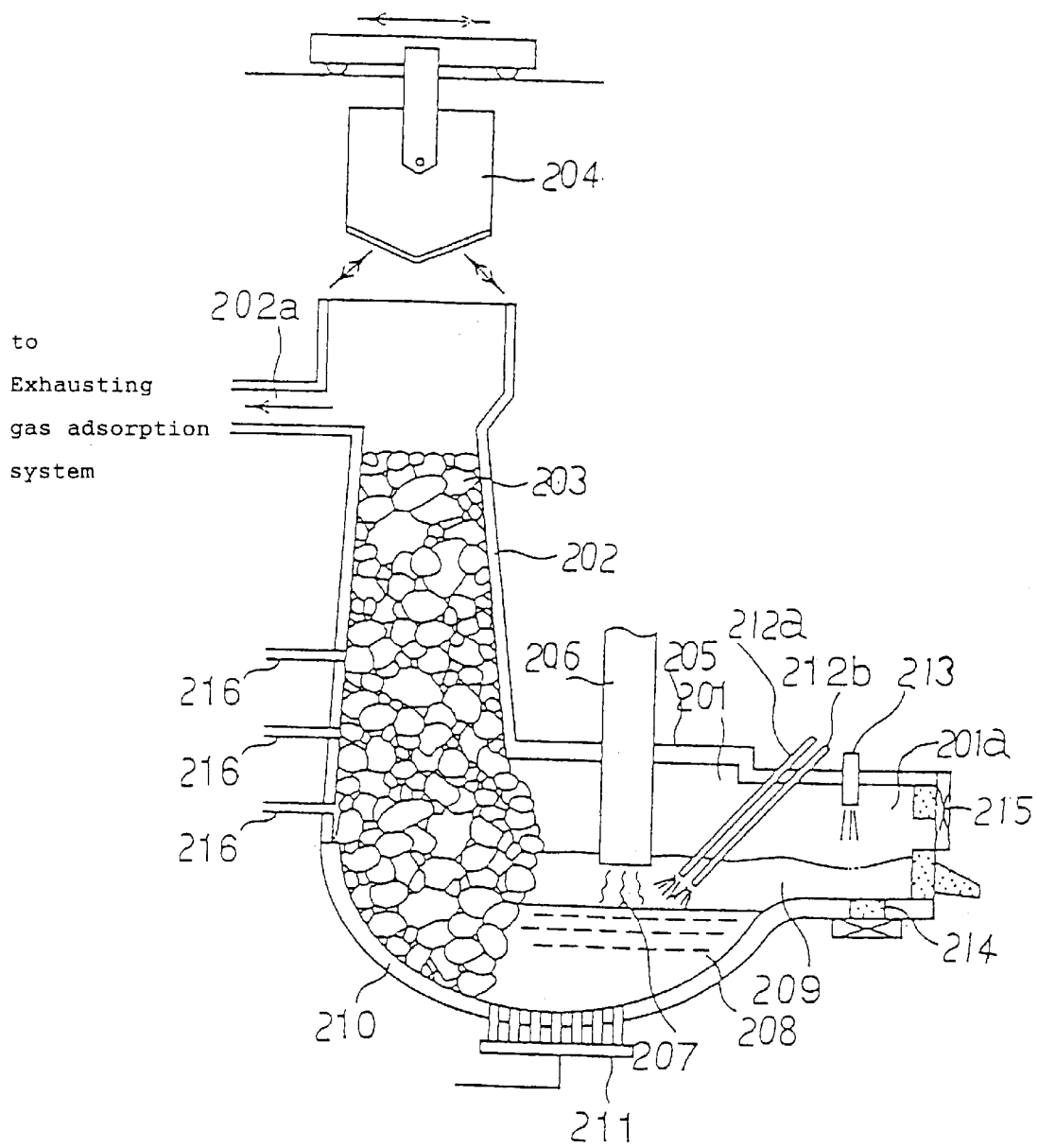
FIG. 16 is a sectional view of an arc-melting apparatus, equipped with plural stages of gas introducing holes relating to an embodiment of the present invention.

Subsequently another embodiment of the present invention will be described with reference to FIG. 16 through FIG. 18. FIG. 16 is a sectional view showing an arc-melting apparatus, which relates to an embodiment of the present invention. This arc-melting apparatus cannot always prevent the in-furnace hanging-up of scraps effectively, because the friction force of its wall surface and scraps 203 is large, when the preheating shaft is rectangular, even when a taper is given to the preheating shaft 202. In order to prevent the in-furnace hanging-up of scraps, it is preferable that the sectional shape of the preheating shaft is circular, an ellipse or a curve.

In a range from the surface position of the molten iron bath in the melting furnace 201 to an upper end position of scraps of the preheating shaft 202, plural stages (3 stages in the drawing) of gas introduction entrances 216, for supplying oxygen containing gas such as oxygen gas and air to a portion where scraps are charged, are installed. By the oxygen containing gas, which is introduced from the gas introduction entrances 216, CO gas generated in the melting furnace is made to burn.

In such a way, by installing a plurality of gas introduction entrances at arbitrary positions in the range, which is, from the surface position of the molten iron bath in the melting furnace 201 to an upper end position of scraps of the preheating shaft 202, CO gas generated from the melting furnace 201 can be made to burn at a plural of the arbitrary positions in a scraps layer in the melting furnace 201 and a scraps layer 202 in the preheating shaft 202. For example, one third of the entire combustion amount at a scraps layer in the melting furnace 201, one third thereof at a scraps layer in a lower part of the preheating shaft 2 directly above the melting furnace 1 and the rest one third thereof at a medium position between the surface of the molten iron bath in the preheating shaft 2 and the highest position of the scraps can be made to burn. Since, therefore, the whole amount of CO is not made to burn at one position, temperature of the combustion gas does not become high and the dissociation of $CO_2$ by $O_2$ took into CO is prevented. In addition, since CO is made to burn at a position which is desired, it is well controllable and it can be made to burn surely and efficiently.

Figure 17:
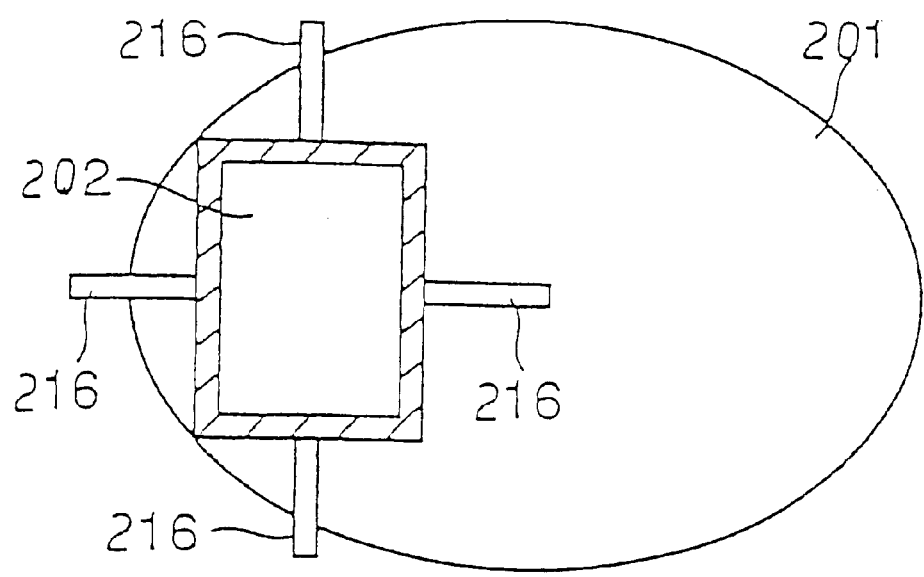
FIG. 17 is a plan view of an arc-melting apparatus, equipped with plural stages of gas introducing holes relating to an embodiment of the present invention.

As shown in FIG. 17, these gas introduction entrances 216 are placed in plurality (4 places in FIG. 17) in number in peripheral direction per one stage. Two stages or more of these gas introduction entrances are preferably formed at a position lower than 0.5 L, where L is the length or distance from the surface of the molten iron bath in the melting furnace 201 to an upper end position of cold iron source at an upper part of the shaft. If the position is higher than 0.5 L, the heat transfer time after burning is short, and the effect is small. If one stage is formed, combustible gas becomes high in temperature and there is possibility that problems that scraps are oxidized and that heat load to equipment is too high. Furthermore these gas introduction entrances exist preferably with 5 stages or less at the position lower than 0.5 L. In case that the gas introduction entrances with 6 stages or more are installed at a position lower than 5 L, reversibly distance where oxygen containing gas such as air goes into the preheat shaft is reduced, burning at a center portion of the preheat shaft 2 is delayed, gas which has not yet burnt burns at a position higher than 0.5L and efficiency is lowered.

According to the present embodiment, since a plurality of gas introduction entrances 216 are installed at arbitrary positions in a range from molten iron bath surface position in the melting furnace 1 to an upper end position of scraps of the preheating shaft 202, by blowing oxygen containing gas such air and oxygen gas through these gas introduction entrances 216, CO gas generated from the melting furnace 201 can be made to burn at plural arbitrary positions in a scraps layer in the melting furnace 201 and a scraps layer 203 in the preheating shaft 202. As opposed to the situation where CO is made to burn at one position of a scraps layer 203, using plural portion avoids that the temperature of combustible gas is too high resulting in the scraps becoming fused and in the dissociation of $CO_2$, which had been produced by burning gases in $O_2$. In addition since CO is made to burn at a position which is desired, burning is well controlled so that it can be made to burn surely and efficiently, and the heat thereof can be effectively used for preheating the scraps.

In this case, total blow amount of oxygen containing gas is preferably made so that oxygen amount in which is calculated from oxygen concentration in the total blow amount of oxygen containing gas and flow rate has the following formula(A) with respect to reaction with supplementary heat source and with respect to oxygen amount $Q(Nm^3/min)$ which is blown in the furnace to oxidize metal.

$$0.55Q \leq Q \text{ in} \leq 0.9Q \tag{A}$$

This is because if Qin is over 0.9 Q, oxygen which does not take part in burning remains along with surplus $N_2$ and results in increased drop in temperature of generated gas, thereby lowering efficiency. Furthermore, there is an increased problem of oxidation caused by the surplus oxygen, because on the other hand, if Qin less than 0.55 Q, the whole amount of generated CO cannot to be made to burn and CO which has not burnt will exist at an upper part of the shaft.

Subsequently another embodiment of the present invention will be described with reference to FIG. 16 through FIG. 19.

According to the above described embodiment, the substantially whole part of CO exhaust gas which was generated in the melting furnace 201 was made to burn by an oxygen containing gas from gas introduction entrances which were installed with plural stages at arbitrary positions in the range from molten iron bath surface position in the melting furnace 201 to an upper end position of scraps of the preheat shaft 202. According to the present embodiment, however, a slag door 215 of the melting furnace 201 is made to work as a working door for having air enter into the melting furnace 201, this working door 215 is opened during melt treatment to have air enter into the melting furnace and a part of the CO exhaust gas which has not yet burnt is made to burn in the melting furnace 201. And then the rest of the CO exhaust gas which has not yet burnt is made to burn by an oxygen containing gas from gas introduction entrances which are installed at arbitrary positions in the range from molten iron bath surface position in the melting furnace 201 to an upper end position of scraps of the preheat shaft 202.

If air is introduced into the melting furnace 201 in this manner, a part of high temperature CO gas which has been generated in the furnace burns in the entering air, but since the burning occurs in the melting furnace 201, the burning does not result in locally high temperatures in a layer of scraps which have not yet been melted and fusion of the scraps does not occur. In addition, this burning heat transfers the heat to the scrap 203 between the molten iron surface and an lower end position of the preheat shaft 202 before exhaust gas enters into the preheat shaft 202, and the burning heat lowers to temperatures where local fusion does not occur when the exhaust gas enters into the preheat shaft 202. Furthermore, since the heat of the gas transfers heat to the scraps even in the preheat shaft 202, the temperature of the exhaust gas is not high and the fusion of the scraps does not occur even in the preheat shaft 202. The scraps of that part can be efficiently preheated. And the transfer of heat of the exhaust gas to the scraps 203 is ensured in this manner so that the heat is effectively used for preheating the scraps 203.

According to the present embodiment, when a part of the CO exhaust gas burns in the entering air in the melting furnace 201, the CO gas which has not yet burnt burns in the melting furnace 1, so that OD is less than 0.7, if $CO_2/(CO_2+CO)$ is made to be OD. If the value of OD is 0.7 or more, heating value in the furnace becomes so large that damage to the furnace and fusion of scraps occur. It is more preferable that OD is less than 0.6.

In the above-mentioned way, according to the present embodiment, a part of the non-combustible CO gas is made to burn in the melting furnace 201. Therefore, compared with an embodiment, wherein there is burning at only one position of a scraps layer in this embodiment, there is no possibility that the temperature of the combustible gas will be so high as for the scraps to be fused, or for the $O_2$ to be produced by dissociation of $CO_2$, which has been produced by burning. In addition, since CO is made to burn at a position which is desired, burning is well controlled so that it can be made to burn surely and efficiently and the heat can be used effectively for preheating the scraps.

The present embodiment is different from other embodiments. As shown in FIG. 18, according to the present embodiment, a part of the CO exhaust gas has already burned in the melting furnace 201. One stage of the gas introduction entrance 216 may be satisfactory. Of course, plurality of stages of the gas introduction entrances may also be satisfactory. As in the same way as other embodiments, from a standpoint of increasing efficiency of preheating the scraps 203, it is preferable that the gas introduction entrance 216 is located preferably at a lower part.

In the case where there is one stage of gas introduction entrance 216, and where gas introduction amount is small even if there are plurality of stages of gas introduction entrances, the value of OD is preferably more than 0.3. If the value of OD is 0.3 or less, the heating value of gas in the preheating shaft 2 is so short that the scraps cannot be sufficiently preheated. It is more preferable that OD is more than 0.4.

Since even according to the present embodiment, in the same way as conventional embodiment the scraps 203 are supplied so that the scraps 203 are continuously maintained in the melting furnace 201 and in the preheating shaft 202, efficiency of preheating the scraps by exhaust gas is high. By detaining 40% or more of scraps of one charge continuously in the melting furnace 201 and the preheat shaft 202 during melting and at the tapping time, efficiency of preheating becomes extremely high. In addition, CO gas is generated by reacting with supplementary heat source such as coke and the oxygen supply used for oxidation of metal for slag forming. This oxygen supply amount is preferably 25 Nm$^3$/t or more as well. It is more preferable that the oxygen supply amount is 40 Nm$^3$/t.

Embodiment 6

Scraps (150 tons) were charged into a melting furnace and a preheating shaft of a direct current arc apparatus, wherein the melting furnace (furnace diameter: 7.2 m; height: 4 m) is directly connected to the preheat shaft (5 m W×3 m D×7 m H). And an arc was formed by a graphite electrode of 28 inches with an electric power source capacity of maximum 600V, 100 kA, to melt the scraps. In addition, a water cooled lance was inserted through a working entrance placed at a furnace side wall for supplying oxygen at a rate of 6600 Nm$^3$/hr there-through.

Figure 19:
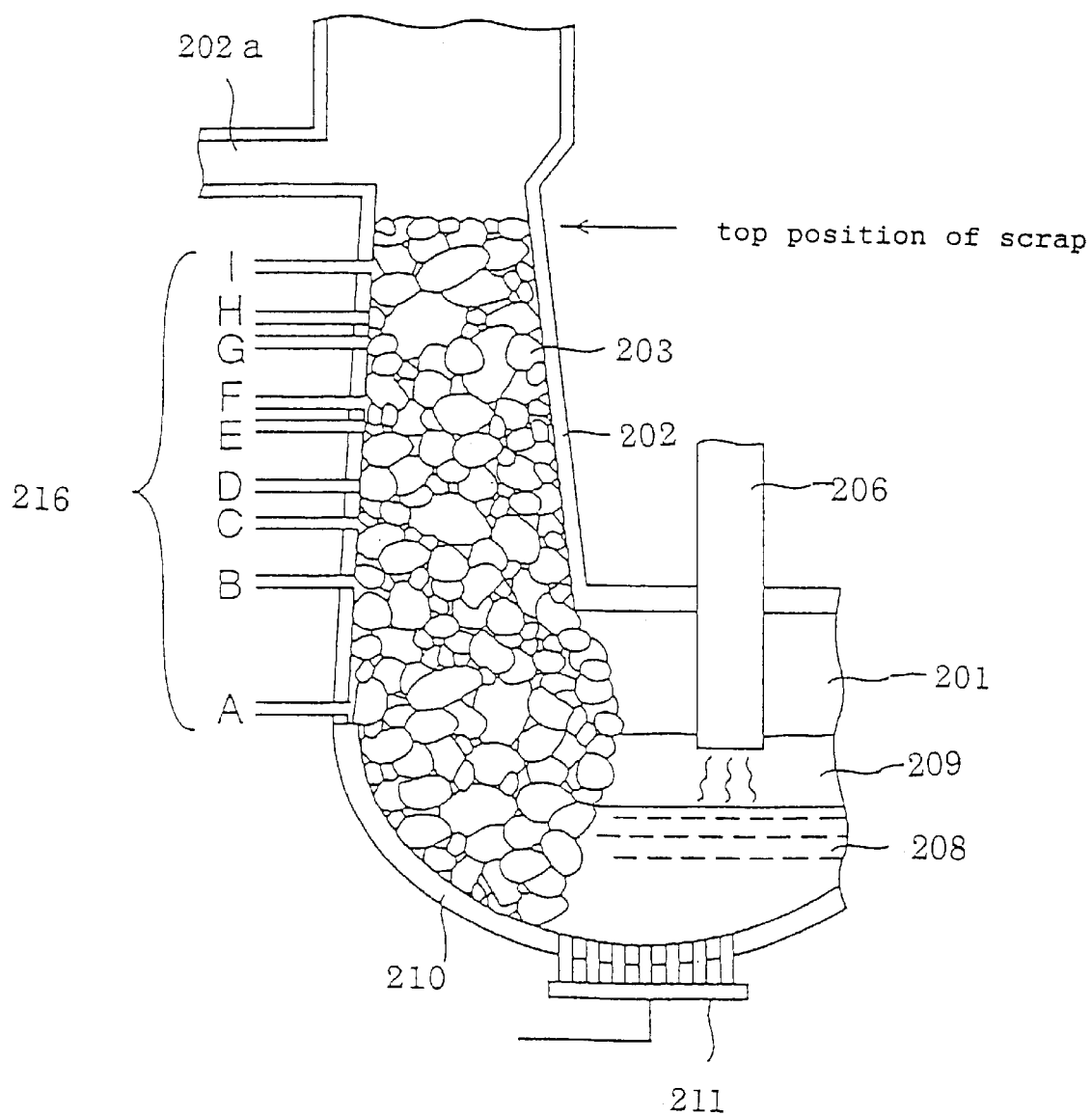
FIG. 19 is a partially sectional view of an arc-melting apparatus, equipped with plural stages of gas introducing holes relating to an embodiment of the present invention.

As shown in FIG. 19, nozzles (gas introduction entrances) 216 for blowing air into the melting furnace 1 and the preheating shaft 2 are installed at 9 stages. That's to say, this 9 number of stages comprises, as the total result of one stage(A) having 4 places, at a side wall above the molten iron bath surface in the melting furnace 1 (lower by 1.5 m from an upper end of the melting furnace) and further 8 stages(B, C, D, E, F, G, H & I) having respectively 4 places, from a position lower by 500 mm from the shaft at the preheat shaft 202. Through each of the nozzles, air was blown in, in amounts as shown in Table 2. And electric power unit consumption and a gas constituent of an upper part of the preheating shaft were measured at the same time.

Furthermore, after the molten iron accumulated in the furnace, the coke was injected at a rate of 80 kg/min into slag, in order to drive the slag forming operation. And then, the top end of the graphite electrode was buried in the forming slag. Voltage at this time was set to be 400 V. In order to keep the level of scraps at a predetermined height in the preheating shaft, as the scraps in the preheating shaft dropped into the melting furnace, additional scraps were supplied into the preheating shaft from a bucket for charging the scraps into an upper part of the preheating shaft.

In this way, the melting is promoted under the condition that the scraps were continuously maintained in the melting furnace and the preheating shaft. When 180 tons of molten metal was produced in the melting furnace, 120 tons was tapped from the tapping hole into a ladle, leaving 60 tons in the furnace. Temperature of the molten iron at the tapping time was 1550° C. Carbon concentration in the molten iron was 0.1%. The molten iron in the vicinity of the tapping hole was heated by using an oxygen-oil burner.

Even after the 120 tons of molten steel was tapped, Oxygen supply and coke injection continued, slag forming operation continued and the melting continued. When the molten iron amounted again to 180 tons in the melting furnace, tapping of 120 tons of molten iron was repeated. The results of Table 2 show an average value of 5 numbers of charges which repeated this melting. It should be noted that Example 1 through 9 in the Table 2 were within the scope of the present invention and Comparative examples 1 through 4 were out of the scope of the present invention. In Comparative examples 1 through 3, the melting furnace was shut tightly, in Examples 1 and 2 air blow was performed with one stage and in Comparative example 3, air blow was not performed. In addition, in Comparative example 4, conventional operation by batch was performed.

According to the results of the Table, it has been confirmed that in Examples in which scraps are always maintained in the melting furnace and the preheat shaft and where CO gas which has not yet burnt can burn efficiently, efficiency of preheating the scraps is high and electric power unit consumption can be reduced. Above all, in Examples 1, 2 and 4 wherein the location of air blow and an amount of air blow were particularly in a preferable range, molten iron of 120 tons was obtained between tappings in about 40 minutes on average, electric power unit consumption of 175 to 180 kWh was possible when the oxygen amount of 33 Nm$^3$/t and coke unit consumption was 26 kg/t. Electric power unit consumption was therefore lowered by 60 to 120 kWh/t in comparison with Comparative examples 1 through 4 to which the present invention did not apply.

The molten iron (120 tons) which had been tapped was elevated to a temperature of 1620° C. by a ladle furnace (LF) to produce a billet of 175×175 mm by continuous casting.

TABLE 2

|  |  | Example | | | | | | | | | Comparative example | | | |
| --- | --- | --- | --- | --- | --- | --- | --- | --- | --- | --- | --- | --- | --- | --- |
|  |  | 1 | 2 | 3 | 4 | 5 | 6 | 7 | 8 | 9 | 1 | 2 | 3 | 4 |
| Secondary combustion air (Nm3/min) |  | 380 | 380 | 380 | 381 | 381 | 380 | 240 | 480 | 480 | 380 | 380 | 0 | 0 |
| Air blowing position and blowing amount (Nm3/min.) | A | 190 |  |  | 127 |  |  | 120 | 160 | 120 | 380 |  |  |  |
|  | B | 190 | 190 |  | 127 | 127 |  | 120 | 160 | 120 |  | 380 |  |  |
|  | D |  | 190 |  | 127 | 127 | 127 |  | 160 | 120 |  |  |  |  |
|  | F |  |  | 190 |  | 127 | 127 |  |  | 120 |  |  |  |  |
|  | H |  |  | 190 |  |  | 127 |  |  |  |  |  |  |  |

TABLE 2-continued

| | | Example | | | | | | | | | Comparative example | | | |
|---|---|---|---|---|---|---|---|---|---|---|---|---|---|---|
| | | 1 | 2 | 3 | 4 | 5 | 6 | 7 | 8 | 9 | 1 | 2 | 3 | 4 |
| Electric power unit consumption(kWh/t) | | 175 | 180 | 220 | 180 | 195 | 210 | 230 | 215 | 225 | 250 | 240 | 280 | 300 |
| Coke unit consumption (kg/t) | | 26 | 26 | 26.2 | 26.1 | 26 | 26.3 | 25.8 | 29.2 | 29.1 | 31.9 | 30 | 26 | 26 |
| Tap-Tap(min) | | 40.1 | 40.5 | 44.5 | 40.5 | 42 | 43.1 | 45.5 | 44.1 | 45 | 46.5 | 46.2 | 48.9 | — |
| Exhausting gas | CO(%) | 0.4 | 0.5 | 2.8 | 0.35 | 0.55 | 2.4 | 32.5 | 0 | 0.1 | 0.4 | 0.4 | 42 | — |
| composition | CO2(%) | 99.2 | 99 | 93.3 | 99.3 | 99 | 94.3 | 67.5 | 79 | 77.5 | 99.3 | 99 | 52.3 | — |
| (Excluding N2 content) | O2(%) | 0.4 | 0.5 | 3.9 | 0.35 | 0.45 | 3.3 | 0 | 21 | 22.4 | 0.3 | 0.6 | 5.7 | — |
| Remarks | | | | | | | | | | | | | | Batch type |

Embodiment 7

In the above described melting furnace, the same melting as that of Example 1 was performed, except that the supplied oxygen amount was 9500 Nm$^3$/hr, coke was 120 kg/min, oxygen amount was 45 Nm$^3$/t and coke unit consumption was 36 kg/t. The air blow position, the air blow condition and the results are shown in Table 3. Examples 10 through 18 of the Table 2 were within the scope of the present invention and Comparative examples 5 through 8 were out of the scope of the present invention. In Comparative examples 5 through 7 the melting furnace was shut tightly, in Comparative examples 5 and 6 air blow was performed by one stage and in Comparative example 7 air blow was not performed. In addition, in Comparative example 8 operation by batch was performed.

From the results of Table 3, according to the present embodiment, it has been confirmed as follows.

Since the scraps are always maintained in the melting furnace and the preheating shaft and CO gas which has not yet burnt can be made to burn efficiently, efficiency of preheating the scraps is high and electric power unit consumption can be reduced. Above all, in Examples 10, 11 and 14, wherein a position of air blow and an amount of air blow were particularly in a preferable range, molten iron of 120 tons was obtained from tapping to tapping in about 37 minutes on average, electric power unit consumption of 120 kWh/t was obtained by oxygen amount of 45 Nm$^3$/t and coke unit consumption of 36 kg/t and electric power unit consumption was lowered by 80~150 kWh/t, in comparison with Comparative examples 5 through 8 to which the present invention did not apply.

TABLE 3

| | | Example | | | | | | | | | Comparative example | | | |
|---|---|---|---|---|---|---|---|---|---|---|---|---|---|---|
| | | 10 | 11 | 12 | 13 | 14 | 15 | 16 | 17 | 18 | 5 | 6 | 7 | 8 |
| Secondary combustion air (Nm3/min) | | 570 | 570 | 570 | 570 | 570 | 570 | 570 | 360 | 720 | 570 | 570 | 0 | 0 |
| Air blowing position and blowing amount (Nm3/min) | A | 285 | | | | 190 | | | | 180 | 570 | | | |
| | B | 285 | 285 | | | 190 | 190 | | 180 | 180 | | 570 | | |
| | C | | 285 | 285 | | 190 | 190 | | 180 | 180 | | | | |
| | E | | | 285 | | | 190 | 190 | | 180 | | | | |
| | G | | | | 285 | | | 190 | | | | | | |
| | I | | | | 285 | | | 190 | | | | | | |
| Electric power unit consumption(kWh/t) | | 120 | 120 | 140 | 175 | 120 | 150 | 170 | 185 | 200 | 200 | 240 | 245 | 270 |
| Coke unit consumption (kg/t) | | 36.1 | 36 | 36 | 36.2 | 35.9 | 36 | 36.2 | 39 | 42.2 | 42 | 36 | 26 | 37 |
| | | 37 | 37.1 | 38.2 | 40 | 37 | 38.5 | 39.5 | 40.5 | 43.5 | 43 | 46.1 | 48.9 | |
| Tap-Tap(min) | | 37 | 37.1 | 38.2 | 40 | 37 | 38.5 | 39.5 | 40.5 | 43.5 | 43 | 46.1 | 48.9 | — |
| Exhausting gas | CO(%) | 0.45 | 0.45 | 0.5 | 0.55 | 0.45 | 0.45 | 0.55 | 33.5 | 0.1 | 0.42 | 0.53 | 41 | — |
| composition | CO2(%) | 99.2 | 99.15 | 99.1 | 99 | 99.15 | 99.15 | 99 | 66.5 | 77.4 | 99.3 | 99.12 | 53.5 | — |
| (Excluding N2 content) | O2(%) | 0.35 | 0.4 | 0.4 | 0.45 | 0.4 | 0.4 | 0.45 | 0 | 22.5 | 0.28 | 0.35 | 5.5 | — |
| Remarks | | | | | | | | | | | | | | Batch type |

Embodiment 8

Scraps of 150 tons were charged into a melting furnace and a preheating shaft of a direct current arc apparatus, wherein the melting furnace(furnace diameter: 7.2 m; height: 4 m) is directly connected to the preheating shaft (5 m W×3 m D×7 m H) and an arc was formed by a graphite electrode of 28 inches with an electric power source capacity of maximum 600V, 100 kA to melt the scraps. In addition, a water cooled lance was inserted through a working entrance placed at a furnace side wall to supply oxygen at a rate of 9500 Nm$^3$/hr there-through.

Figure 18:
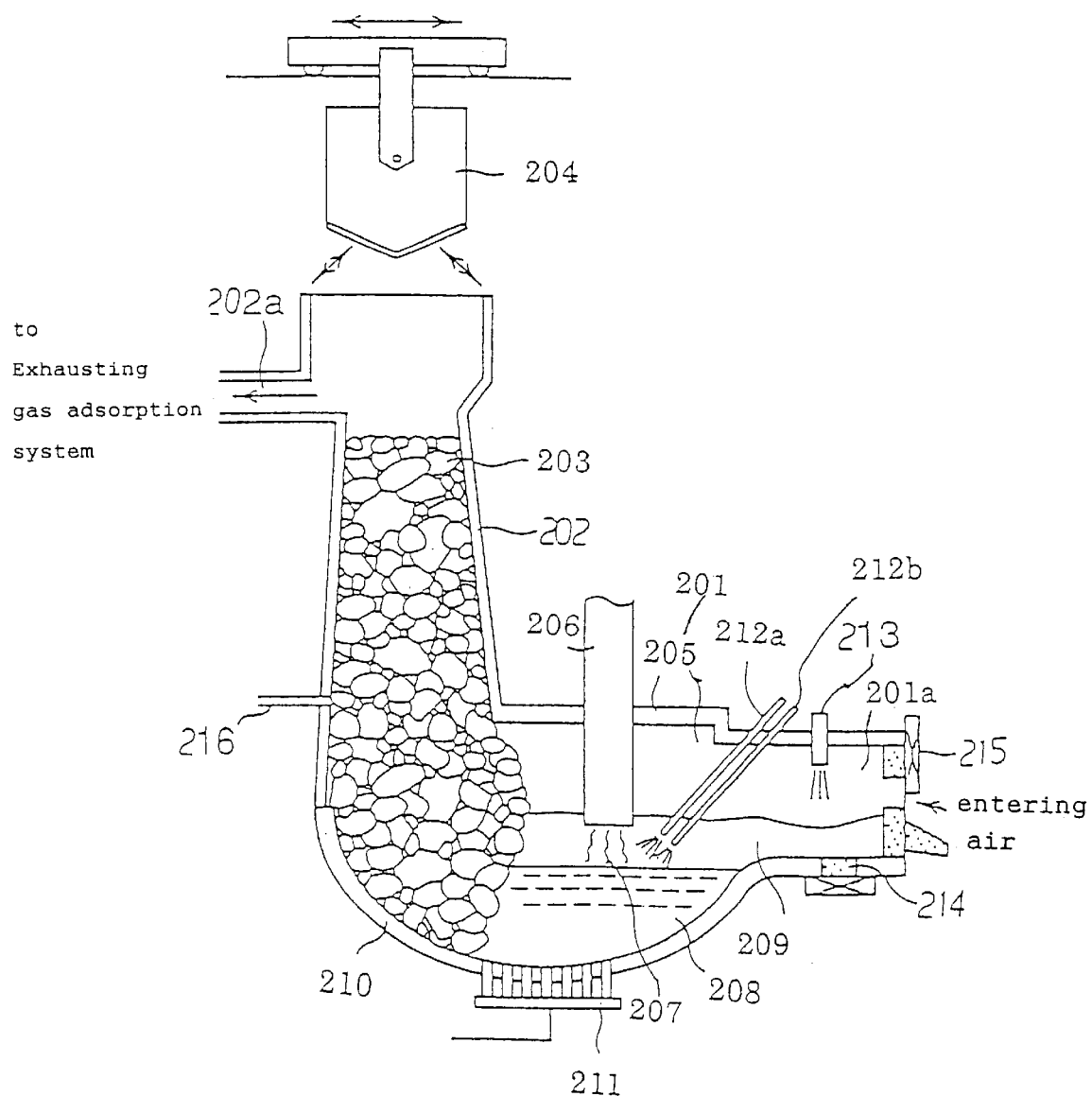
FIG. 18 is a sectional view of an arc-melting apparatus, equipped with one stage of a gas introducing hole relating to an embodiment of the present invention.

As shown in FIG. 18, a gas introduction entrance 216 for introducing air as oxygen containing gas to a lower part of a preheating shaft 202 was installed at one stage (at 4 places), and further amount of entering air into the melting furnace 201 was made adjustable by the working door 215. And then, air was supplied through the working door 215 and the gas introduction entrance 216 to burn CO. Total post-combustion air amount and values of OD(=CO$_2$/(CO$_2$+ CO)) at respective positions at that time are shown in Table 4. In addition, electric power unit consumption and gas constituent at an upper part of the preheat shaft at that time were measured.

At the time when the molten iron had accumulated in the furnace, coke was injected at a rate of 120 kg/min into slag to drive the slag forming operation, and the top end of the graphite electrode was buried in the forming slag. The voltage at this time was set to be 400 V. As the scraps in the preheating shaft descended following melt of the scraps in the melting furnace, additional scraps were supplied from a bucket for charging the scraps from an upper part of the preheating shaft to keep a level of the scraps at a predetermined height in the preheating shaft.

In this manner, the melting is promoted under conditions where scraps were continuously maintained in the melting furnace and the preheating shaft, and at a stage where molten iron of 180 tons was produced in the melting furnace, 120 tons for one charge was tapped from the tapping hole into a ladle, leaving 60 tons of molten iron in the furnace. Temperature of the molten iron at the time of tapping was 1550° C. Carbon concentration in the molten iron was 0.1%.

The molten iron in the vicinity of the tapping hole was heated by an oxygen-oil burner.

Even after 120 tons of molten iron was tapped while oxygen supply and coke injection were being performed, slag forming operation was performed and the melting was continued. When the molten iron amounted again to 180 tons in the melting furnace, tapping 120 tons of molten iron was repeated. The results of Table 4 show an average value of 5 charges which repeated this melting and tapping cycle. It should be noted that Example 19 in the Table 13 is within the scope of the present invention and Comparative example 9 is out of the scope of the present invention. In Comparative example 9 OD in the melting furnace shows 0.7 or more.

From the results of Table 4, it has been confirmed that in Example 19, efficiency of preheating the scraps is high enough to be able to reduce electric power unit consumption. According to this inventive Example, molten iron of 120 tons was obtained with a tapping to tapping time of 40 minutes on average, and electric power unit consumption of 175 kWh/t was obtained by oxygen amount of 36 $Nm^3/t$ and coke unit consumption of 26 kg/t. On the other hand, according to Comparative example 9, electric power unit consumption was, a little bit, lower than that of Example 19. However, a lot of troubles on apparatus and a lot of troubles on operation such as fusion, frequently occurred in the Comparative example 9.

TABLE 4

| | | Example 19 | Comparative example 9 |
|---|---|---|---|
| In-furnace OD ($=CO2/CO2 + CO$) | | 0.5 | 0.85 |
| Secondary combustion air | | 190 | 60 |
| Electric power unit consumption (Kwh/t) | | 175 | 170 |
| Coke unit consumption(kg/t) | | 26 | 26 |
| Tap-Tap (min) | | 40 | 40 |
| Exhausting gas combustion (excluding N2 content) | CO(%) | 0.4 | 0.3 |
| | CO2(%) | 99.2 | 99.4 |
| | O2(%) | 0.4 | 0.3 |
| Remarks | | | Furnace cover is damaged to a large extent Occurrence of scrap fusion |

Figure 20:
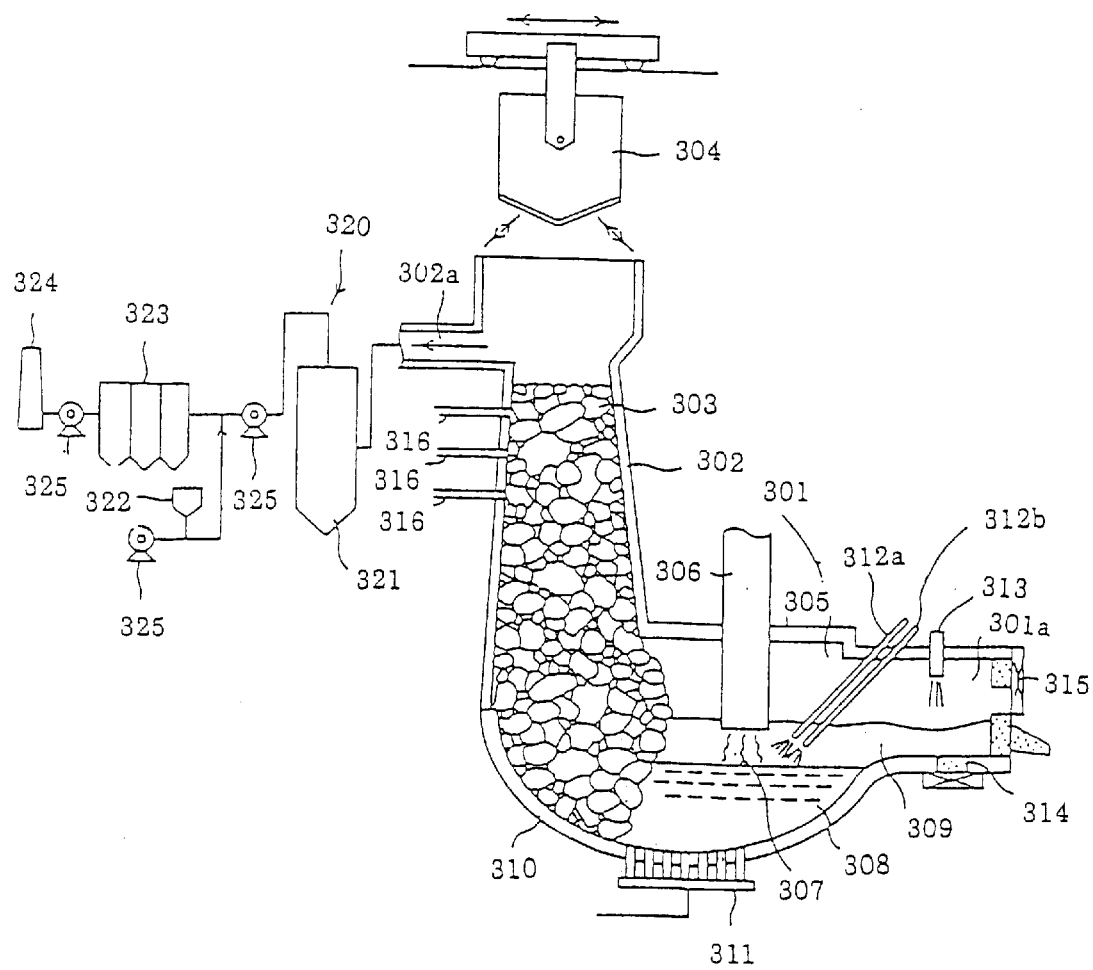
FIG. 20 is a sectional view of an arc-melting equipment equipped with an exhaust gas treatment system and a gas introducing hole, relating to an embodiment of the present invention.

Subsequently, another embodiment of the present invention will be described with reference to FIG. 20 and FIG. 21 of the present invention. According to the present embodiment, a slag door 315 of a melting furnace 301 is the working door for introducing air into the melting furnace 301, and air is introduced into the melting furnace 301 by opening this working door 315 during melting treatment to burn a part of the CO exhaust gas which has not yet burnt in the melting furnace 301. And then, the rest of the CO exhaust gas which has not yet burnt is made to burn by oxygen containing gas from a gas introduction entrance 316, which is placed in the area between the molten iron bath surface position and the upper end position of the scraps in the preheating shaft.

In this manner, if air is introduced into the melting furnace 301, a portion of high temperature CO gas which has been generated in the furnace is made to burn by the introduced air.But since the burning occurs in the melting furnace 301, it does not become high locally in temperature within a layer of the scraps which have not yet been melted and fusion of the scraps does not occur. In addition, heat of this gas transfers to the scraps 303 between the surface of the molten iron bath and the lower end position of the preheating shaft 302 before the exhaust gas enters into the preheating shaft 302 and its temperature, is lowered sufficiently to avoid local fusion of scraps when the exhaust gas enters into the preheat shaft. Furthermore, since heat of the gas transfers to the scraps 303 the temperature of the exhaust gas is not high when the rest of CO gas is made to burn in the vicinity of the upper end surface of the scraps in the preheat shaft 302 and therefore, local fusion does not occur at that portion, either. According to the above described embodiment, since CO gas is made to basically burn at a portion wherein the scraps exist there is some possibility that scraps fuse, but the present embodiment can substantially prevent the scraps from fusing.

In addition, the position of the gas introduction entrance 316 is appropriately arranged to adjust the supply amount of oxygen containing gas and to adjust the combustion ratio at the melting furnace 301. This points the temperature of the exhaust gas in the vicinity of the exit of the preheat shaft 302 namely at a portion of an exhaust portion 302 can be controlled to be a predetermined temperature or more. Furthermore, by rapidly cooling the exhaust gas thereafter, the occurrence of injurious substances such as aromatic chlorine compound which is represented by dioxin and occurrence of white smoke and malodor can be prevented.

According to the present embodiment, CO gas which has not yet burnt is made to burn in the melting furnace 301 so that OD is less than 0.7 at the time when a portion of CO exhaust gas is made to burn by entering air in the melting furnace, where $CO_2/(CO_2+CO)$ is made to be OD. If the value of OD is 0.7 or more, the remaining CO amount is so small that even if the rest of CO is made to burn at the upper-most portion of the preheat shaft 2, the temperature of the exhaust gas cannot be made to be sufficiently high (e.g. a temperature of 750° C. or more) to decompose the above described injurious substances. The value of OD is more preferably made to be less than 0.6.

In this way, according to the present embodiments, a portion of CO in the oxygen containing gas is burnt in the melting furnace 301. Therefore, as well as burning in one position of the scrap layer 316, the temperature of the burning gas is so high that the fusion of the scraps 303 can surely be prevented, comparing with the above-described embodiment. Furthermore, there is no possibility to generate $O_2$ by the dissociation of $CO_2$. In addition, since the amount of CO which burns by introducing air into the melting furnace and the amount of CO which burns by blowing oxygen containing gas into the scraps 303 can be controlled, and since oxygen containing gas can be supplied to a desired position of the scraps 303 with a desired amount, the temperature of the exhaust gas in the vicinity of the exit of the preheat shaft 302 is well controlled at a predetermined temperature or more, to burn surely with high efficiency.

Figure 21:
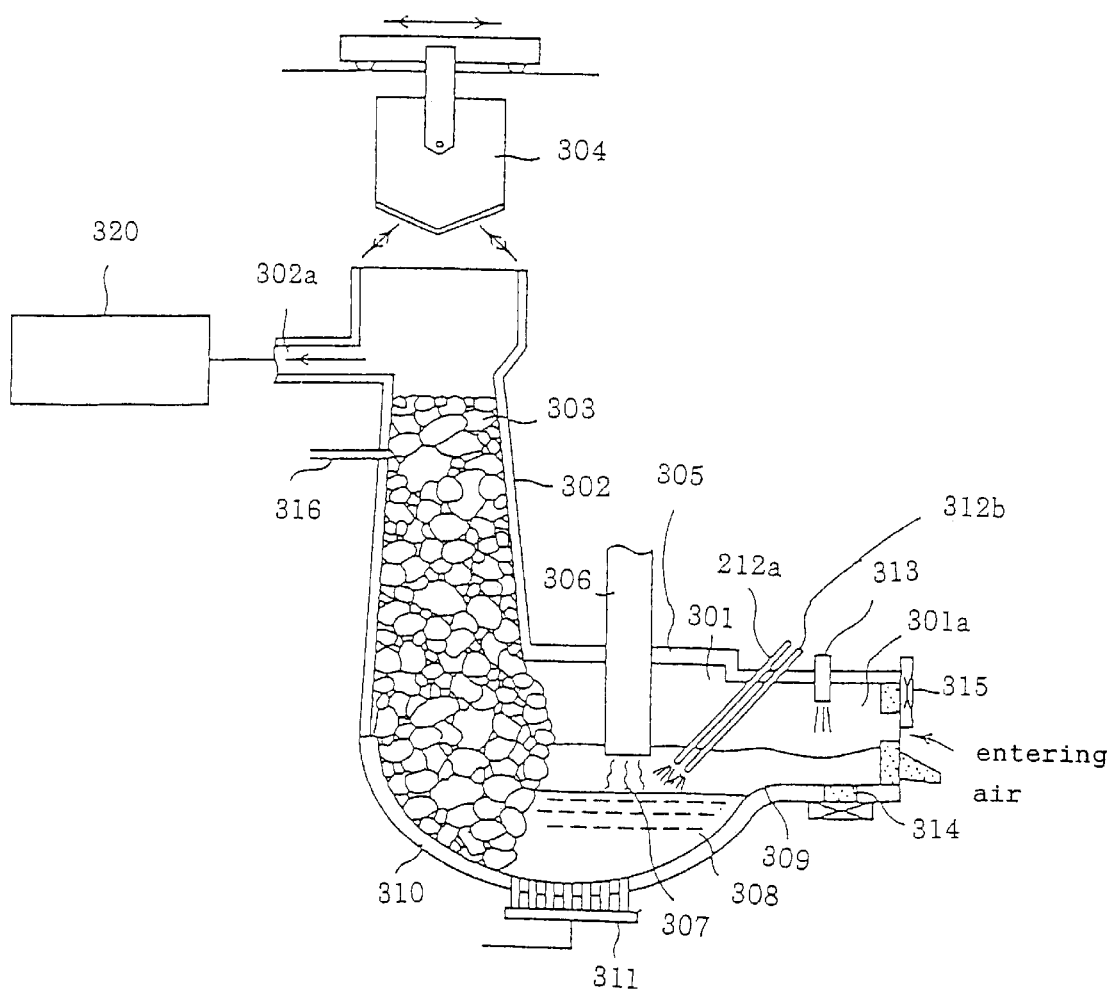
FIG. 21 is a sectional view showing an arc-melting apparatus, relating to another embodiment with respect to an arc-melting apparatus, equipped with an exhaust gas treatment system and one stage of a gas introducing hole relating to an embodiment of the present invention.

In addition, as shown in FIG. 21 according to the present embodiment, since a portion of the non-combustible CO exhaust gas in the melting furnace 301 has already been burnt by oxygen in the melting furnace, the gas introduction at entrance 316 may be composed of one stage. Of course it may be composed of plurality of stages. Similarly to conventional embodiment, in order to arise the temperature of the exhaust gas at an exhaust portion 302a to a predetermined temperature or more, the gas introduction entrance 316 is preferably installed in the vicinity of an upper end surface of the preheat shaft 302. More specifically, the gas introduction entrance 316 is preferably formed at least in the space from an upper surface of the scraps of the preheat shaft 302 and a lower position by 2 m therefrom.

In this manner in case that the gas introduction entrance 316 is composed of one stage and in case that gas introduction amount is small even if the gas introduction entrance 316 is composed of plurality of stages, the value of OD is preferably more than 0.3. In such a case if the value of OD is 0.3 or less, heat of gas is so low that it is impossible to sufficiently preheat the scraps. The value of OD is more preferably more than 0.4.

Even according to the present embodiment, melting of the scraps progresses and when a predetermined amount of molten iron accumulates, while maintaining the scraps continuously in the melting furnace 301 and the preheat shaft 302, the furnace is tilted to tap the molten iron for one charge through the tapping hole 314 into a ladle. Therefore, the scraps can be similarly preheated to temperature higher than in the conventional melting equipment.

Furthermore, since the scraps 303 are supplied to the preheat shaft 302 so that the scraps 303 are continuously maintained in the melting furnace 301 and in the preheat shaft 302, efficiency of preheating the scraps by the exhaust gas is high. By continuously maintaining at least the scraps of 50% of one charge in the melting furnace 301 and in the preheat furnace 302 during melting and at time of tapping, efficiency of preheating becomes extremely high.

Furthermore, in addition, CO gas is generated by reaction with a supplementary heat source such as coke and the oxygen supplied amount for slag forming is also preferably 25 Nm$^3$/t or more as well. It is more preferably 40 Nm$^3$/t.

Embodiment 9

Scraps (150 tons) were charged into a melting furnace and a preheating shaft of a direct current arc apparatus, wherein the melting furnace (furnace diameter: 7.2 m; height: 4 m) is directly connected to the preheating shaft (5 m W×3 m D×7 m H) and an arc was formed by a graphite electrode of 28 inches with an electric power source capacity of maximum 600V, 100 kA to melt the scraps. In addition, a water cooled lance was inserted through a working entrance placed at a furnace side wall to supply oxygen at a rate of 9500 Nm$^3$/hr there-through.

Figure 22:
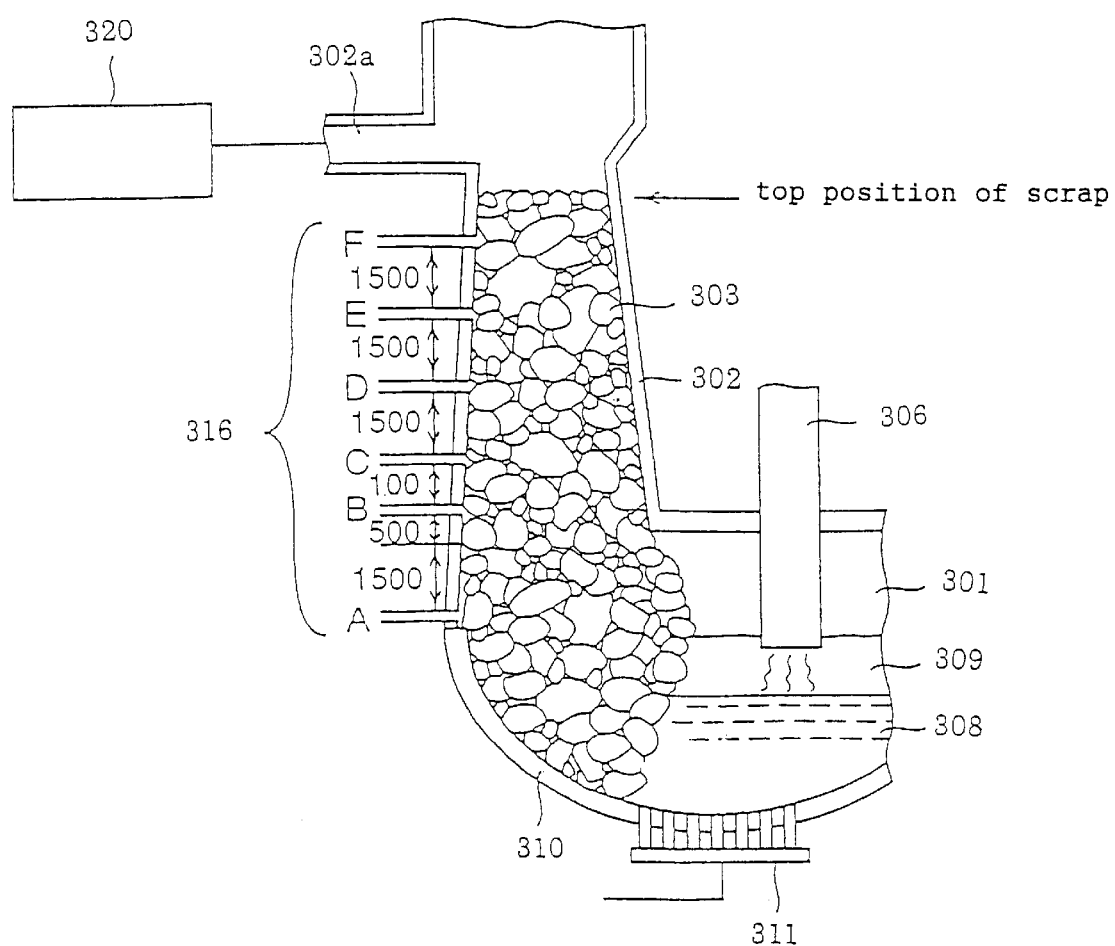
FIG. 22 is a sectional view showing an arc-melting apparatus, relating to another embodiment with respect to an arc melting apparatus, equipped with an exhaust gas treatment system and plurality of gas introducing holes relating to an embodiment of the present invention.

As shown in FIG. 22, nozzles(gas introduction entrances) 316 for blowing air into the melting furnace 1 and in the preheating shaft 2 were installed at 6 stages in total at one stage(A) with 4 places at a side wall above molten iron bath surface in the melting furnace 301 (lower by 1.5 m from an upper end of the melting furnace) and further respectively at 5 stages (B, C, D, E & F) with 4 places at an interval, as shown in the figure from a position lower by 500 mm from the shaft at the preheating shaft 202. Through each of the nozzles air was blown in as allocated as shown in Table 31 and electric power unit consumption, the temperature of the exhaust gas at an upper part of the preheating shaft was measured as was the occurrence of injurious substances such as dioxin and the occurrence of white smoke and malodor accompanied thereby.

When molten iron accumulated in the furnace, coke was injected at a rate of 120 kg/min into slag to drive slag forming operation, and the top end of the graphite electrode was made to be buried in the forming slag. The voltage at this time was set to be 400 V. When the scraps in the preheat shaft descended following melt of the scraps in the melting furnace, additional scraps were supplied from a bucket for charging the scraps from an upper part of the preheat shaft to keep the level of the scraps at a certain height in the preheat shaft.

In this manner, the melting is promoted while the scraps were continuously maintained in the melting furnace and in the preheat shaft. When 180 tons of the molten iron was produced in the melting furnace and 60 tons of molten iron where maintained in the furnace and the 120 tons was tapped from the tapping hole into a ladle, the temperature of the molten iron at the time of the tapping was 1550° C. Carbon concentration in the molten iron was 0.1%.

The molten iron in the vicinity of the tapping hole was heated by an oxygen-oil burner.

Even after the molten iron of 120 tons was tapped, the oxygen supply and coke injection were continued along with slag forming operations and the melting was continued. When the molten iron amounted again to 180 tons in the melting furnace, 120 tons of the molten iron were again tapped. The results of Table 31 show an average value of 5 charges which repeated this melting. It should be noted that Examples 1 through 3 in the Table 31 were within the scope of the present invention and Comparative examples 1 through 3 were out of the scope of the present invention. In any one of Comparative examples 1 through 3, temperature of the exhaust gas was low at the exit of the shaft. In Comparative example 3 the melting furnace was shut tightly and air was not blown.

From the results of Table 5 it has been confirmed that temperature of the exhaust gas at the exit of the shaft can be raised to 900° C. or more, that therefore, occurrence of injurious substances such as dioxin can be made to be substantially zero and the occurrence of the white smoke and the malodor can be avoided. In contrast to this, in each of Comparative examples wherein temperature is low at the exit of the shaft, the injurious substance is frequently produced, and the white smoke and the malodor is also produced.

In addition, it has been confirmed that as shown by the inventive Examples, when the scraps are continuously maintained in the melting furnace and in the preheat shaft, and CO gas which has not yet burnt is made to post-combust, efficiency of preheating the scraps is high and electric power unit consumption can be lowered. In these Examples the molten iron (120 tons) was obtained in a time between tapping of 37 minutes on average, electric power unit consumption of 140~150 kWh/t was obtained by oxygen amount of 45 Nm$^3$/t and coke unit consumption of 36 kg/t, electric power unit consumption was low by 80 kWh/t in comparison with Comparative example 3 wherein air blow was not performed.

The molten iron of 120 tons which had been tapped was elevated to temperature of 1620° C. by a ladle furnace (LF) to produce a billet of 175×175 mm by continuous casting.

TABLE 5

| | | Example | | | Comparative example | | |
|---|---|---|---|---|---|---|---|
| | | 1 | 2 | 3 | 1 | 2 | 3 |
| Secondary combustion air(Nm3/Min) | | 570 | 570 | 570 | 570 | 570 | 0 |
| Air blowing position & | A | | | | 285 | | |
| blowing amount (Nm3/Min) | B | 285 | | | | 190 | |
| | C | | 285 | 190 | | 190 | |
| | D | | | | 285 | 190 | |
| | E | | | 190 | | | |
| | F | 285 | 285 | 190 | | | |
| Electric power unit consumption(kWh/t) | | 155 | 170 | 170 | 130 | 140 | 240 |
| Coke unit consumption(kg/t) | | 36.1 | 36 | 36 | 36.2 | 35.9 | 36 |
| Tap-Tap(min) | | 37 | 37.3 | 37.6 | 36.2 | 37 | 48.6 |
| Temperature of exhausting gas at the exit of the shaft (° C.) | | 955 | 960 | 925 | 320 | 395 | 125 |
| White smoke, Malodor | | Not found | | | Found | | |
| Harmful matter as Dioxin | | 1/500–1/1500* | | | 1 | | |

*Defined Comparative example as 1

Embodiment 10

Scraps of 150 tons were charged into a melting furnace and a preheat shaft of a direct current arc equipment wherein the melting furnace(furnace diameter: 7.2 m; height: 4 m) is directly connected to the preheat shaft (5 m W×3 m D×7 m H) and an arc was formed by a graphite electrode of 28 inches with an electric power source capacity of maximum 600V, 100 kA to melt the scraps in addition, a water cooled lance was inserted through a working entrance placed at a furnace side wall to supply oxygen at a rate of 9500 $Nm^3/hr$ there-through.

As shown in FIG. 21, a gas introduction entrance 316 for blowing air as oxygen containing gas into a space between an upper end surface of the scraps of the preheat shaft 302 and a position lower by 2 m therefrom is installed at one stage (with 4 places) and furthermore amount of the entering air into the melting furnace 301 is made by a working door 315 to be adjustable. And then air was supplied through the working door 315 and the gas introduction entrance 316 to burn CO. Total amount of post-combustion air and values of OD(=$CO_2/(CO_2+CO)$) at respective positions are shown in Table 6. In addition, electric power unit consumption, the temperature of the exhaust gas at an upper part of the preheat shaft, the occurrence state of injurious substances such as dioxin and the occurrence state of white smoke and malodor accompanied thereby were investigated.

When molten iron accumulated in the furnace, coke was injected at a rate of 120 kg/min into slag to drive slag forming operation, and the top end of the graphite electrode was buried in the forming slag. The voltage at this time was set to be 400 V. When the scraps in the preheat shaft descended following melt of the scraps in the melting furnace, additional scraps were supplied from a bucket for charging the scraps from an upper part of the preheat shaft to maintain the level of the scraps at a predetermined height in the preheat shaft.

In this manner, the melting is promoted in a state that the scraps were continuously maintained in the melting furnace and in the preheat shaft. When 180 tons of the molten iron was produced in the melting furnace, 120 tons was tapped from the tapping hole into a ladle, leaving 60 tons in the furnace. The temperature of the molten iron at the time of the tapping was 1550° C. Carbon concentration in the molten iron was 0.1%.

The molten iron in the vicinity of the tapping hole was heated by an oxygen-oil burner.

Even after the molten iron of 120 tons was tapped, oxygen supply and coke injection were continued as was the slag forming operation, and the melting was continued. When the molten iron amounted again to 180 tons in the melting furnace, tapping of 120 tons of the molten iron was repeated. The results of Table 6 show an average value of 5 charges which repeated this melting. It should be noted that inventive Example 4 in the Table 6 was within the scope of the present invention and Comparative examples 4 through 6 were out of the scope of the present invention. In Comparative example 4, OD in the melting furnace is 0.7 or more, and in Comparative example 5 wherein the melting furnace was shut tightly and air was not blown through the gas introduction entrance, the temperature of the exhaust gas at the exit of the shaft was low.

From the results of Table 6 it has been confirmed that in Example 4, the temperature of the exhaust gas at the exit of the shaft can be increased to 900° C. or more, the occurrence amount of the injurious substance such as dioxin can be reduced substantially to zero and the white smoke and the malodor can be prevented. In contrast to this, in each of the Comparative examples 4 and 5 wherein temperature is low at the exit of the shaft, injurious substance has frequently been produced, and white smoke and malodor have also occurred.

In addition, it has been confirmed that because the scraps are maintained continuously in the melting furnace and in the preheat shaft for the inventive examples, CO gas which has not yet burnt can be made to post-combust and efficiently preheat the scraps, while electric power unit consumption can be lowered. In these Examples, 120 tons of the molten iron was obtained whereby a time between tapping of 37 minutes on average, electric power unit consumption was reduced to 140~150 kWh/t, when oxygen was injected in an amount of 45 $Nm^3/t$ and coke unit consumption was at 36 kg/t. This is an electric power unit consumption which is lower by 80 kWh/t in comparison with Comparative example 5 wherein air injection was not used. The 120 tons of molten iron which had been tapped was elevated to temperature of 1620° C. by a ladle furnace(LF) to produce a billet of 175×175 mm by continuous casting.

TABLE 6

|  | Example | Comparative example | |
| --- | --- | --- | --- |
|  | 4 | 4 | 5 |
| Secondary combustion air (Nm3/min) | 570 | 570 | 0 |
| OD(=CO 2/CO2 + CO)) |  |  |  |
| Inside of the melting Furnace | 0.6 | 0.8 | 0.4 |
| Center of the preheating shaft | 0.6 | 0.8 | 0.8 |
| Exit of the reheating shaft | 1 | 1 | 1 |
| Electric power unit consumptior (kWt/t) | 155 | 140 | 240 |
| Coke unit consumptio (kg/t) | 36.1 | 36.2 | 36 |
| Tap-Tap (min) | 37 | 36.2 | 48.6 |
| Temperature of the shaft exit (° C.) | 955 | 350 | 125 |
| White smoke, Malodor | Not found | Found | Found |
| Harmful matter as dioxin | 1/500–1/1500* | 1 | 1 |
| Fusion Phenomenon | Not found | Not found | Not found |

Another embodiment of the present invention will now be described with reference to FIG. 23 of the present invention. In the foregoing described embodiment, a plurality of gas introduction entrances 416 were installed at random positions in a range from a molten iron bath surface position in a melting furnace 401 to an upper end position of scraps of a preheat shaft. These gas introduction entrances 416 are optional. In the case that the gas introduction entrances 416 are not installed, CO gas which has not yet burnt is made to entirely burn in a post-combustion chamber 417. Alternatively a pipe through which CO gas which has not yet burnt is introduced to the post-combustion chamber 417 is arranged and a portion of gas which has not yet burnt may be supplied to the post-combustion chamber 417 without passing through a preheat shaft 1.

Embodiment 11

Scraps of 150 tons were charged into a melting furnace and a preheating shaft of a direct current arc apparatus, wherein the melting furnace (furnace diameter: 7.2 m; height: 4 m) is directly connected to the preheat shaft (5 m W×3 m D×7 m H) and an arc was formed by a graphite electrode of 28 inches with an electric power source capacity of maximum 600V, 100 kA to melt the scraps. In addition, a water cooled lance was inserted through a working entrance placed at a furnace side wall to supply oxygen at a rate of 9500 Nm³/hr there-through.

Figure 23:
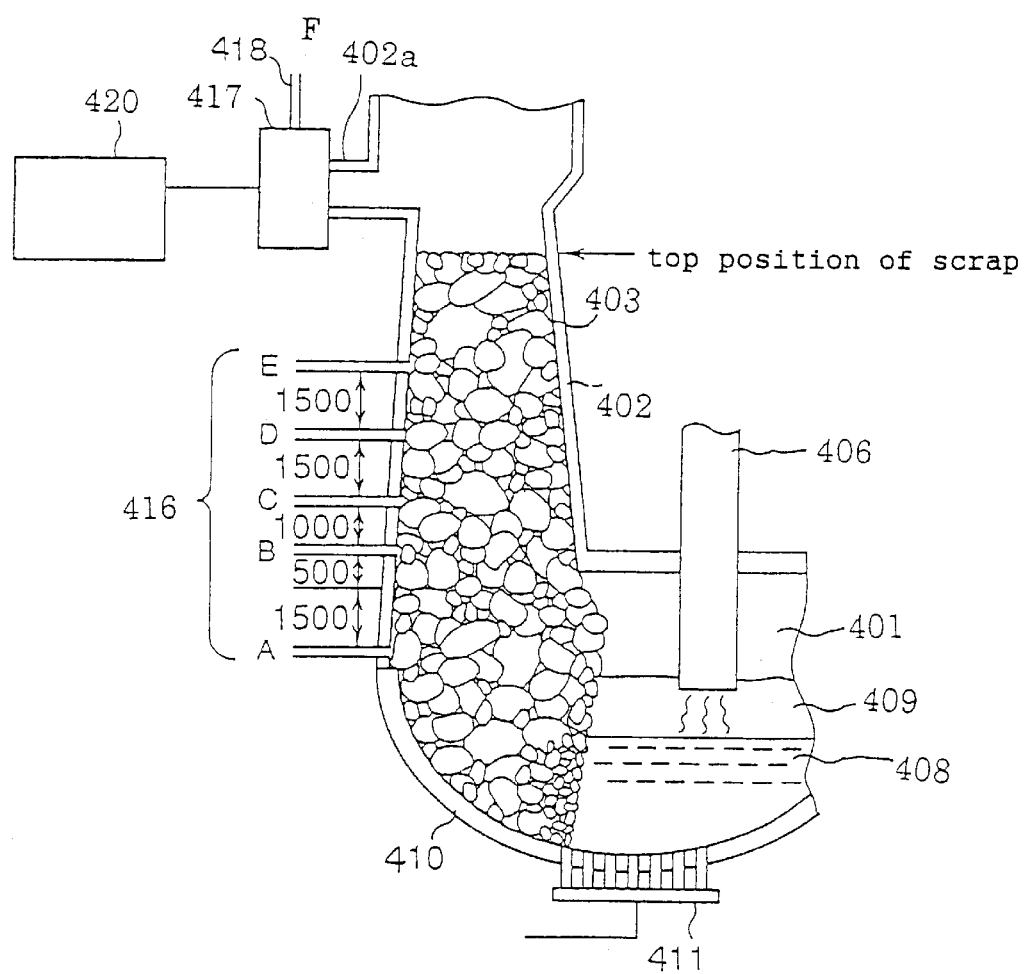
FIG. 23 is a sectional view showing an arc-melting apparatus, relating to another embodiment with respect to an arc-melting apparatus, equipped with an exhaust gas treatment system, a gas introducing hole and a post-burning chamber relating to an embodiment of the present invention.

As shown in FIG. 23, nozzles (gas introduction entrances) 416 for blowing air into the melting furnace 401 and the preheating shaft 402 were installed at 5 stages in total at one stage(A) with 4 places at a side wall above molten iron bath surface in the melting furnace 401 (lower by 1.5 m from an upper end of the melting furnace) and further respectively at 4 stages (B, C, D & E) with 4 places at an interval as shown in the figure from a position lower by 500 mm from the shaft at the preheat shaft 402 and furthermore a nozzle(a gas introduction entrance) 418 was installed at a position of an upper part(F) of a post-combustion chamber 417 which was connected to an exhaust portion 402 a of the preheat shaft 402. Through each of the nozzles, a predetermined amount of air was blown in as shown in Table 7 and the electric power unit consumption, the temperature of the exhaust gas at an upper part of the preheat shaft, and the occurrence of the injurious substances such as dioxin and the occurrence state of white smoke and malodor accompanied thereby at that time, were measured.

As the molten iron accumulated in the furnace at time of melting, coke was injected at a rate of 120 kg/min into slag to drive the slag forming operation, and the top end of the graphite electrode buried in the forming slag. The voltage at this time was set to be 400 V. When the level of scraps in the preheat shaft lowered following melting of the scraps in the melting furnace, additional scraps were supplied from a bucket for charging the scraps into an upper part of the preheat shaft to keep the level of the scraps at a predetermined height in the preheat shaft.

In this manner, the melting is promoted under conditions where the scraps were continuously maintained in the melting furnace and the preheat shaft. When 180 tons of molten iron was produced in the melting furnace, 120 tons were tapped, leaving 60 tons of the molten iron in the furnace. The 120 tons of iron for one charge, was tapped from the tapping hole into a ladle. Temperature of the molten iron at the time of the tapping was 1550° C. Carbon concentration in the molten iron was 0.1%.

The molten iron in the vicinity of the tapping hole was heated by an oxygen-oil burner.

Even after the molten iron of 120 tons was tapped, oxygen supply, coke injection, slag forming operation and the melting were continued. When 180 tons of the molten iron accumulated in the melting furnace, tapping of 120 tons of the molten iron was repeated. The results of Table 1 show an average value of 5 charges which repeated this melting. It should be noted that Examples 1 through 3 in the Table 1 were within the scope of the present invention and Comparative examples 1 through 3 were out of the scope of the present invention. In each one of Comparative examples 1 through 3, wherein post-combustion was not performed, the temperature of the exhaust gas at the exit of the shaft was low. In Comparative example 3, the melting furnace was shut tightly and air injection was not performed.

From the results of Table 6, it has been confirmed that in Examples of the present invention, the temperature of the exhaust gas which is discharged from the post-combustion chamber increased to 900° C. or more, whereby the amount of the injurious substance such as dioxin can be reduced substantially to zero and white smoke and malodor can be eliminated. In contrast to this, in each of the Comparative examples, wherein temperature is low at the exit of the shaft, injurious substances are frequently produced, and white smoke and malodor occur.

In addition, it has been confirmed that because the scraps are always maintained in the melting furnace and in the preheating shaft for the inventive example, CO gas which has not yet burnt can be made to post-combust efficiency and efficiently preheat the scraps, while electric power unit consumption can be lowered. In these Examples, 120 tons of the molten iron was obtained, with a time between tapping of 37 minutes on average, electric power unit consumption of 140~150 kWh/t was obtained when oxygen was injected in an amount of 45 Nm³/t and coke unit consumption was at 36 kg/t. This is an electric power unit consumption which is lower by 80 kWh/t in comparison with Comparative example 3 wherein air injection was not used.

The 120 tons of molten iron which had been tapped was elevated to temperature of 1620° C. by a ladle furnace(LF) to produce a billet of 175×175 mm by continuous casting.

TABLE 7

|  |  | Example | | | Comparative example | | |
|---|---|---|---|---|---|---|---|
|  |  | 1 | 2 | 3 | 1 | 2 | 3 |
| Secondary combustion air(Nm3/min) |  | 570 | 570 | 570 | 570 | 570 | 0 |
| Air blowing position & | A |  |  |  | 285 |  |  |
| blowing amount (Nm3/min) | B | 285 |  |  |  | 190 |  |
|  | C |  | 285 | 190 |  | 190 |  |
|  | D |  |  |  | 285 | 190 |  |
|  | E |  |  | 190 |  |  |  |
|  | F | 285 | 285 | 190 |  |  |  |
| Electric unit consumption(kWh/t) |  | 155 | 170 | 170 | 130 | 140 | 240 |
| Coke unit consumption(kg/t) |  | 36.1 | 36 | 36 | 36.2 | 35.9 | 36 |
| Tap-Tap(min) |  | 37 | 37.3 | 37.6 | 36.2 | 37 | 48.6 |
| Temperature of exhausting gas at the exit of the shaft (° C.) |  | 935 | 940 | 905 | 320 | 395 | 125 |
| White smoke, Malodor |  | Not found | | | Found | | |
| Harmful matter as Dioxin |  | 1/500–1/1500* | | | 1 | | |

*Defined Comparative example as 1

Embodiment 12

An Example which uses iron scraps and DRI (carbon concentration: 1.5 wt %) of direct reduction iron together in a direct current arc furnace, as shown FIG. 24 will be described here-below. The arc furnace has a melting chamber of a furnace diameter: 7.2 m; a height: 4 m, a preheating chamber of a width: 3 m; a length: 5 m; a height: 7 m and a furnace capacity of 180 tons. First changed into the melting chamber were 30 tons of DRI at a normal temperature and 50 tons of iron scraps at a normal temperature, subsequently 70 tons of iron scraps at a normal temperature were charged into the preheating chamber. Melting was begun using an upper electrode made of graphite with a diameter of 30 inches and using an electric power source of maximum 750 V, 130 KA. As the molten iron was produced, quick lime and fluorite were added to form molten slag and subsequently oxygen gas was blown in at a rate of 4000 $Nm^3/hr$ through an oxygen gas blow lance and coke was blown in at a rate of 50 kg/min through a carbonaceous material blow lance into the molten slag. By blowing in oxygen gas and coke the molten slag was formed and a top end of the upper electrode was buried in the molten slag. Voltage at this time was set to be 520–550 V.

After this DRI was continuously charged at a rate of 1.8 tons /min into the melting chamber and the melting was continued. In addition, as iron scraps in the preheating chamber descended following the melting, iron scraps were charged by a supply bucket into the preheating chamber to maintain the level of the iron scraps at a predetermined height as the melting continued. When 180 tons of molten iron was produced in the melting chamber, the charge of DRI into the melting chamber was stopped and the DRI was allowed to completely melt. Molten iron (120 tons) for one charge was tapped into a ladle, leaving 60 tons behind in the melting chamber. At the tapping the molten iron was heated by a heavy oil burner. Carbon concentration of the molten iron at the time of the tapping was 0.1 wt %, and temperature of the molten iron was 1560° C.

After the tapping a tapping hole was filled up with filling sand and thereafter a charge of DRI and injection of oxygen gas and coke were continued. When the molten iron amounted to 180 tons again the tapping the molten iron of 120 tons was repeated. The molten iron after being tapped was refined by a ladle refinery furnace, elevated to a temperature of 1620° C. and cast by a continuous caster. The electric power consumption at the ladle refinery furnace was 50 kWh/t on average.

With the combination ratio of DRI of 70%, the time from tapping to tapping was 65 minutes on average, with an oxygen gas blow amount of 33 $Nm^3/t$, coke blow amount of 25 kg/t and the electric power unit consumption by 535 kWh/t for the melting to be accomplished. Total electric power consumption by the arc furnace and the ladle refinery furnace was 585 kWh/t.

Figure 24:
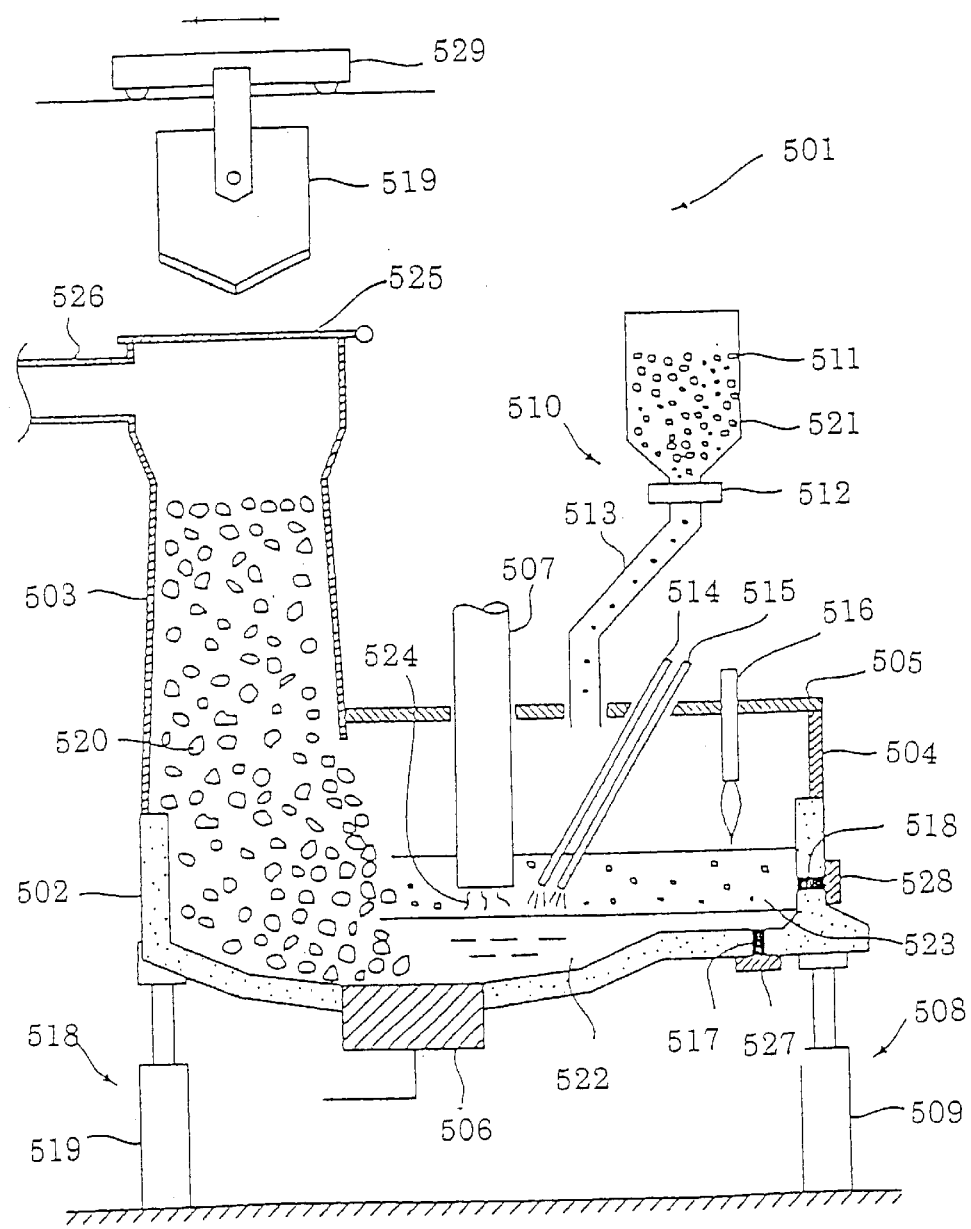
FIG. 24 is a longitudinally schematic view of an arc-melting equipment, showing an example of an embodiment of the present invention.

In addition, in order to make comparison, in the arc furnace as shown in FIG. 24, 30 tons of DR1 of a normal temperature were charged into the melting chamber, subsequently 36 tons of iron scraps at a normal temperature were charged into the preheating chamber and the melting was begun. When molten iron was produced direct reduction iron of 54 tons was continuously charged without additionally charging iron scraps to obtain 120 tons of molten iron and after this molten iron was elevated to a temperature of 1600° C., a tapping operation (Comparative example 1) was also performed. Oxygen gas blow amount and coke blow amount in Comparative example 1 were the same as those of the above described Example 12, and in addition, the electric power unit consumption in the ladle refinery furnace was 30 kWh/t. Operation conditions and operation results in Example 12 and Comparative example 1 are shown in Table 8.

TABLE 8

|  |  | Example 1 | Comparative example 1 |
|---|---|---|---|
| Iron scrap supplying method to to preheating Furnace |  | All the time, filling up | Per heat |
| Oxygen-gas blowing amount (Nm3/t) |  | 33 | 33 |
| Carbonacious material blowing amount(kg/t) |  | 25 | 25 |
| Tapping temperature(° C.) |  | 1560 | 1600 |
| Electric power unit consumption (kWh/t) | Arc Furnace | 535 | 595 |
|  | Ladle refinary furnace | 50 | 30 |
|  | Total unit consumption | 585 | 625 |

As shown in Table 8, in Comparative example 1, the electric power unit consumption in the arc furnace was 595 kWh/t and total electric power unit consumption of an arc furnace and a ladle finery furnace was 625 kWh/t. In this manner according to Example 1 of the present invention, electric power of about 40 kWh/t in terms of total unit consumption could be reduced in comparison with Comparative example 1.

Embodiment 13

Example 2 which uses iron scraps and cold iron (carbon concentration: 4.5 wt %) together in a direct current arc furnace will be described here-below. The arc furnace has a melting chamber of a furnace diameter: 7.2 m; a height: 4 m, a preheating chamber of a width: 3 m; a length: 5 m; a height: 7 m and a furnace capacity, of 180 tons.

First charged into the melting chamber were 30 tons of cold iron at a normal temperature and 50 tons of iron scraps at a normal temperature, subsequently 70 tons of iron scraps at a normal temperature were charged into the preheating chamber and melting was begun using an upper electrode made of graphite with a diameter of 30 inches and using an electric power source of maximum 750 V, 130 KA. As molten iron was produced, quick lime and fluorite were added to form molten slag and subsequently oxygen gas was blown at a rate of 6000 $Nm^3/hr$ through an oxygen blow lance and coke was blown at a rate of 80 kg/min through a carbonaceous material blow lance into the molten slag. By blowing oxygen gas and coke the molten slag was formed and a top end of the upper electrode was buried in the molten slag. Voltage at this time was set to be 550 V.

After this, as iron scraps in the preheating chamber descended following the melting, iron scraps were charged by a supply bucket into the preheating chamber to maintain the level of the iron scraps at a determined height as the melting continued. When 180 tons of molten iron was produced, 120 tons of molten iron for one charge was tapped into a ladle, leaving 60 tons behind in the melting chamber. At the tapping the molten iron was heated by a heavy oil burner. Carbon concentration of the molten iron at the time of the tapping was 0.1 wt %, and temperature of the molten iron was 1560° C.

After the tapping, the tapping hole was filled up with filling sand and thereafter 30 tons of cold iron of a normal temperature was directly charged into the melting chamber and at the same time oxygen gas and coke were injected. When molten iron amounted to 180 tons again, the tapping 120 tons of the molten iron repeated. The molten iron after being tapped was refined in a ladle refinery furnace, elevated to a temperature of 1620° C. and thereafter cast by a continuous caster. The electric power consumption at the ladle refinery furnace was 60 kWh/t on average.

As a result of a combination of the use of cold iron at 25%, a time from tapping to tapping of 40 minutes on average, an oxygen gas blow amount of 33 $Nm^3/t$, a coke blow amount of 16 kg/t and an electric power unit consumption of 195 kWh/t, the melting could be performed. Total electric power consumption was 255 kWh/t by the arc furnace and the ladle refinery furnace.

In addition, in order to make comparison, 30 tons of cold iron at a normal temperature and 20 tons of iron scrap at a normal temperature were charged into the melting chamber, subsequently 70 tons of iron scraps of a normal temperature were charged into the preheating chamber and melting was begun. Molten iron (120 tons) was obtained without additionally charging iron scraps into the preheating chamber and after this molten iron was elevated to a temperature of 1590° C. tapping operation (Comparative example 2) and a mixture of iron scraps and cold iron(hereinafter referred to as "mixture A") in which combination ratio of cold iron was 25% was charged into the preheating chamber melting, was begun. When the mixture A in the melting chamber melted and descended, additional mixture A was charged into the preheating chamber to maintain a level of the mixture A at a predetermined height, while the melting was continued. At the time when 180 tons of molten iron was produced in the melting chamber, 120 tons for one charge was tapped, leaving about 60 tons behind in the melting chamber. The melting and tapping operation was repeated (Comparative example 3). Oxygen gas blow amount and coke blow amount in Comparative example 2 and Comparative example 3 were the same as those of the above described Example 2. In addition, the electric power unit consumption on average in the ladle refinery furnace was 30 kWh/t according to Comparative example 2 and 60 kWh/t according to Comparative example 3. Operation conditions and operation results in Example 2, Comparative example 2 and Comparative example 3 are shown in Table 9.

TABLE 9

Operational condition and its results

| | | Example 1 | Comparative example 2 | Comparative example 3 |
|---|---|---|---|---|
| Iron scrap supplying method to to preheating Furnace | | All the time fillig up | Per heat fillig up | All the time |
| Supplying method for cold Iron source | | Direct supplying to melting chamber | Direct supplying to melting chamber | Supplying by way of preheating furnace |
| Oxygen-gas b (Nm3/t) | | 33 | 33 | 33 |
| Carbonacous material blowing amount (kg/t) | | 16 | 16 | 16 |
| Tapping temperature (° C.) | | 1560 | 1590 | 1560 |
| Tap-Tap time(min) | | 40 | 45 | 43 |
| Electric power unit consumption (kWh/t) | Arc Furnace | 195 | 310 | 180 |
| | Ladle refinary furnace | 60 | 30 | 60 |
| | Total unit consumption | 255 | 340 | 240 |
| Occurrence ratio out of the constitution (%) | | 0.8 | 0.8 | 3.1 |

As shown in Table 9, according to Comparative example 2, the electric power unit consumption in the arc furnace was 310 kWh/t and the total unit consumption of an electric power by the arc furnace and a ladle finery furnace was 340 kWh/t. Thus, the electric power unit consumption was increased by 85 kWh/t, in comparison with Example 2 of the present invention. In addition, since in Comparative example 3 cold iron was preheated, the electric power unit consumption was decreased by 15 kWh/t, in comparison with the inventive example 2. However, in Comparative example 3, by spending time in adjusting carbon concentration before tapping time, the tapping to tapping time was extended by 3 minutes, and at the same time the occurrence amount of out of requirement with respect to carbon concentration of molten iron after having been tapped, was high, in comparison with the inventive example 2. The occurrence amount was 3.1% which was almost 4 times, in comparison with that of Example 2. In this manner, according to Example 2 of the present invention, not only an electric power unit consumption could be reduced but also the product which is out of specification with respect to carbon concentration was small, making a stable operation possible.

Next another embodiment of the present invention will be described with reference to FIGS. 26 and 27.

Embodiment 14

Figure 25:
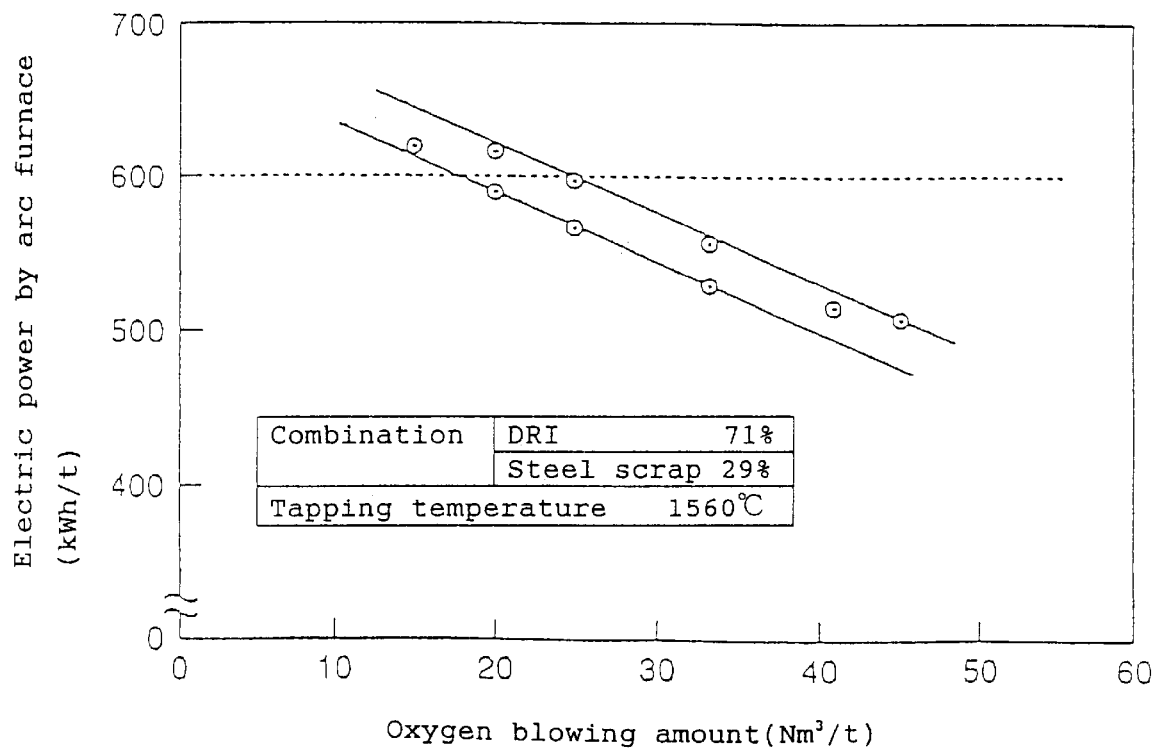
FIG. 25 is a graph showing results of investing influence of oxygen blow amount on an electric power unit requirement with respect to an embodiment of the present invention.
Figure 26:
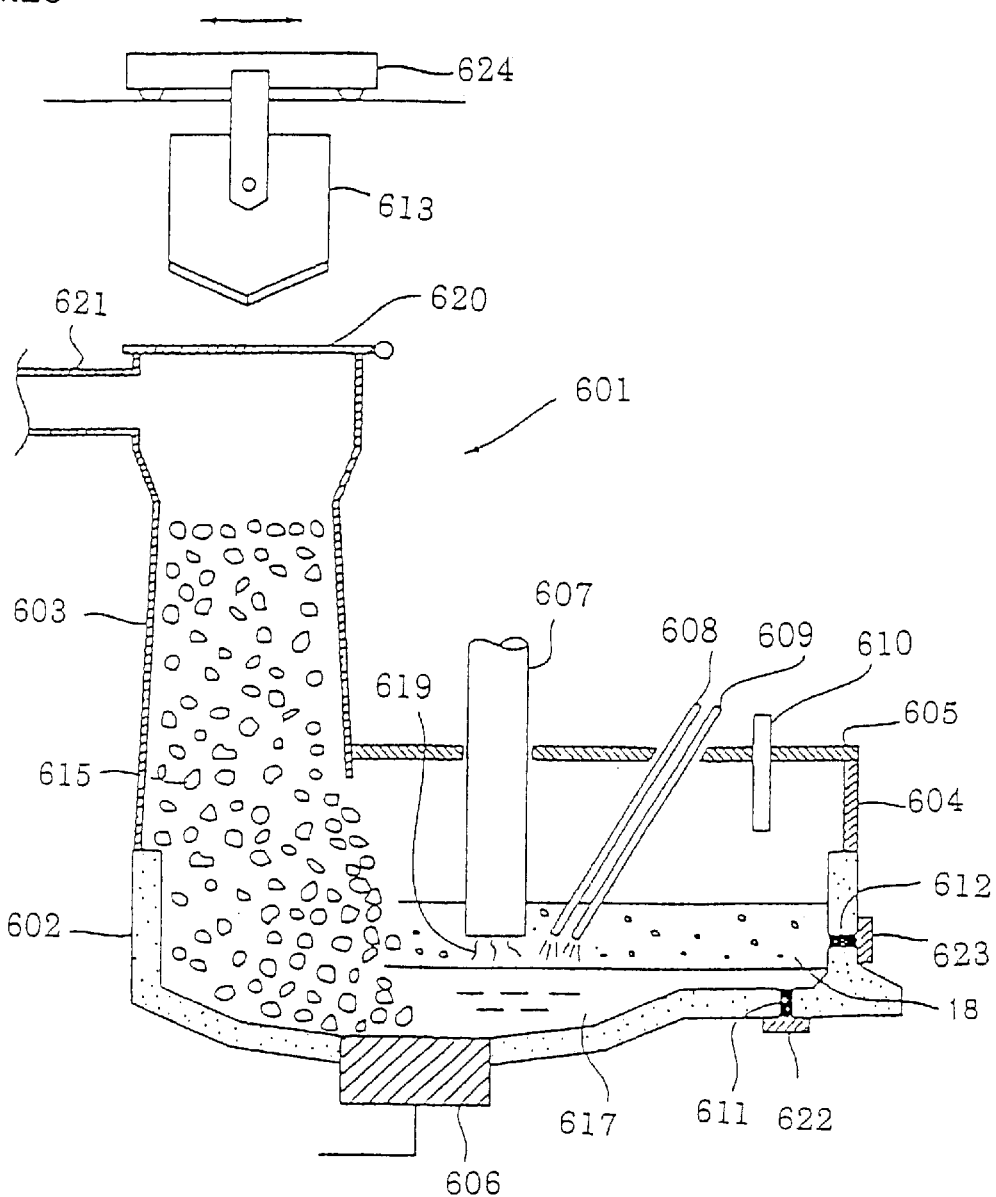
FIG. 26 is a longitudinally schematic view of an arc-melting apparatus, showing another embodiment relating to an embodiment of the present invention.
Figure 27:
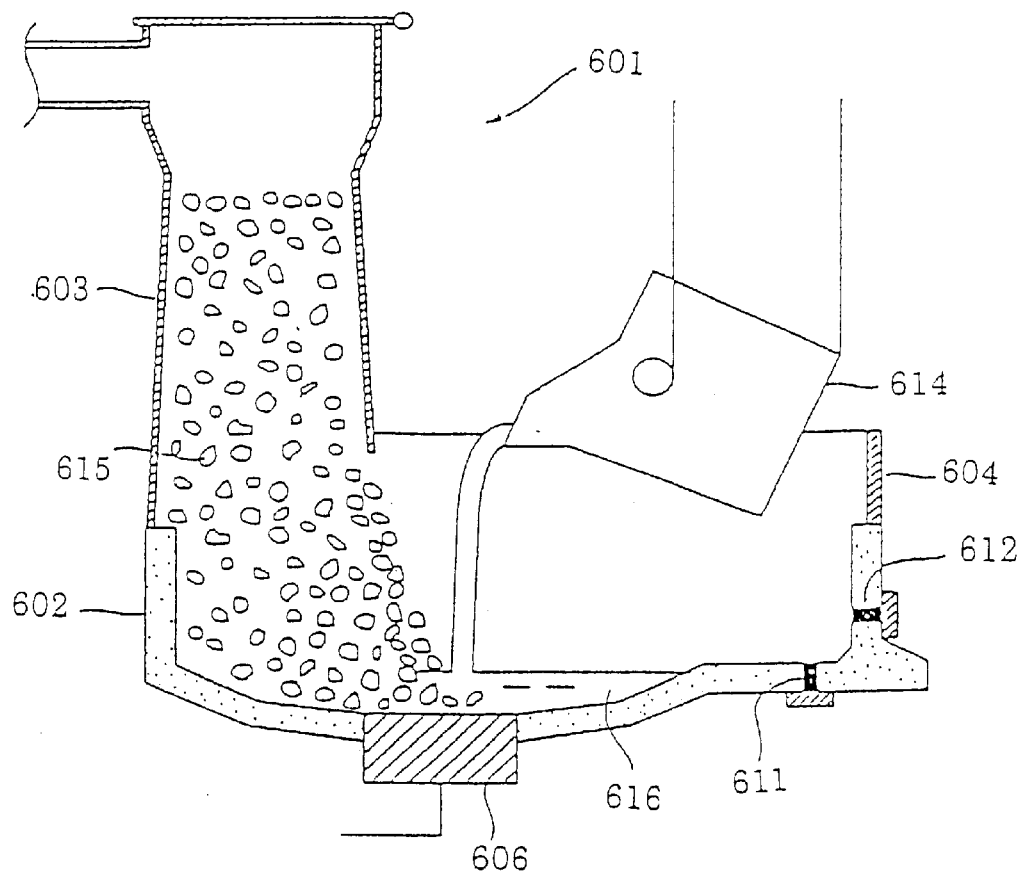
FIG. 27 is a longitudinally schematic view of an arc-melting equipment showing another embodiment relating to an embodiment of the present invention.
Figure 28:
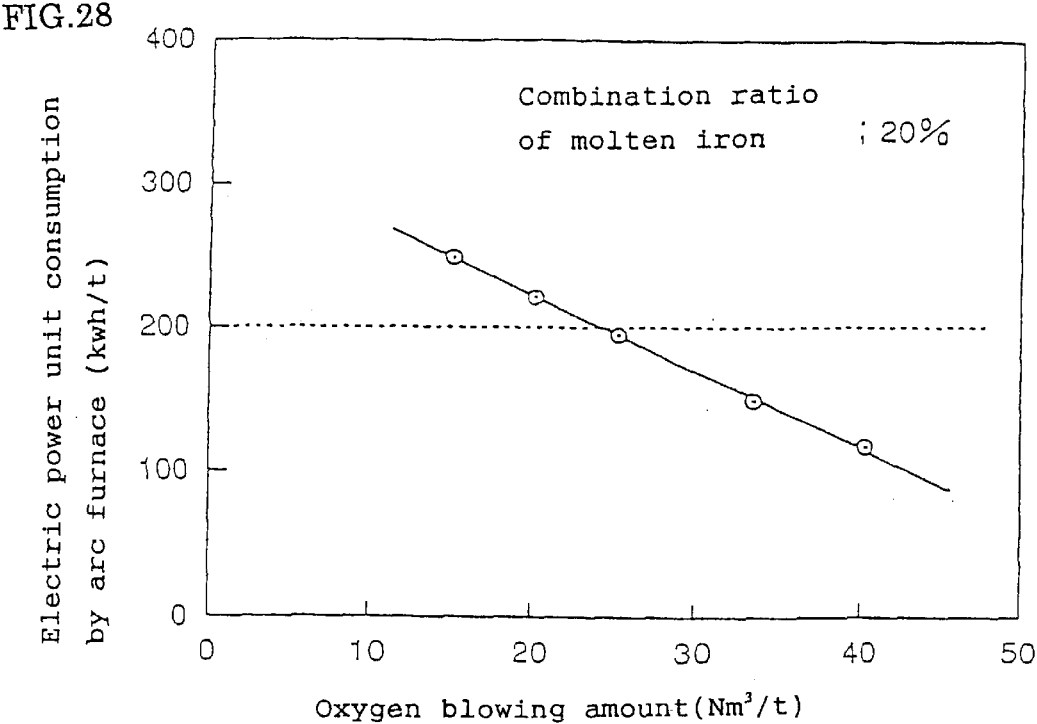
FIG. 28 is another graph showing results of investing influence of oxygen blow amount on electric power unit relating to an embodiment of the present invention.

An example in an arc furnace which is shown in FIG. 25 and FIG. 26 will be described here-below. The arc furnace has a melting chamber of a furnace diameter: 7.2 m; a height: 4 m, a preheating chamber of a width: 3 m; a length: 5 m; a height: 7 m and a furnace capacity of 180 tons. First charged into the preheating chamber, were 70 tons of iron scraps at a normal temperature, subsequently 40 tons of cold iron(carbon concentration: 4.5 wt %) and 50 tons of iron scraps at a normal temperature were charged into the melting chamber. Melting was begun using an upper electrode made of graphite with a diameter of 30 inches and using an electric power source of maximum 750 V, 130 KA. In addition, immediately after electric current was turned on quick lime and fluorite were added and at the same time oxygen was blown at a rate of 6000 $Nm^3/hr$ through an oxygen blow lance and coke was blown at a rate of 36 kg/min through a carbonaceous material blow lance into the melting chamber. The quick lime and the fluorite were heated and by blowing oxygen and coke the molten slag was formed. A top end of the upper electrode was buried in the molten slag. Voltage at this time was set to be 550 V. Thereafter as iron scraps in the preheating chamber descended as a result of melting, additional iron scraps were charged by a supply bucket into the preheating chamber to maintain a level of the iron scraps at a certain height while the melting continued. When molten 180 tons of molten iron was produced, 120 tons was tapped into a ladle, leaving about 60 tons of molten iron behind in the melting chamber. At tapping the molten iron was heated by a heavy oil burner. Carbon concentration of the molten iron at the time of the tapping was 0.1 wt %, and temperature of the molten iron was 1560° C. After the tapping 40 tons of molten iron was charged again into the melting chamber and subsequently the injection of oxygen and coke was restarted when the molten iron again amounted to 180 tons, the tapping of 120 tons of the molten iron was repeated. The molten iron after being tapped was refined by a ladle refinery furnace, elevated to a temperature of 1620° C., and thereafter cast by a continuous caster. The electric power consumption at the ladle refinery furnace was 60 kWh/t on average.

The results shows that melting can be accomplished with a combination ratio of molten iron: 33%, oxygen blow amount: 33 $Nm^3$/t and coke blow amount: 12 kg/t, time from tapping to tapping of 40 minutes on average and an electric power unit consumption of 80 kWh/t. Total electric power consumption by the arc furnace and the ladle refinery furnace was 140 kWh/t.

In addition, for comparison, 70 tons of iron scraps at a normal temperature were charged into the preheating chamber, subsequently 40 tons of molten iron(carbon concentration: 4.5 wt %) and 10 tons of iron scraps at a normal temperature were charged into the melting chamber and melting was begun. In this case, molten iron (120 tons) was obtained, without additional charging iron scraps, continuing the melting. After the molten iron was elevated to a temperature of 1600° C., the molten iron was tapped. (Comparative Example, Inventive Example). In this case, oxygen gas blow amount and coke blow amount in the Comparative example, were the same as those of the above inventive Example. In addition, in the Comparative Example, the electric power unit consumption in the ladle refinery furnace was 30 kWh/t. Operation conditions and operation results for the inventive Example and for the Comparative example are shown in Table 10.

TABLE 10

Operational condition and its results

|  | Example | Comparative example |
|---|---|---|
| Iron scrap supplying method to to preheating furnace | All the time fillig up | Per heat |
| Oxygen-gas blowing amount (Nm3/t) | 33 | 33 |
| Carbon blowing amount (kg/t) | 12 | 12 |
| Tapping temperature(° C.) | 1560 | 1600 |
| Tap-Tap time(min) | 40 | 60 |
| Electric power unit consumption (kWh/t) Arc Furnace | 80 | 240 |
| Electric power unit consumption (kWh/t) Ladle refinary furnace | 60 | 30 |
| Electric power unit consumption (kWh/t) Total unit consumption | 140 | 270 |

As shown in Table 10, according to the Comparative example an electric power unit consumption in an arc furnace was 240 kWh/t, total unit consumption of an electric power by an arc furnace and a ladle finery furnace was 270 kWh/t and in addition, time from tapping to tapping was 60 minutes on average. However, following the Example of the present invention, total electric power consumption could be reduced by 130 kWh/t in comparison with Comparative example and at the same time, the tapping to tapping could be shorten by 20 minutes.

Figure 29:
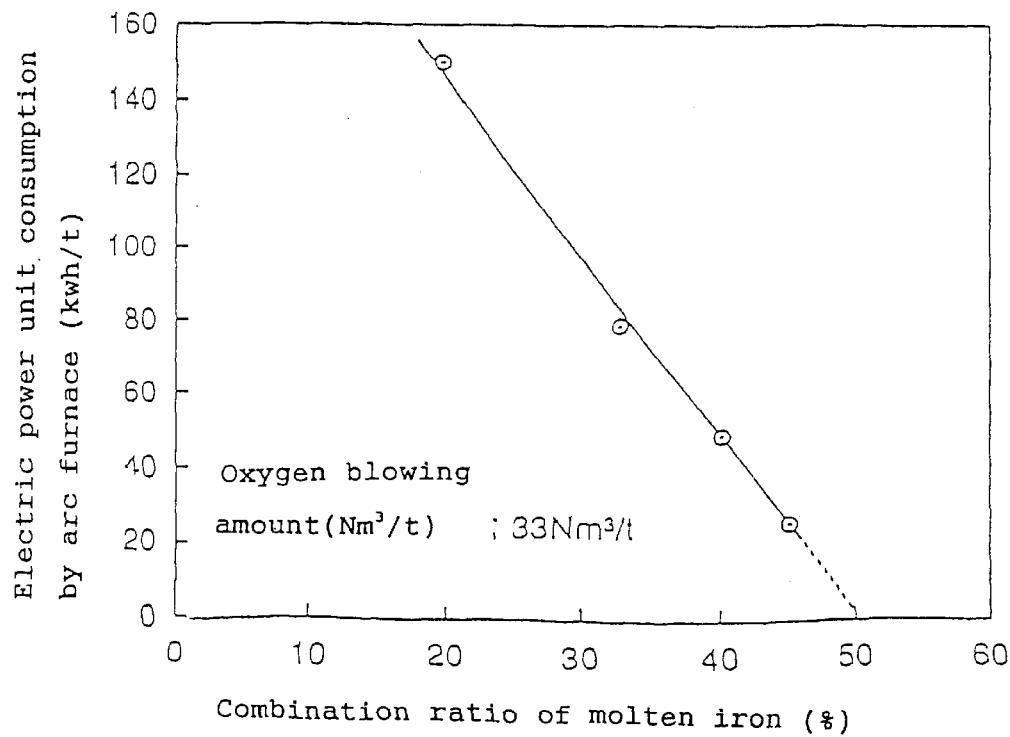
FIG. 29 is a graph showing results of investing influence of molten iron mixing ratio on an electric power unit requirement, relating to an embodiment of the present invention.

FIG. 29 shows an electric power unit consumption in an arc furnace according to an example which varies combination ratio of molten iron to 20~45% on condition that oxygen blow amount of 33 $Nm^3$/t is constant. As shown in FIG. 4, it has been found that with an increase in the amount of molten iron, the electric power unit consumption decreases and that if the combination ratio of the molten iron is made to be about 50% or more the arc furnace can be operated solely by the heat of burning the carbon in the molten iron without using electric power.

Now subsequently another embodiment of the present invention will be described with reference to FIG. 30 and FIG. 31.

The present invention will be described with reference to the drawings herein-after. FIG. 30 is a longitudinally sectional schematic view of an-arc melting equipment which shows one example of an embodiment of the present invention.

Figure 30:
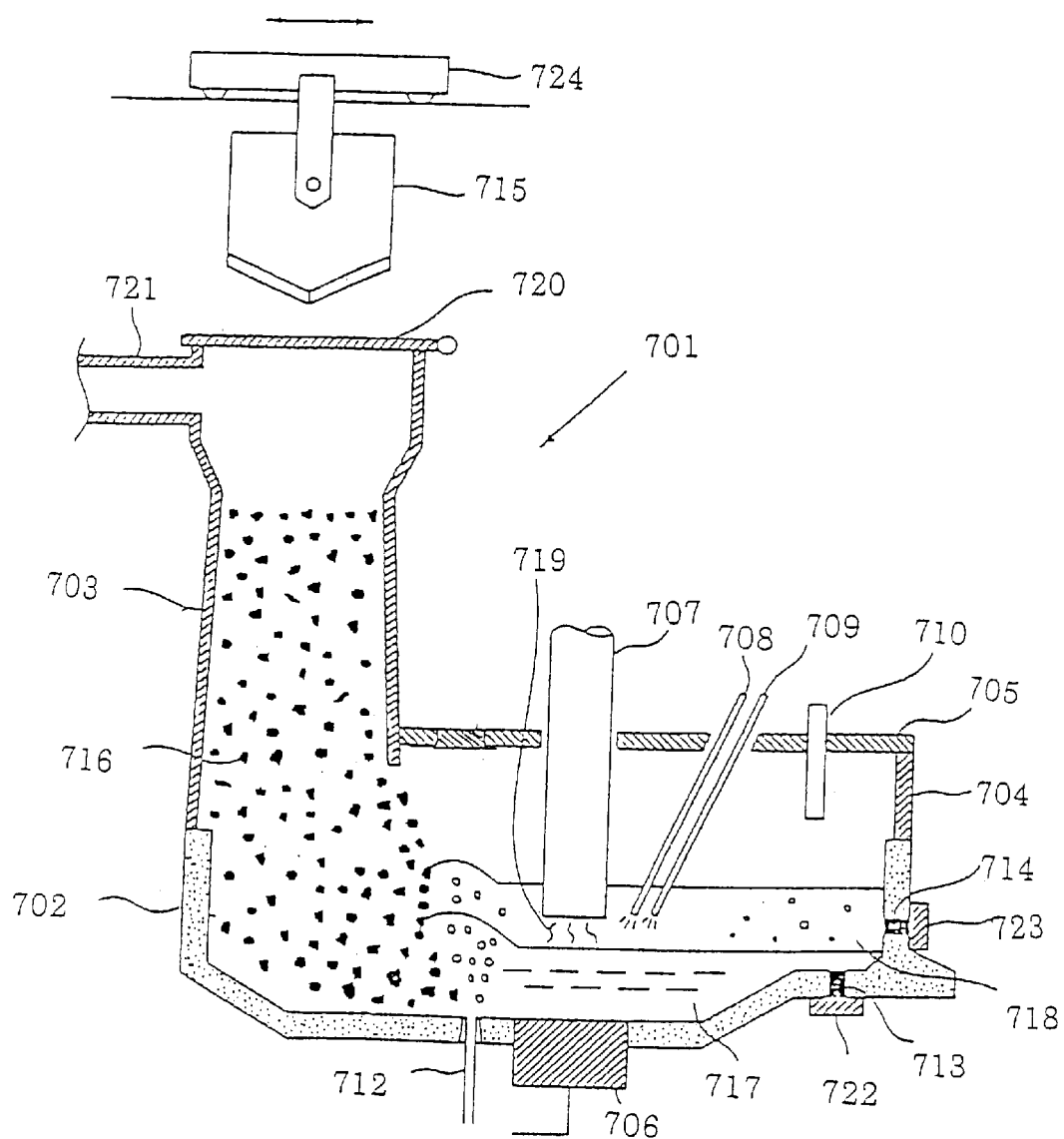
FIG. 30 is a longitudinally schematic view of an arc-melting equipment which shows another embodiment relating to an embodiment of the present invention.
Figure 31:
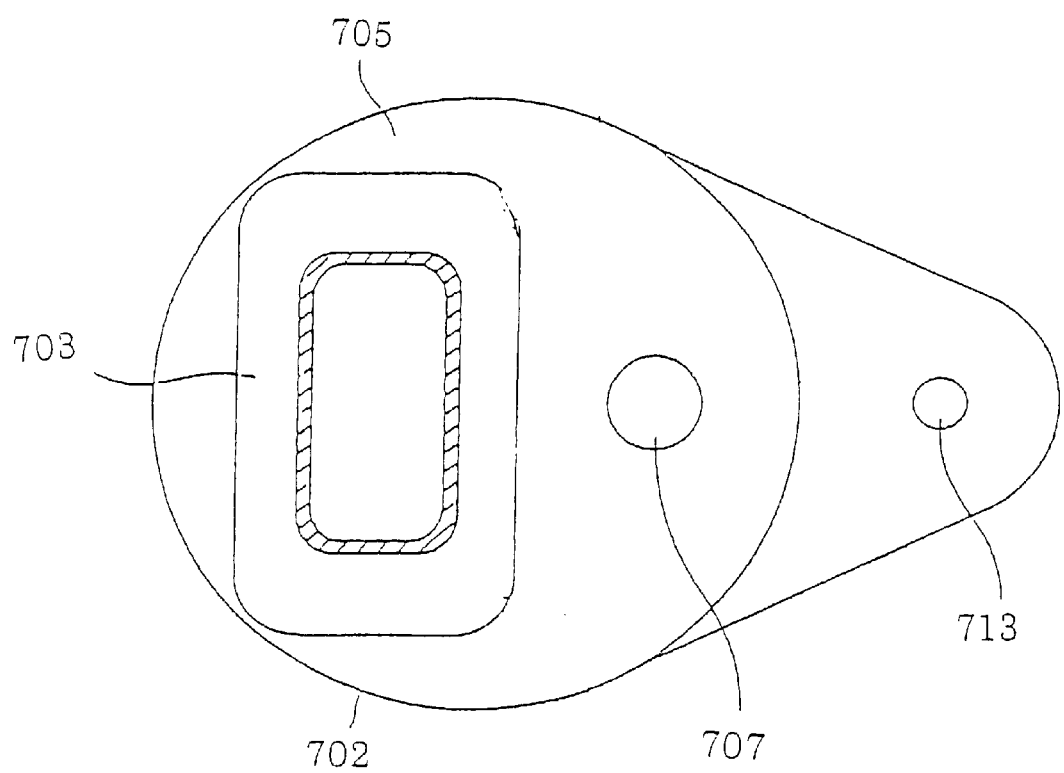
FIG. 31 is a plan schematic view of the arc-melting equipment shown in FIG. 30.

In FIG. 30, a shaft type preheating chamber 703 and a furnace wall 704 with a water cooling structure are arranged at an upper part of a melting chamber 702 which is internally constructed with refractory. The melting chamber 702 is equipped with furnace bottom electrodes 706 at bottom and an upper opening of the furnace wall 704, which is not covered with the preheating chamber 703, is covered with a furnace cover 705 having a water cooling structure which can be freely opened and closed. An upper electrode 707 made of graphite which is movable up and down is arranged passing through this furnace cover 705, and a base of an arc-melting equipment 701 is constructed. The furnace bottom electrodes 706 and the upper electrode 707 are connected to a direct current power source(not shown) and an arc 719 is produced between the furnace bottom electrodes 706 and the upper electrode 707.

At an upper part of the preheating chamber 703 a hopper type supply bucket 715 is provided hanging up on a travelling truck 724, and from this supply bucket 715 cold iron source 716 such as iron scraps and direct reduction iron is charged via a supply opening 720 which can be freely opened and closed into the preheating chamber 703. A duct 721 placed at an upper end of the preheating chamber 703 is connected to a dust collector (not shown). High temperature exhaust gas which is generated in the melting chamber passes through the preheating chamber 703 and the duct 721 in sequence to be absorbed and the cold iron source 716 in the preheating chamber 703 is preheated, thereby. The cold iron source 716 which has been preheated falls down into the melting chamber with dead load corresponding to amount of the cold iron source 716 which is melted in the melting chamber and thereby the preheated cold iron source is charged into the melting chamber 702.

The side wall of the preheating chamber 703 has a taper which extends downward. By providing the taper the cold iron source 716 which has been preheated can be supplied stably to the melting chamber 702. If the taper is not formed, the cold iron source 716 does not fall smoothly and can hang up in the preheating chamber 703. This taper is preferably in a range from 2.5~7 degrees. If the taper is less than 2.5 degrees, it is impossible to effectively prevent hanging up in the preheating chamber 3. On the other hand, if it is over 7 degrees, the charge amount of the cold iron source 716 in the preheating chamber 703 is reduced and it is impossible to control the time for which the cold iron source 716 stays in the preheating chamber 703 to be sufficiently long to obtain sufficient preheating.

The oxygen blow lance 708 and the carbonaceous material blow lance 709 which are movable up and down in the melting chamber 2 are arranged passing through the furnace cover 705. Oxygen is injected through the oxygen blow lance 708 into the melting chamber 702 and carbonaceous material such as coke, char, coal, charcoal graphite is blown through the carbonaceous material blow lance 709 into the melting chamber 702 using air and nitrogen as carrier gas.

On the opposite side of a part where the preheating chamber 703 of the melting chamber 702 is arranged, there are (i) at the furnace bottom, a tapping hole 713 in which filling sand or mud agent is filled with an exit side being pressed by a door 722 and (ii) at the side wall a slag discharge hole 714 in which filling sand or mud agent is filled with an exit side being pressed by a door 723. A burner 710 is fitted into the furnace cover 705 which is a part corresponding to an upper part perpendicular to this tapping hole 713. The burner 710 burns fossil fuel such as heavy oil, kerosene, pulverized coal, propane gas and natural gas in the air or oxygen or oxygen enriched air in the melting chamber 702.

A tuyere 712 is provided as gas supply means for blowing oxygen or inert gas into the melting chamber 702. The tuyere 712 is arranged at a furnace bottom of the melting chamber 702 in the vicinity of boundary of the cold iron source 716 which is supplied from the preheating chamber 703 and the molten iron 717 which is produced in the melting chamber 702. When oxygen is to be blown in, the tuyere 712 is made of a double tube structure to form a structure in which cooling gas such as propane is made to flow through an outer tube. When inert gas such as Ar is to be blown in, the tuyere 712 may be made of a single tube, and may be one which many small tubes of about 1 mm in diameter are put together. Alternately, a porous brick may be used in place of the tuyere 712. Anyone of those described in the foregoing will do.

The method of melting cold iron source 716 in an arc-melting equipment 701 which is constituted in this manner is carried out as follows. First, from the supply bucket 715, the cold iron source 716 is charged into the preheating chamber 703. The cold iron source 716 which has been charged into the preheating chamber 703 is also charged into the melting chamber and it fills up the inside of the preheating chamber 703. Since the cold iron source 716 is charged uniformly into the melting chamber 702, the cold iron source 716 can also be charged into the melting chamber 702 on the opposite side of the preheating chamber 703 by opening the furnace cover 705.

Subsequently while oxygen or inert gas is being blown in, direct current is being supplied between the furnace bottom electrodes 706 and the upper electrode 707 to make the upper electrode 7 move up and down, and an arc 719 is generated among the upper electrode 707, the furnace bottom electrodes 706 and the cold iron source 716 which has been charged. The cold iron source 716 is melted by arc heat which is generated to produce molten iron 717. The molten iron is produced and at the same time flux such as quick lime and fluorite is charged into the melting chamber 702 to form molten slag 718 over the molten iron 717, whereby not only is oxidization of the molten iron 717 prevented but also the molten iron 717 is kept warm. In case that the molten slag 718 is too much in amount, it can be discharged through the slag discharge hole 714.

In addition, as the melting progress is, if the cold iron source 716 piles up in the vicinity of boundary of the cold iron source 716, which piles at a lower position of the preheating chamber 703 and the molten iron 717, the molten iron 717 is stirred by oxygen and inert gas which is blown in through the tuyere 712. Since the cold iron source 716 which has piled is melted by the molten iron 717 which has been stirred, the cold iron source 716 can be prevented from hanging up.

From about the time when the molten iron 717 is produced, oxygen and carbonaceous material are blown preferably through the oxygen blow lance 708 and the carbonaceous material blow lance 709 into the molten iron 717 or the molten slag 718. The carbonaceous material which is melted in the molten iron 717 or the carbonaceous material which is suspended in the molten slag 718 reacts with oxygen to generate heat of combustion, which works as supplementary heat source to save electric power consumption. At the same time, CO gas as a product of reaction makes the molten slag 718 formed, whereby invites, what is called, slag forming operation in which the arc 719 is wrapped in the molten slag. Therefore, heat transfer efficiency of the arc 719 goes up. In addition, high temperature CO gas which is generated in a large quantity and $CO_2$ gas which is generated by combustion of this CO gas, preheat the cold iron source 716 efficiently in the preheating chambers 703. Blow amount of this carbonaceous material is determined in response to blow amount of oxygen. That is to say, carbonaceous material almost equal to chemical equivalent of oxygen which is blown in is introduced. If the amount of carbonaceous material which is blown in is small in comparison with oxygen blow amount, the molten iron is excessively oxidized. In addition, oxygen which is blown in through a tuyere 712 reacts with the molten iron to form FeO, but this FeO is reduced by carbonaceous material which has been blown in. In this case the total amount of oxygen which is blown in through the oxygen blow lance 708 and the tuyere 712 is preferably 25 $Nm^3$ or more per ton molten iron 717 which is melted, and it is more preferably 40 $Nm^3$ or more. By this the cold iron source 716 can be more efficiently melted.

Accompanied by production of the molten iron 717 the cold iron source 716 in the preheating chamber 3 drops into the melting chamber 702 to be reduced, under its own weight, in response to the amount which is melted in the melting chamber. In order to make up for this reduced amount the cold iron source 716 is charged into the preheating chamber 703 from the supply bucket 715. This cold iron source 716 is charged continuously or intermittently into the preheating chamber 703 so that the cold iron source 716 is continuously maintained in the preheating chamber 703 and in the melting chamber 702. In that case in order to increase preheat efficiency amount of the cold iron source 716 which is maintained in the preheating chamber 703 and in the melting chamber 702 is preferably made to be 40% or more of the cold iron source 716 for one charge.

In this manner, the cold iron source 716 is melted until one charge of molten iron 717 is at least accumulated in the melting chamber. Therefore, maintaining the cold iron steel 716 continuously in the melting chamber 702 and in the preheating chamber 703, the melting chamber 702 is tilted to tap the molten iron 717 for one charge from the tapping hole 713 into a molten iron hold vessel (not shown) such as a ladle. At the time of tapping, in order to avoid problems such as the closing of the tapping hole 713 due to a fall of molten iron temperature, the molten iron 717 may be heated by a burner 710.

And after the tapping the molten iron 717 is elevated to temperature by the ladle refinery furnace, depending on requirement, it is cast by a continuous caster. After the molten iron 717 is tapped and the molten slag 718 is discharged, the melting chamber 702 is returned to horizontal, and filling sand or mud agent is put up in the tapping hole 713 and the slag discharge hole 714. Subsequently an electric current is turned on again and the melting is continued. Since as for next heating the melting can be begun with the cold iron source 716 which has been preheated, efficiency of melting is improved. At the time of tapping, leaving the molten iron 717 of several dozens of tons behind in the melting chamber 702 the melting for next charge may be started. By doing this, initial melting is promoted and efficiency of melting is further improved.

By heating and melting the cold iron source 716 in this manner, the cold iron source 716 can be prevented from hanging-up at a lower position of the preheating chamber 703 in the melting chamber 702 and efficient and stable melting can be accumulated. As a result, improvement of productivity and reduction of electric power unit consumption are attained.

Embodiment 15

An example of an arc-melting equipment shown in FIG. 30 will be described here-below. The present example is an example wherein melting is performed while oxygen is being blown in through two double tube tuyeres placed on a bottom of an melting chamber. The arc-melting equipment has a melting chamber of a furnace diameter: 7.2 m; a height: 4 m, a preheating chamber of a width: 3 m; a length: 5 m; a height: 7 m and a furnace capacity of 180 tons.

Firstly charged into the preheating chamber were 150 tons of iron scraps of a normal temperature and melting was begun using an upper electrode of made graphite with a diameter of 30 inches using electric power source of maximum 750 V, 130 KA. Immediately after an electric current was turned on quick lime and fluorite were added and at the same time oxygen was blown in at a rate of 4000 $Nm^3$/hr through an oxygen blow lance. At the time when molten iron accumulated in the melting chamber, coke was blown, at a rate of 80 kg/min into slag to drive the slag forming operation and a top end of the upper electrode was buried in the slag which was forming. Voltage at this time was set to be 550 V. As the iron scraps in the preheating chamber descended following the melting, iron scraps were charged from the supply bucket into the preheating chamber to maintain a level of the iron scraps in the preheating chamber at a certain height as the melting was continued.

During this time, oxygen was blown in through the double tube tuyere 40 $Nm^3$/hr per one tuyere and 80 $Nm^3$/hr per total tuyeres to prevent the cold iron source from hanging up and so that the cold iron source dropped continuously into the molten iron. Propane gas was blown in through an outer tube of a double tube to cool the tuyere.

While iron scraps were continuously maintained in the melting chamber and in the preheating chamber, the melting was promoted. When 180 tons of the molten iron was produced in the melting chamber, 120 tons for one charge was tapped into a ladle, leaving about 60 tons of behind in the melting chamber. At the tapping the molten iron was heated by a heavy oil burner. Carbon concentration at the tapping was 0.1 wt % and temperature of the molten iron was 1550° C. After the tapping an electric current was turned on again and at the same time injection of oxygen and coke was commenced. When the molten iron amounted to 180 tons again tapping, 120 tons of the molten iron was repeated.

By maintaining the conditions that total oxygen blow amount through an oxygen blow lance and a bottom blow tuyere is at a rate of 33 $Nm^3$/t and that coke blow amount is 26 kg/t, the time from tapping to tapping was 40 minutes on average and the electric power unit consumption was reduced to 170 kWh/t, and melting could be completed.

In case that oxygen was not blown in through a tuyere, iron scraps which piled on a portion which had not yet melted were left not melted in the vicinity of boundary of the molten iron and the cold iron source. Furthermore, in spite of there being a pace below the iron scraps, the iron scraps did not fall down into the melting chamber. The hanging-up was continued for a long time and that melting stagnated about once per 6 charge. According to the present invention, by blowing in oxygen, such stagnation of melting can be prevented.

As the results of investigating the relation between time from tapping to tapping and its frequency with respect to the condition where oxygen was blown in from a furnace bottom and the condition where oxygen was not blown in, in the case that oxygen was not blown in as the same as Example 1, supply of iron scraps to molten iron was delayed with the result that the time from tapping to tapping was increased. But in the case that oxygen was blown in tapping was accomplished about every 40 minutes and extension of melting time did not occur.

Availability in Industry

As described above, since according to the present invention iron source such as scraps is melted using an arc-melting equipment which has a melting chamber and a preheat shaft directly connected to the upper portion of the melting chamber a device for carrying and supplying the iron source to the melting chamber is not required. Since the iron source is being supplied so that the iron source is continuously maintained in the melting chamber and the preheat shaft, high efficiency can be obtainable as below. Actually, in the present invention, the iron source in the melting chamber is melted by an arc, and under conditions that the iron source is continuously maintained, in the melting chamber and in the preheat shaft, the molten iron is tapped, whereby the iron source for next charge is also preheated. In addition since contact area, the iron source and molten iron bath which is produced by melting the iron source can be made to be small, the molten iron can be super heated. This can solve a ,problem that temperature of the molten iron tapped is too low. In addition, a part of or the whole of the bottom portion, which correspond to the preheat shaft of the melting chamber or correspond to the separating part, can have a slanted portion, from the bottom of the tapping portion (the deepest position) toward a direction which a furnace is tilted. The contact area with the iron source and the molten iron, can remarkably be small, in comparison with a case where a bottom of the melting chamber does not have a slanted portion at a bottom of the melting chamber. Therefore, the problem that temperature of the molten iron is too low, can be avoided more effectively.

What is claimed is:

1. An arc-melting apparatus for melting a cold iron source comprising:
   (a) a melting chamber which is used as a space for melting the cold iron source;
   (b) a preheating shaft directly connected to an upper part of one side of the melting chamber, to preheat the cold iron source by introducing exhaust gas generated in the melting chamber, wherein the preheating shaft and the melting chamber form an integral structure;
   (c) an arc electrode for supplying heat for melting the cold iron source in the melting chamber;
   (d) a cold iron source supply device for supplying the cold iron source to the preheating shaft, so as to continuously maintain the cold iron source in the melting chamber and in the preheating shaft, so that the scraps in the preheating shaft are continuously maintained in contact with the surface of the molting metal in the melting furnace;
   (e) a tapping portion having a tapping hole, projecting outwardly from the melting chamber; and
   (f) a tilting device for tilting the melting chamber toward the tapping portion, simultaneously for tilting the preheating shaft toward the tapping portion, by the integral structure.

2. The apparatus according to claim 1, wherein the tapping portion having the tapping hole is located in a different direction from a direction of supplying the cold iron source in the preheating shaft into the melting chamber.

3. The apparatus according to claim 2, wherein the tapping portion is arranged at an orthogonal direction to the direction of the supplied cold iron source.

4. The apparatus according to claim 1, wherein a distance between a position where the preheating shaft is placed adjacent to the melting chamber and a position where the tapping portion is placed adjacent to the melting chamber is predetermined to prevent the cold iron source from flowing out to the tapping portion, when the melting chamber is tilted.

5. The apparatus according to claim 4, wherein the distance between the position where the preheating shaft is placed adjacent to the melting chamber and the position where the tapping portion is placed adjacent to the melting chamber, is longer than a horizontal distance that the cold iron source extends from the preheating shaft into the melting chamber.

6. The apparatus according to claim 1, further comprising a travelling device for travelling the arc electrode, following the molten iron which moves in the melting chamber, when the melting chamber is tilted at a tapping time.

7. The apparatus according to claim 1, further comprising another arc electrode which is placed at the tapping portion.

8. The apparatus according to claim 1, further comprising a device for supplying an oxygen gas at a lower position of the preheating shaft.

9. The apparatus according to claim 1, further comprising a fuel supply device for supplying a fuel, together with an oxygen gas to the cold iron source at a lower position of the preheating shaft.

10. The apparatus according to claim 1, further comprising a carbonaceous material supply device for supplying a carbonaceous material to the melting chamber and an oxygen gas supply device for supplying an oxygen gas to the melting chamber.

* * * * *